United States Patent [19]
Haruki

[11] Patent Number: 5,671,029
[45] Date of Patent: Sep. 23, 1997

[54] APPARATUS FOR MANUFACTURING A DISPLAY DEVICE AND A METHOD OF MANUFACTURING THE DISPLAY DEVICE

[75] Inventor: Takashi Haruki, Kashiba, Japan

[73] Assignee: Sharp Kabushiki Kaisha, Osaka, Japan

[21] Appl. No.: 431,892

[22] Filed: May 1, 1995

[30] Foreign Application Priority Data

| May 13, 1994 | [JP] | Japan | 6-099395 |
| Dec. 20, 1994 | [JP] | Japan | 6-317181 |
| Feb. 23, 1995 | [JP] | Japan | 7-035575 |

[51] Int. Cl.$^6$ .............. G02F 1/1345; G02F 1/1335
[52] U.S. Cl. .................... 349/96; 349/149; 349/150
[58] Field of Search .................. 359/62, 63, 88; 349/96, 149, 150

[56] References Cited

U.S. PATENT DOCUMENTS

| 4,422,728 | 12/1983 | Andreaggi | 359/88 |
| 5,193,022 | 3/1993 | Hirai | 359/88 |
| 5,220,447 | 6/1993 | Yokokura et al. | 359/62 |

FOREIGN PATENT DOCUMENTS

| 1-260417 | 10/1989 | Japan | 359/62 |
| 2-251817 | 10/1990 | Japan. | |
| 3-228021 | 10/1991 | Japan. | |
| 3-259117 | 11/1991 | Japan. | |
| 3-290624 | 12/1991 | Japan. | |
| 5-5879 | 1/1993 | Japan. | |
| 6-273736 | 9/1994 | Japan | 359/62 |

*Primary Examiner*—William L. Sikes
*Assistant Examiner*—Tiep H. Nguyen
*Attorney, Agent, or Firm*—David G. Conlin; Brian L. Michaelis

[57] ABSTRACT

An apparatus for manufacturing a display device in which a rubbing process is carried out to an orientation member included by a substrate member, the substrate member further including: a transparent substrate; a plurality of electrodes formed on one surface of the transparent substrate; a plurality of terminals which are formed in a peripheral portion of the transparent substrate and through which a drive signal is supplied to the electrodes, the orientation member covering the surface of the transparent substrate on which the electrodes are formed, comprises:

holding means having a mounting face on which the substrate member is to be mounted, for holding the substrate member so that the orientation member is directed upward in relation to the mounting face;

short-circuit means which can be contacted with and separated from a peripheral portion of the substrate member held by the holding means, where the terminals of the substrate member are formed, and have an electrically conductive contact face to be contacted with the substrate member; and rubbing means for conducting a rubbing process on a surface of the orientation member of the substrate member.

9 Claims, 29 Drawing Sheets

F I G. 13
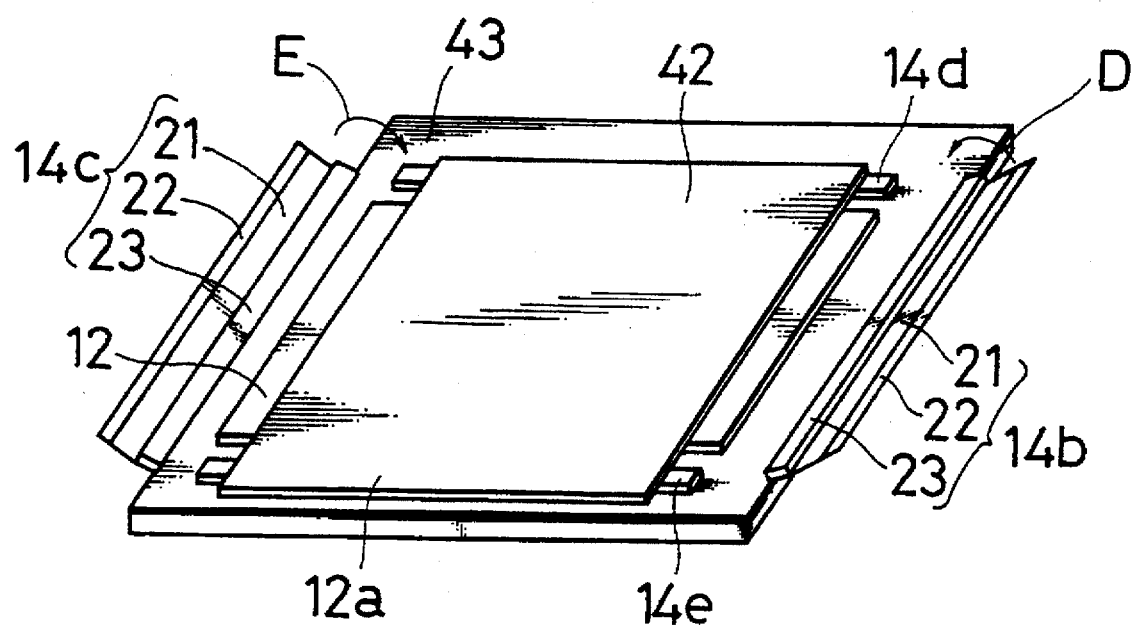

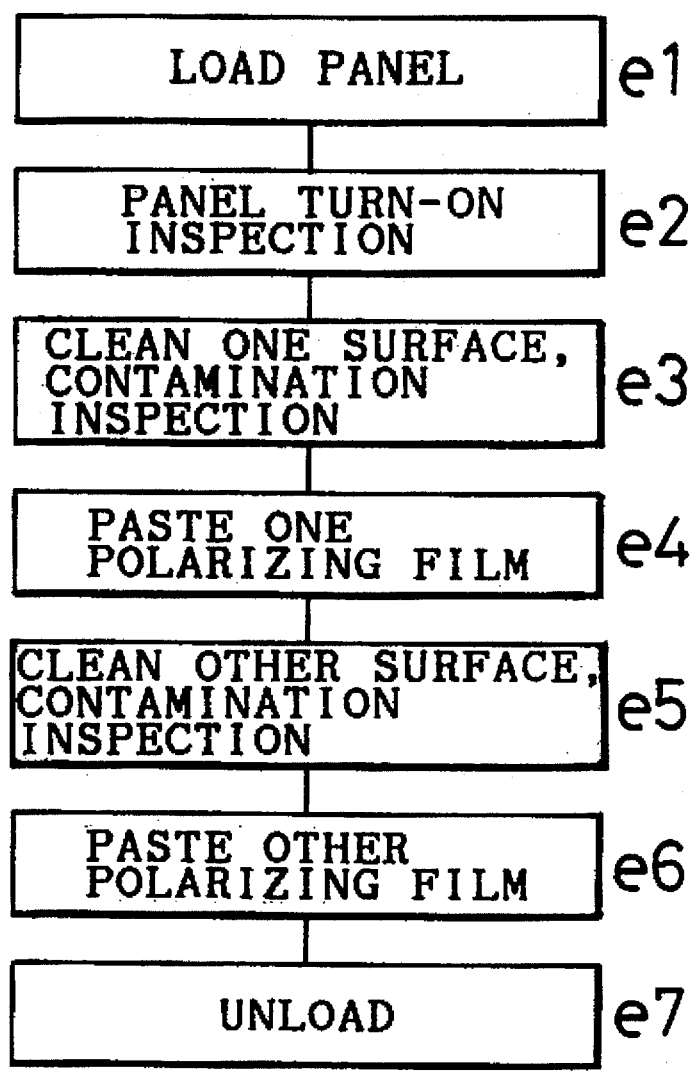

APPARATUS FOR MANUFACTURING A DISPLAY DEVICE AND A METHOD OF MANUFACTURING THE DISPLAY DEVICE

BACKGROUND OF THE INVENTION

1. Field of the Invention

The present invention relates to an apparatus for manufacturing a display device and a method of manufacturing the display device, and more particularly to an apparatus and a method which are used when a polarizing film is pasted to a display panel including a material such as liquid crystal having optical properties that are altered by subjecting the material to an electric field, or when a rubbing process is conducted.

2. Description of the Related Art

In a process of manufacturing a matrix driving liquid crystal display device in which a polarizing film is pasted to a display panel, when such a polarizing film is pasted to the display panel, static electricity is generated because of operations such as that the polarizing film is rubbed with the display panel while being pressing the film against the panel. It is known that electrostatic destruction occurs when charges due to static electricity are concentrated to a specific strip electrode disposed in the display panel. Such electrostatic destruction includes a phenomenon that a high potential difference is established between the specific strip electrode and another strip electrode adjacent to the specific electrode, and an electric discharge occurs between the two strip electrodes so that the two strip electrodes are always short-circuited. It is also known that generated electrostatic charges enter a specific electrode to be accumulated in the display panel so that, when the display panel is turned on, the display is conducted unevenly.

In order to prevent such electrostatic destruction from occurring, in the prior art (Japanese Unexamined Patent Publications JPA 2-251,817 (1990), 3-259,117 (1991), and 3-290,624 (1991)), a conductive tape 3 is pasted to all terminal electrodes 2 of a display panel 1 as shown in FIGS. 34A and 34B, and, in the other prior art (Japanese Unexamined Patent Publication 3-228,021 (1991)), conductive covers are placed on portions where terminal electrodes are formed, whereby charges due to static electricity are prevented from being concentrated to a specific strip electrode. FIG. 34A is a plan view of the display panel 1, and FIG. 34B is a side view of the display panel 1. The publication 2-251,817 (1990) discloses also a technique in which all the terminal electrodes are short-circuited by applying a conductive resin to the electrodes.

FIG. 35 shows the working steps in pasting a polarizing film to a display panel in the case where the prior art shown in FIGS. 34A and 34B is employed as a countermeasure for preventing electrostatic destruction from occurring. At step a1, a display panel is loaded into a pasting apparatus, and a conductive tape is pasted at step a2 to terminal electrodes of the display panel. The surface of the display panel is cleaned at step a3, and a polarizing film is pasted to the display panel at step a4. A liquid crystal display device in which the polarizing film is pasted to the display panel as described above is subjected to inspection of displaying ability etc. at step a5.

At step a6, the conductive tape which has been pasted at step a2 is peeled from the terminal electrodes because the tape will obstruct the operation of pasting an anisotropic conductive tape to the terminal electrodes at step a8 which will be described below. The terminal electrodes are cleaned at step a7 to remove away residues of the conductive tape, etc., and the operation advances to step a8. At step a8, the anisotropic conductive tape which will be used for connecting a driving circuit board to the display panel is pasted to the terminal electrodes.

FIG. 35 shows the working steps in which the terminal electrodes are short-circuited by a conductive tape. The working steps conducted in the case where the above-mentioned conductive covers and conductive resin are used are substantially identical with those shown in FIG. 35.

Since static electricity is generated also in a rubbing process conducted in the manufacture of a liquid crystal display device, the above-mentioned techniques are employed in the prior art as countermeasures for preventing the electrostatic destruction.

In all the prior art techniques, a conductive tape or a conductive resin which has been once pasted or applied to terminal electrodes must be peeled from the terminal electrodes when an anisotropic conductive tape is to be pasted to the terminal electrodes. This makes the work cumbersome, and the operations of pasting a polarizing film in the manufacture of a liquid crystal display device, complicated, thereby lowering the production efficiency. Since a conductive tape and a conductive resin which have been once used cannot be reused, the production cost of a liquid crystal display device is increased. In contrast, conductive covers can be reused, but has the drawback that a cumbersome work is required to remove the covers from the terminal portion one by one.

At the step of peeling the conductive tape or the conductive resin from the terminal electrodes, there may be a case where conductive carbon in the adhesive material of the conductive tape or conductive particles included in the conductive resin are not completely removed and remain on the terminal electrodes. When conductive carbon or conductive particles remain on the terminal electrodes as described above, such residues cannot be removed away by the operation of cleaning the terminals conducted at step a7 of FIG. 35, and the operation of pasting the anisotropic conductive tape may be conducted while adjacent terminal electrodes are short-circuited by the residual conductive carbon or conductive particles. This causes the liquid crystal display device to have a display defect, so that the yield of the process of manufacturing liquid crystal display devices is impaired. Furthermore, static electricity which is generated when the tape or resin is peeled off causes a further failure.

The countermeasure using conductive covers has the following problems:

(1) A large number of dedicated conductive covers which corresponds to the number of produced display panels is required, and the working effectiveness of loading the covers is low.

(2) Since dedicated conductive covers corresponding to the sizes of the display panels to be produced are required, different kinds of conductive covers must be prepared so as to suit each type of panel.

(3) Display panels on which conductive covers have been loaded are varied in dimensions and lowered in dimensional accuracy. Therefore, display panels which are in the course of the production process are very difficult to be stored and be set into an automatic production apparatus.

(4) When conductive covers are used, portions of a display panel with which the conductive covers are contacted may be scratched by the contact between the covers and the panel, or a stain deposited on a cover may be transferred to the panel. The terminal electrodes and strip electrodes of the display panel may be broken by such a scratch, or short-circuited by the stain.

Also in the case where any of the techniques of the prior art is applied to a rubbing process conducted in the manufacture of a liquid crystal display device, the conductive tape or conductive resin which is pasted or applied to the terminal electrodes before the rubbing process has to be finally peeled off when an anisotropic conductive tape is pasted to the terminal electrodes. In the same manner as the case where a polarizing film is pasted, there arise problems of the lowering of productive efficiency, the increase of production cost, and the decrease of yield.

FIG. 38 is a production flow chart showing steps of another conventional method of manufacturing a liquid crystal display device, FIG. 37 is a diagram showing the configuration of a conventional apparatus 101 for producing a liquid crystal display device which is employed in the conventional method of FIG. 36, and FIG. 38 is a perspective view showing the configuration of a conventional inspection jig 110 for a liquid crystal display device which is used in the conventional art method of FIG. 36.

The manufacturing apparatus 101 shown in FIG. 37 is an apparatus which pastes a polarizing film to a ferroelectric liquid crystal panel 102 and which is disclosed in, for example, Japanese Unexamined Patent Publication JPA 5-5,879 (1993). The apparatus 101 comprises polarizing films 103, 104, a light source 105, light receiving means 106, light intensity detecting means 107, and driving means 108. The display panel 102 is disposed between the polarizing films 103, 104, an electric field is applied to pixels while the display panel 102 is rotated in a direction 109, and the display panel 102 and the polarizing films 103, 104 are irradiated with the light emitted from the light source 105. The light receiving means 106 receives transmitted light of the light emitted from the light source 105, and the light intensity detecting means 107 detects the intensity of the transmitted light. While rotating the display panel 102 in the direction 109, a position where the intensity of the transmitted light comes to the maximum or minimum is selected. The selected position is the one where the switching direction of the ferroelectric liquid crystal of the display panel 102 coincides with the axes of polarization of the polarizing films 103, 104. Therefore, the polarizing films 103, 104 are pasted to the position of the display panel.

The ferroelectric liquid crystal has such a constitution that the major axes of the liquid crystal molecules form a tilt angle W with respect to the normal direction of the smectic layer, and the average orientation direction (director) constitutes a so-called helical structure in which the director rotates on a cone having a vertical angle of 2W as the director moves along the normal direction. In a display panel in which the thickness d of a liquid crystal layer using such liquid crystal, and the helical pitch PO of the director have the mutual relationship of d/PO<1, two states, i.e., one state where the director is tilted rightward by the angle W with respect to the normal direction, and the other where the director is tilted leftward by the angle W are obtained. The two states can be switched by applying an electric field to the liquid crystal layer.

At step b1 of FIG. 36, the display panel 102 is received, namely disposed between the polarizing films 103 and 104. One surface of the display panel 102 is cleaned at step b2. At step b3, the position where the polarizing film is to be pasted is selected as described above, and the polarizing film is pasted to the one surface which has been cleaned. The other surface of the display panel 102 is cleaned at step b4. At step b5, the pasting position is selected in the same manner as that of step b3, and the other polarizing film is pasted to the other surface which has been cleaned. At step b6, the display panel 102 to which the polarizing film is pasted, namely the completed ferroelectric liquid crystal display device is subjected to the turn-on and contamination inspections.

In the turn-on and contamination inspections of the panel, the inspection jig 110 such as shown in FIG. 38 is used. The inspection jig 110 comprises a pair of clamping means 111, 112, between which the liquid crystal display device is held. The clamping means 111 and 112 have rectangular windows 111a, 112a, respectively through which, when a liquid crystal display device is held between the clamping means 111, 112, the display face of the liquid crystal display device is exposed. The liquid crystal display device is irradiated with the light through one of the windows, and the display stage is inspected on the basis of the light which outgoes through the other window. Conductive members 113, 114 which are connected to a plurality of terminal electrodes elongating from display electrodes of one substrate member of the liquid crystal display device are respectively disposed in opposing edges of the window 111a in the side of the clamping face of the clamping means 111. A similar conductive member 115 is disposed in an edge of the window 112a in the side of the clamping face of the clamping means 112. The conductive member 115 is connected to a plurality of terminal electrodes of the other substrate member. An AC voltage oscillator 116 supplies an AC voltage to the conductive members 113–115. For example, the conductive members 113 and 114 are connected to a minus terminal 116a of the AC voltage oscillator 116, and the conductive member 115 to a plus terminal 116b.

When a voltage higher than the threshold voltage which causes the orientation of the liquid crystal molecules to be altered is applied to the liquid crystal display device by using the thus configured inspection jig 110, for example, all of plural pixels which are formed by the opposing display electrodes of the two substrate members of the liquid crystal display device are set to be the display state (turn-on state). When a failure such as a break of the display electrodes exists, some of the pixels fail to be turned on. Therefore, it is possible to recognize such a break. In the case where foreign matter is deposited on the liquid crystal display device, the foreign matter appears as, for example, a black portion. Therefore, it is possible to recognize the deposition of foreign matter. Furthermore, the display unevenness, etc. can be inspected.

At step b5, the display state is inspected in the manner as described above. After inspecting of the display state, liquid crystal display devices are classified at step b7 into those having a display failure-free superior display quality, and those having an inferior display quality.

In the prior art techniques of FIGS. 36–38, the apparatus for pasting polarizing films to a display panel, and the apparatus for inspecting a display device are separately employed. In other words, polarizing films are pasted to a display panel, and thereafter the display state is inspected. When a display failure due to the display panel, such as a break of display electrodes, exists, therefore, the polarizing films pasted to the display panel must be wasted. This is applicable also in the case where foreign matter is deposited on the display panel. Since the attaching apparatus and the inspecting apparatus are separated from each other, the operations of loading a display panel into each of the apparatuses consume a long time and great efforts. Moreover, the installation of the two apparatuses requires a considerably large space.

SUMMARY OF THE INVENTION

It is hence an object of the invention to provide an apparatus for and an method of manufacturing a display device in which electrostatic destruction that may occur in a rubbing process and the operation of pasting a polarizing film can be prevented by a relatively simple structure, and in which the inspection of a display state can be conducted before a polarizing film is pasted to the display panel, and a polarizing film is pasted only to a display panel free from a display failure so that a polarizing film is not wastefully pasted to a display panel, whereby a display device can be manufactured with consuming a relatively short time and relatively small efforts.

The invention provides an apparatus for manufacturing a display device, in which a rubbing process is carried out to an orientation member included by a substrate member, the substrate member further including: a transparent substrate; a plurality of electrodes formed on one surface of the transparent substrate; a plurality of terminals which are formed in a peripheral portion of the transparent substrate and through which a drive signal is supplied to the electrodes, the orientation member covering the surface of the transparent substrate on which the electrodes are formed, the apparatus comprising:

holding means having a mounting face on which the substrate member is to be mounted, for holding the substrate member so that the orientation member is directed upward in relation to the mounting face;

short-circuit means which can be contacted with and separated from a peripheral portion of the substrate member held by the holding means, where the terminals of the substrate member are formed, and have an electrically conductive contact face to be contacted with the substrate member; and rubbing means for conducting a rubbing process on a surface of the orientation member of the substrate member.

The invention provides an apparatus for manufacturing a display device, in which a polarizing film is pasted to a surface of a display panel wherein a liquid crystal material is interposed between two mutually confronted substrate members each having a surface on which a plurality of electrodes are formed, and a plurality of terminals through which a drive signal is supplied to the electrodes are disposed on the other not mutually confronted surfaces of the substrate members, the apparatus comprising:

holding means having a mounting face an which the display panel is to be mounted, for holding the display panel by attracting the display panel onto the mounting face;

short-circuit means which can be contacted with and separated from a region of the display panel held by the holding means, wherein the terminals directed upward in relation to the mounting face are arranged, and which has an electrically conductive contact face to be contacted with the display panel;

conducting means which can be contacted with a region of the display panel held by the holding means, wherein the terminals directed downward in relation to the mounting face are arranged, and which has an electrically conductive contact face to be contacted with the display panel; and pasting means for pasting a polarizing film to the surface of the display panel.

Further the invention provides an apparatus for manufacturing a display device, in which a polarizing film is pasted to a surface of a display panel wherein a liquid crystal material is interposed between two substrate members having different sizes, a plurality of electrodes and a plurality of switching elements which are connected to the electrodes are formed on a surface of one larger substrate member of said two substrate members, the surface confronting the other smaller substrate member, and a plurality of terminals through which a drive signal is supplied to the electrodes are formed on the other surface of the larger substrate member, not confronting the smaller substrate member, the apparatus comprising:

first holding means having a mounting face on which the display panel is to be mounted, and for holding the display panel by attracting the display panel so that the terminals of the display panel are directed upward in relation to the mounting face;

second holding means having a mounting face on which the display panel is to be mounted, and for holding the display panel by attracting the display panel so that the terminals of the display panel are directed downward in relation to the mounting face;

short-circuit means which can be contacted with and separated from a region of the display panel held by the first holding means, wherein the terminals directed upward in relation to the mounting face are arranged, and which has an electrically conductive contact face to be contacted with the display panel;

conducting means which can be contacted with a region of the display panel held by the second holding means, wherein the terminals directed downward in relation to the mounting face are arranged, and which has an electrically conductive contact face to be contacted with the display panel; and pasting means for pasting a polarizing film to the surface of the display panel.

The short-circuit means of the invention comprises:

a conductive member which can be contacted with all the terminals, a portion of the conductive member, which is to be contacted with the terminals, being electrically conductive;

a support member for supporting the conductive member; and urging means for urging the conductive member toward the face of the substrate member on which the terminals are formed, wherein the contacting portion of the conductive member protrudes in a tapered manner and is elastic.

The short-circuit means of the invention comprises:

a conductive member which can be contacted with all the terminals and includes an electrically conductive portion to be contacted with the terminals;

a plate spring, one end of which is attached to the holding means so that the other end on which the conductive member is disposed oscillates; and fixing means for fixing the plate spring in a state where the conductive member is pressed against the substrate member, wherein the contacting portion of the conductive member protrudes in a tapered manner and is elastic.

The short-circuit means of the invention comprises:

a conductive member which can be contacted with all the terminals and includes an electrically conductive portion to be contacted with the terminals;

a plate spring, one end of which is provided with the conductive member;

a first actuator which supports the other end of the plate spring, and which moves the plate spring so that the conductive member is moved in a direction vertical to the mounting face of the holding means; and a second actuator which moves the first actuator so that the conductive member is moved in a direction parallel to the mounting face of the holding means, wherein the contacting portion of the conductive member protrudes in a tapered manner and is elastic.

The invention provides a method of manufacturing a display device, in which a rubbing process is carried out to an orientation member included by a substrate member, the substrate member further including: a transparent substrate; a plurality of electrodes formed on one surface of the transparent substrate; a plurality of terminals which are formed in a peripheral portion of the transparent substrate and through which a drive signal is supplied to the electrodes, the orientation member covering the surface of the transparent substrate on which the electrodes are formed, the method comprising the steps of:

holding the substrate member by holding means having a mounting face on which the substrate member is to be mounted so that the orientation member is directed upward in relation to the mounting face;

contacting to the terminals short-circuit means which can be contacted with and separated from a peripheral portion of the substrate member held by the holding means, where the terminals of the substrate member are formed, and has an electrically conductive contact face to be contacted with the substrate member; and rubbing a surface of the orientation member in a state that the plurality of terminals are short-circuited each other.

The invention provides a method of manufacturing a display device, in which a polarizing film is pasted to a surface of a display panel wherein a liquid crystal material is interposed between two substrate members each having a surface on which a plurality of electrodes are formed, the surfaces of the substrate members confronting each other, and a plurality of terminals through which a drive signal is supplied to the electrodes are formed on the other surfaces of the substrate members, not confronting each other, the method comprising the steps of:

mounting and holding the display panel on a mounting face of holding means for holding the display panel by attracting the display panel so that terminals of the display panel directed downward in relation to the mounting face are contacted with conducting means having a conductive contact face to be contacted with the display panel;

contacting short-circuit means which can be contacted with and separated from a region of the display panel held by the holding means, wherein the terminals directed upward in relation to the mounting face are arranged, and which has an electrically conductive contact face to be contacted with the display panel, to the terminals directed upward; and pasting a polarizing film to the surface of the display panel in a state where all the terminals of the display panel are short-circuited.

The invention provides a method of manufacturing a display device, in which a polarizing film is pasted to a surface of a display panel wherein a liquid crystal material is interposed between two substrate members having different sizes, a plurality of electrodes and a plurality of switching elements connected to the electrodes are formed on a surface of one larger substrate member of said two substrate members, the surface confronting the other smaller substrate member, and a plurality of terminals through which a drive signal is supplied to the electrodes are formed on the other surface of the larger substrate member, not confronting the smaller substrate member, the method comprising the steps of:

mounting and holding the display panel on a mounting face of first holding means for holding the display panel by attracting the display panel so that terminals of the display panel are directed upward in relation to the mounting face;

contacting short-circuit means which can be contacted with and separated from a region of the display panel held by the first holding means, wherein the terminals directed upward in relation to the mounting face are arranged, and which has an electrically conductive contact face to be contacted with the display panel, to the terminals directed upward;

pasting a polarizing film to one surface of the display panel in a state where all the terminals of the display panel are short-circuited each other;

mounting and holding the display panel on a mounting face of second holding means for holding the display panel by attracting the display panel so that the terminals directed downward in relation to the mounting face of the display panel are contacted with conductive means having a conductive contact face to be contacted with the display panel; and pasting a polarizing film to an other surface of the display panel in a state where all the terminals of the display panel are short-circuited each other.

Further the invention provides an apparatus for manufacturing a display device, in which a polarizing film is pasted to a surface of a display panel wherein a material having optical properties that are altered by subjecting the material to an electric field is interposed between a pair of transparent substrate members and the display panel comprises at least a plurality of display electrodes on surfaces of the substrate members, the surfaces confronting each other and being on the side of the material, and a plurality of terminals which elongate from the display electrodes toward peripheral portions of the corresponding substrate members, the apparatus comprising:

holding means for holding the display panel, wherein at least a display panel holding face of the holding means is light transmissive;

a light source for emitting light toward the holding means;

imaging means disposed on the side opposite to the light source with respect to the holding means;

inspection polarizing films to be inserted between the holding means and the light source and between the holding means and the imaging means, respectively;

first and second conductive members, the first conductive member connected with the plurality of terminals of one of the substrate members of the display panel held by the holding means, the second conductive member connected with the plurality of terminals of the other substrate member;

signal outputting means for supplying a display signal for inspection to the first and second conductive members; and pasting means for pasting a polarizing film to a surface of the display panel in a state where the plurality of terminals of both of the substrate members are connected with the first and second conductive members.

The invention provides a method of manufacturing a display device in which a polarizing film is pasted to a surface of a display panel wherein a material having optical properties that are altered by subjecting the material to an electric field is interposed between a pair of transparent substrate members and the display panel comprises at least a plurality of display electrodes on surfaces of the substrate members, the surfaces confronting each other and being on the side of the material, and a plurality of terminals which elongate from the display electrodes toward peripheral portions of the corresponding substrate members, the method comprising the steps of:

mounting the display panel on a light-transmissive holding face of holding means;

inserting inspection polarizing films between the holding means and a light source which emits light toward the holding means, and between the display panel on the holding means and the imaging means which is disposed on the side opposite to the light source with respect to the holding means, respectively, connecting the plurality of terminals of one of the substrate members of the display panel with a conductive member, and the plurality of terminals of the other substrate member with other conductive member;

supplying a display signal for inspection through the conductive members, and taking an image of a display face of the display panel to inspect a display state of the display panel; and only when there is no display failure, pasting a polarizing film to a surface of the display panel in a state where the conductive members are connected with the plurality of terminals.

According to the invention, the apparatus for manufacturing a display device, in which a rubbing process is carried out to an orientation member comprised by a substrate member further comprising a transparent substrate, a plurality of electrodes formed on one surface of the transparent substrate, a plurality of terminals which are formed in a peripheral portion of the transparent substrate and through which a drive signal is supplied to the electrodes, the orientation member covering the surface of the transparent substrate on which the electrodes are formed, comprises holding means for holding the substrate member, short-circuit means for short-circuiting the plurality of terminals formed on the substrate member, and rubbing means for conducting a rubbing process.

The holding means has a mounting face on which the substrate member is to be mounted, and the substrate member is held so that the orientation member is directed upward in relation to the mounting face. The short-circuit means is disposed so that it can be contacted with and separated from the peripheral portion of the substrate member held by the holding means. The terminals of the substrate member are formed in the peripheral portion. The short-circuit means has an electrically conductive contact face which is to be contacted with the substrate member. The rubbing means may be implemented by a device such as that having a rubbing roller, and rubs a surface of the orientation member of the substrate member while pressing the surface, thereby conducting the rubbing process.

The rubbing process is done in the state where the short-circuit means is contacted with the substrate member held by the holding means as described above and all the terminals of the substrate member are electrically short-circuited. When the rubbing process is ended, the short-circuit means is separated from the substrate member.

During the rubbing process, static electricity is generated by the friction between the surface of the orientation member of the substrate member and the rubbing means, etc. Since all the terminals are electrically short-circuited, charges due to static electricity are prevented from concentrating to a specific electrode to charge the electrode. This can prevent an electric discharge between electrodes, so that the substrate member is not electrostatically destroyed.

The short-circuit means can be repeatedly used for a plurality of substrate members. As compared with the case in the prior art where a conductive tape or a conductive resin is used, the manufacturing cost of the display device can be reduced.

When the short-circuit means is to be separated from the substrate member after the end of the rubbing process, unlike the prior art, conductive carbon or conductive particles do not remain on the terminal portion of the substrate member, so that the short-circuit means is surely separated from the substrate member.

The terminals of the substrate member can rapidly be short-circuited by contacting the short-circuit means with the substrate member. The short-circuit means can quickly be removed away from the substrate member by separating the short-circuit means from the substrate member.

According to the invention, the apparatus for producing a display device pastes a polarizing film to a surface of a display panel in which a liquid crystal material is interposed between two substrate members each having a surface on which a plurality of electrodes are formed, the surfaces of the substrate members opposing to each other, and a plurality of terminals through which a drive signal is supplied to the electrodes are formed on the other surfaces of the substrate members which do not oppose each other, and comprises holding means, short-circuit means, conducting means, and pasting means, The display panel is attracted to a mounting face of the holding means to be held. The short-circuit means is disposed so that it can be contacted with and separated from a region where terminals of the display panel held by the holding means and directed upward with respect to the mounting face are formed. The short-circuit means has a contact face which is to be contacted with the display panel and which is electrically conductive. The conducting means is disposed so that it can be contacted with and separated from a region where terminals of the display panel held by the holding means and directed downward with respect to the mounting face are formed. The conducting means has an electrically conductive contact face which is to be contacted with the display panel. The pasting means may be implemented by a device such as that having a pasting roller. For example, a polarizing film on one surface of which an adhesive is applied is placed on a surface of the display panel, and another surface of the polarizing film is rubbed while pressing the surface, thereby pasting the polarizing film to the display panel.

The operation of pasting a polarizing film to a display panel is conducted by the pasting means in the state where the short-circuit means and the conducting means are contacted with the display panel held by the holding means as described above, and all the terminals directed upward or downward in relation to the mounting face of the holding means are electrically short-circuited. When the operation of pasting the polarizing film, the short-circuit means is separated from the display panel.

During the operation of pasting the polarizing film to the display panel, static electricity is generated by the friction between the polarizing film and the pasting means, etc. Since all the terminals directed upward or downward are electrically short-circuited, charges due to static electricity are prevented from concentrating to a specific electrode to charge the electrode. This can prevent an electric discharge between electrodes, so that the display panel is not electrostatically destroyed. Furthermore, it is possible to prevent generated electrostatic charges from entering a specific electrode, whereby the display panel is made free from display unevenness.

Unlike the prior art, the short-circuited state of the terminals of the display panel is realized without using a conductive tape or a conductive resin. When the operation of pasting the polarizing film to the display panel is ended, therefore, the short-circuit means and the conducting means can be surely separated from the substrate member.

The short-circuit means and the conducting means can be repeatedly used for a plurality of display panels. As compared with the case in the prior art where a conductive tape or a conductive resin is used, the material cost of a conductive tape or a conductive resin can be reduced.

The terminals of the display panel can rapidly be short-circuited by contacting the short-circuit means with the display panel. The short-circuit means can quickly be removed away from the display panel by separating the short-circuit means from the display panel.

As the display panel is attracted by the holding means to be held, the conducting means is contacted with the terminals of the display panel which are directed downward in relation to the mounting face. Therefore, the terminals of the display panel which are directed downward in relation to the mounting face can be quickly short-circuited.

According to the invention, the apparatus for manufacturing a display device pastes a polarizing film to a display panel in which a liquid crystal material is interposed between two substrate members having different sizes, a plurality of electrodes and a plurality of switching elements which are connected to the electrodes are formed on a surface of the larger substrate member, which confronts the smaller substrate member, and a plurality of terminals through which a drive signal is supplied to the electrodes are formed on the other surface of the larger substrate member which does not confront the smaller substrate member, and comprises first and second holding means, short-circuit means, conducting means, and pasting means.

When a polarizing film is to be pasted to the smaller substrate member, the display panel is held by the first holding means. The first holding means has a mounting face on which the display panel is to be mounted, and attracts the display panel so that the terminals of the display panel are directed upward in relation to the mounting face, thereby holding the display panel. When the display panel is held by the first holding means, the short-circuit means is contacted with a region where terminals of the display panel which are directed upward in relation to the mounting face are formed. The face of the short-circuit means which is contacted with the display panel is electrically conductive, and therefore all the terminals of the display panel are short-circuited.

When a polarizing film is to be pasted to the larger substrate member, the display panel is held by the second holding means. The second holding means has a mounting face on which the display panel is to be mounted, and attracts the display panel so that the terminals of the display panel are directed downward in relation to the mounting face, thereby holding the display panel. When the display panel is held by the second holding means, the conducting means is contacted with a region where terminals of the display panel which are directed downward in relation to the mounting face are formed. The face of the conducting means which is contacted with the display panel is electrically conductive, and therefore all the terminals of the display panel are short-circuited.

The pasting means may be implemented by a device such as that having a pasting roller. For example, a polarizing film on one surface of which an adhesive is applied is placed on a surface of the display panel so that the surface of the film opposes the that of the panel, and another surface of the polarizing film is rubbed while pressing the surface, thereby pasting the polarizing film to the display panel.

The operation of pasting a polarizing film to the display panel by using the pasting means is conducted in the state where the short-circuit means or the conducting means is contacted with the display panel held by the first or second holding means as described above. When the operation of pasting the polarizing film to the display panel is ended, the short-circuit means is separated from the display panel.

During the operation of pasting the polarizing film to the display panel, static electricity is generated by the friction between the polarizing film and the pasting means, etc. Since all the terminals are electrically short-circuited, charges due to static electricity are prevented from concentrating to a specific electrode to charge the electrode. This can prevent an electric discharge between electrodes, so that the display panel is not electrostatically destroyed. It is possible to prevent generated electrostatic charges from entering a specific electrode, whereby the display panel is made free from display unevenness.

According to the invention, the conductive member which is supported by the support member is pressingly contacted with the terminals by the urging means which utilizes a resilient force of a spring, a pressure of air enclosed in a cylinder, a magnetic attractive force of a magnet, or the like. Since the contacting portion of the conductive member which is pressingly contacted with the terminals has elasticity, the portion which protrudes in a tapered manner is deformed by the pressing force so as to be contacted with the terminals through an adequate contact area. The contact area and the pressing force exerted by the urging means are set to have a minimum value at which the short-circuit state of the terminals can surely be attained.

Therefore the contacting portion of the conductive member which protrudes in a tapered manner is elastically deformed to be pressed against the terminals at an appropriate pressure, and hence no gap is formed between the conductive member and the terminals. As a result, a contacting state between the conductive member and all the terminals which is sure and highly reproducible can be realized by a small pressing force.

According to the invention, when the plate spring is oscillatorily displaced and the conductive member disposed on the plate spring is contacted with the terminals formed on the substrate member, the plate spring is fixed by the fixing means in a slate where the conductive member is pressed against the substrate member.

The fixing means fixes the plate spring by, for example, sucking the plate spring or a member attached to the plate spring to a suction hole formed in the mounting face of the holding means, or magnetically attracting a magnet attached to the plate spring to the mounting face of the holding means which is made of a ferromagnetic material.

Since the conductive member is disposed on the plate spring, the plate spring can adequately be bent in a state where the conductive member is pressed against the terminals. Therefore, the resiliency of the plate spring allows the conductive member to be pressingly contacted with the terminals at an adequate pressing force.

According to the invention, the conductive member is contacted with and separated from the terminals by operating the first and second actuators.

According to the invention, a display panel is first mounted on a transparent holding face of holding means of an apparatus for producing a display panel. The display panel has a structure in which a material having optical properties that are altered by subjecting the material to an electric field is interposed between a pair of transparent substrate members. The pair of substrate members have, on their surfaces which confront each other and are on the side of the material, at least a plurality of display electrodes, and a plurality of terminals which elongate from the display electrodes toward peripheral portions of the corresponding substrate members. Inspection polarizing films are inserted between the holding means and a light source which emits light toward the holding means, and between the holding means and imaging means which is disposed on the side opposite to the light source in relation to the holding means, respectively. The plurality of terminals of one of the substrate members of the display panel are connected with a conductive member, and the plurality of terminals of the other substrate member are connected with another conductive member which is different from the conductive member. A display signal for inspection is supplied from signal outputting means to the conductive members, and an image of a display face of the display panel is taken by the imaging means to inspect the display state.

When the display signal is applied to the display electrodes, the optical properties of the material which is interposed between the pair of transparent substrate members are altered so that the states of the regions, i.e., pixels where the display electrodes of the substrate members confront each other are altered to the display state (turn-on state) where light from the light source is allowed to pass through the material. When all the pixels are turned on, it is judged that there is no break in the display electrodes of the display panel. When there is a pixel which is not turned on, it is judged that there is a break in the electrodes. Furthermore, it is possible to evaluate the display quality including whether display unevenness occurs or not. When the terminals are drawn out in an appropriate manner, moreover, it is possible to inspect whether the display electrodes are short-circuited or not. In the case where the terminals are alternately drawn out, for example, turn-on and turn-off pixels are alternately arranged when a drive signal for inspection is supplied. In the case where turn-on pixels are arranged continuously, it is judged that the display electrodes are short-circuited. Only when there is no display failure as a result of the inspection of the display state, a polarizing film is pasted to a surface of the display panel by the pasting means in a state where the conductive members are connected with the terminals.

The image of the display face of the display panel is taken by the imaging means to inspect whether a foreign material is deposited on the display panel or not. In the case where light from the light source is utilized, for example, the image of foreign matter deposited on the display panel appears as a black image, and, in the case where light entering from the side of the imaging means and reflected from the display panel is utilized, the image of the foreign matter appears as a white image. When it is judged that foreign matter exists as a result of the inspection of whether foreign matter is deposited or not, the foreign matter is removed away. With respect to a display panel in which there is no foreign matter and a display panel from which all foreign matter is removed away, a polarizing film is pasted by the pasting means to a surface of the display panel in a state where the conductive members are connected with the terminals.

As described above, a polarizing film is pasted only when judged that there is no display failure and a foreign material is not deposited as a result of the inspection of the display state and deposition of foreign matter. Consequently, a wasteful attachment of a polarizing film is eliminated, unlike the case where a display failure or foreign material is detected by conducting the inspection of the display state and deposition of foreign matter after the polarizing film is pasted. Therefore, the manufacturing cost can be reduced. Furthermore, a polarizing film is pasted in the state where the conductive member is connected with the terminals elongated from the display electrodes. Therefore, static electricity of hundreds to thousands volts which is generated during an operation of pasting the polarizing film is prevented from being concentrically accumulated into one of the display electrodes, thereby preventing electrostatic destruction. Since the operation of pasting a polarizing film and the inspection of the display state can be conducted by a single manufacturing apparatus, the labor and time for loading a display panel into a production apparatus can be reduced. Moreover, it is possible to install the production apparatus in a smaller space.

As seen from the above, according to the invention, the short-circuit means for short-circuiting the terminals of the substrate member can be repeatedly used for a plurality of substrate members. As compared with the case in the prior art where the operation of pasting a conductive tape, applying a conductive resin, or loading a conductive cover is newly conducted for each substrate member, the material cost of a conductive tape, a conductive resin or a conductive cover can be reduced, so that the production cost of a liquid crystal display device is lowered.

In the prior art, when a conductive tape or a conductive resin is peeled from a substrate member, conductive carbon or conductive particles included in the conductive tape or resin may remain on the terminal portion of the substrate member so that the terminals are kept short-circuited. According to the invention, the short-circuit state of the terminals of the substrate member can be surely canceled by separating the short-circuit means from the substrate member. Therefore, a display defect which may be caused by, for example, conducting an operation of pasting an anisotropic conductive tape to the terminals while adjacent terminal electrodes are short-circuited can be prevented, so that the yield of the process of producing liquid crystal display devices is improved.

In the prior art where a short-circuit state is produced on a substrate member by using a conductive tape, a conductive resin or a conductive cover, the operations of pasting the conductive tape to terminals, applying the conductive resin to terminals, or loading a conductive cover on terminals, and peeling the conductive tape or resin, or removing the conductive cover from the terminals require a prolonged time. In contrast, according to the invention, terminals can rapidly short-circuited by contacting the short-circuit means with the substrate member, and the short-circuit state of the terminals can quickly be canceled by separating the short-circuit means from the substrate member. Therefore, the operations can be conducted easily, and the required time can be shortened, so that the working efficiency is improved. During the operation of removing the conductive member, static electricity is not generated, and a scratch of electrodes, a stain on the substrate member, etc. are not produced by the operations. Consequently, the efficiency of manufacturing a liquid crystal display device can be improved.

According to the invention, the short-circuit means and the conducting means for short-circuiting the terminals of a display panel which are upward or downward directed in relation to the mounting face can repeatedly be used for a plurality of display panels. As compared with the case in the prior art where a conductive tape, a conductive resin or a conductive cover is used, the material cost of a conductive tape, a conductive resin or a conductive cover can be reduced, so that the production cost of a liquid crystal display device is lowered.

In the prior art, when a conductive tape or a conductive resin is peeled from a display panel, conductive carbon or conductive particles included in the conductive tape or resin may remain on the terminal portion, so that the terminals are kept short-circuited. According to the invention, the short-circuit state of the terminals of the display panel which are directed upward in relation to the mounting face can be surely canceled by separating the short-circuit means from the display panel, and the short-circuit state of the conducting means and the terminals of the display panel which are directed downward in relation to the mounting face can surely be canceled by removing the display panel from the holding means. Therefore, the yield of liquid crystal display devices is improved.

As compared with the operations of pasting a conductive tape to, applying a conductive resin to, or loading a conductive cover on a display panel, and peeling the conductive tape or resin from, or removing the conductive cover from the display panel in the prior art, the operations of approaching and separating the short-circuit means from the display panel are conducted more easily, and the time required for the operations can be shortened. Consequently, the working efficiency can be improved, and the efficiency of manufacturing a liquid crystal display device can be improved.

Since the display panel is attracted by the holding means to be held, the conducting means is contacted with the terminals of the display panel which are directed downward with respect to the mounting face. Therefore, the short-circuiting operation is easier than that in the prior art where a conductive tape or a conductive resin is used, and the time required for the operation can be shortened, whereby the working efficiency is improved. During the operation of removing the conductive member, static electricity is not generated, and a scratch of electrodes, a stain on the substrate member, etc. are not produced by the operation. Consequently, the efficiency of producing a liquid crystal display device can be improved.

Since the terminals are short-circuited by the short-circuit means and the conducting means, static electricity which is generated during the rubbing process and the operation of pasting a polarizing film can be eliminated by a relatively simple structure, and the working process can be simplified.

BRIEF DESCRIPTION OF THE DRAWINGS

Other and further objects, features, and advantages of the invention will be more explicit from the following detailed description taken with reference to the drawings wherein:

FIG. 13 is a perspective view showing the state where a display panel 42 is mounted on the stage 43;

FIG. 21 is a plan view of a display panel 42a;

FIG. 29 is a production flow chart showing steps of a method of manufacturing a display device of still another embodiment of the invention;

DETAILED DESCRIPTION OF THE PREFERRED EMBODIMENTS

Figure 1:
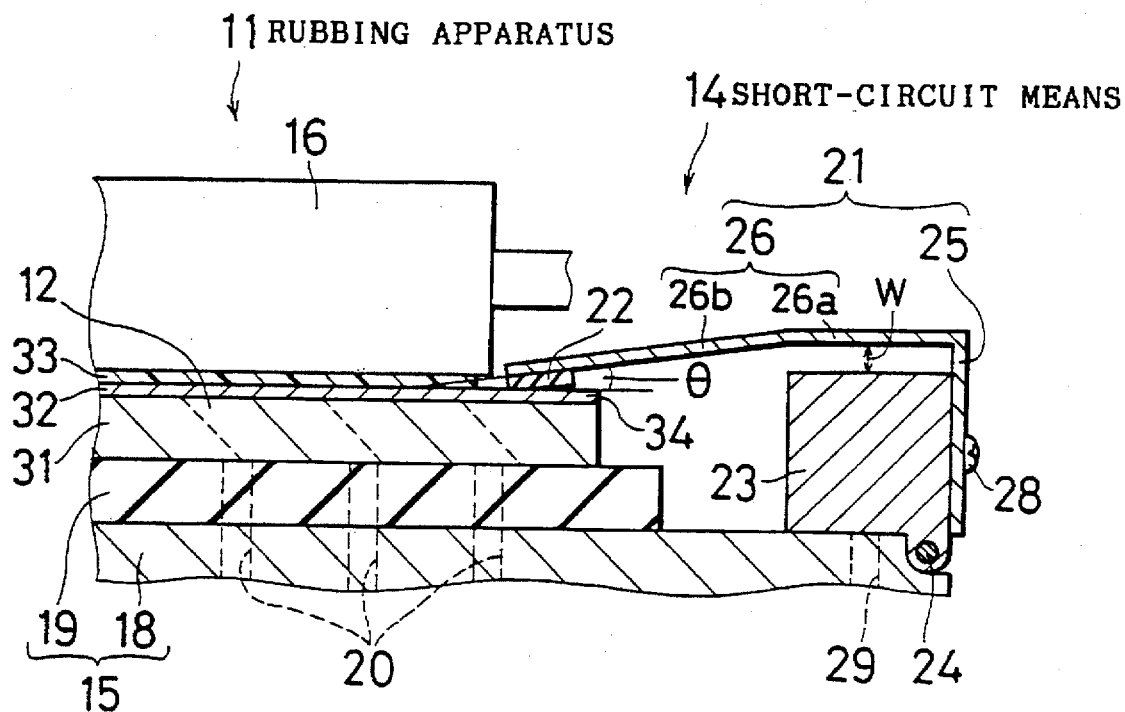
FIG. 1 is a sectional view partially showing the configuration of a rubbing apparatus 11 of an embodiment of the invention.

Now referring to the drawings, preferred embodiments of the invention are described below.

Figure 2:
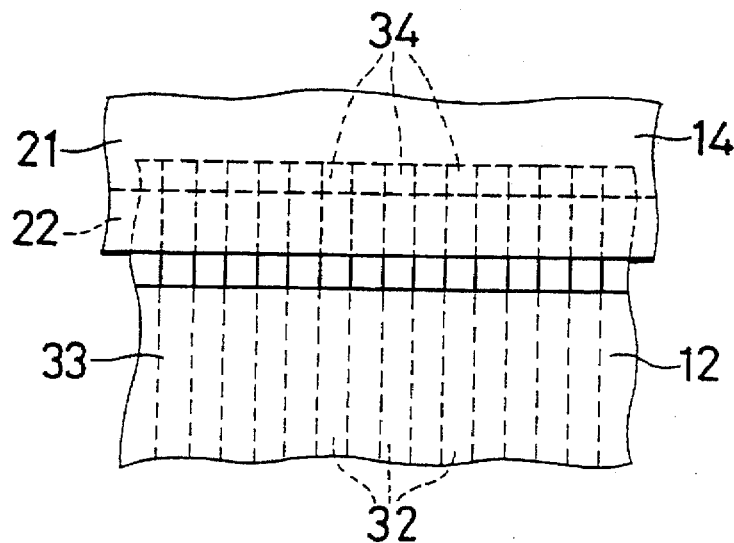
FIG. 2 is a plan view partially showing the configuration of the rubbing apparatus 11 and a substrate member 12.
Figure 3:
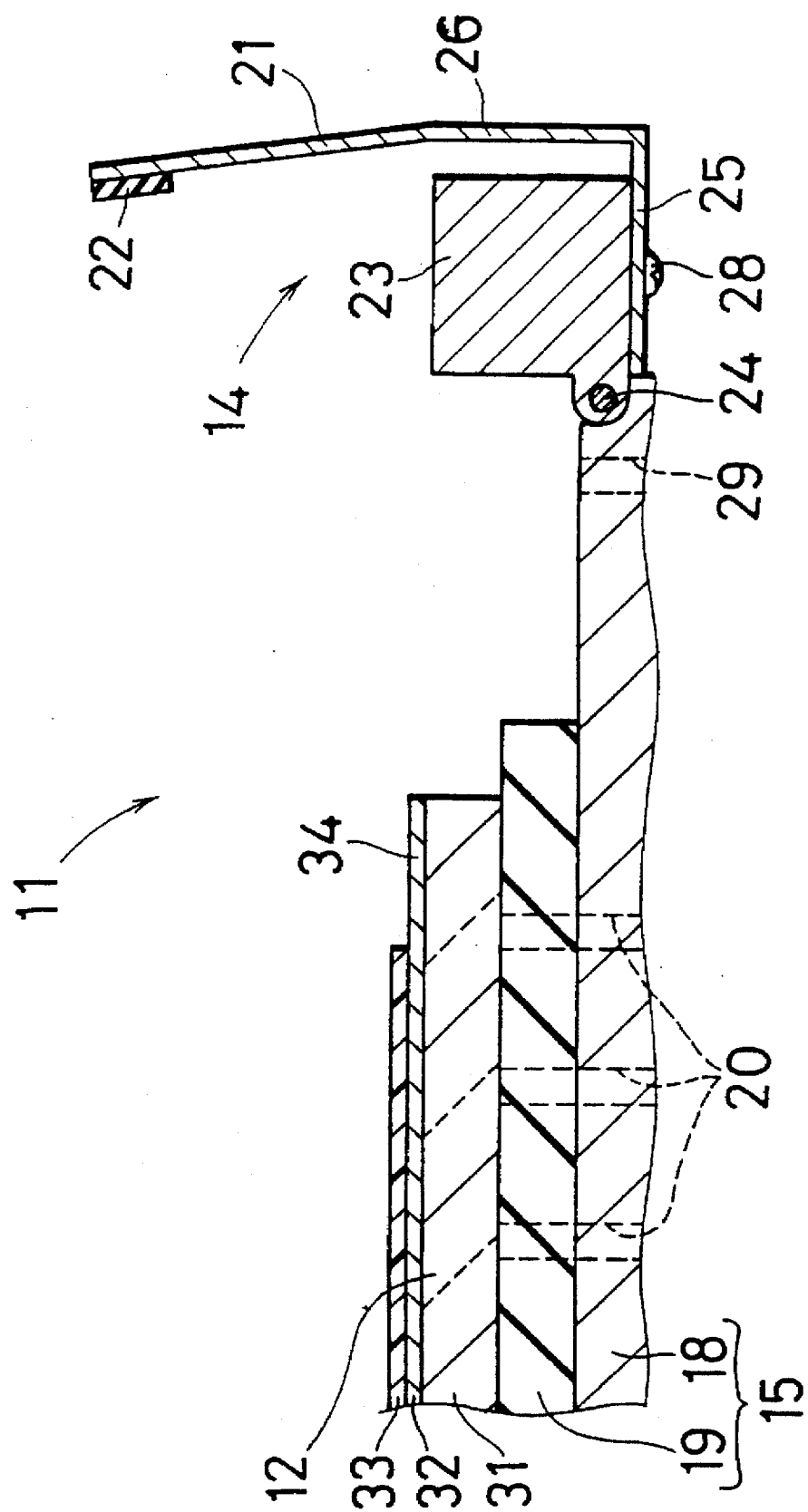
FIG. 3 is a sectional view partially showing the configuration of the rubbing apparatus 11 and the substrate member 12.
Figure 4:
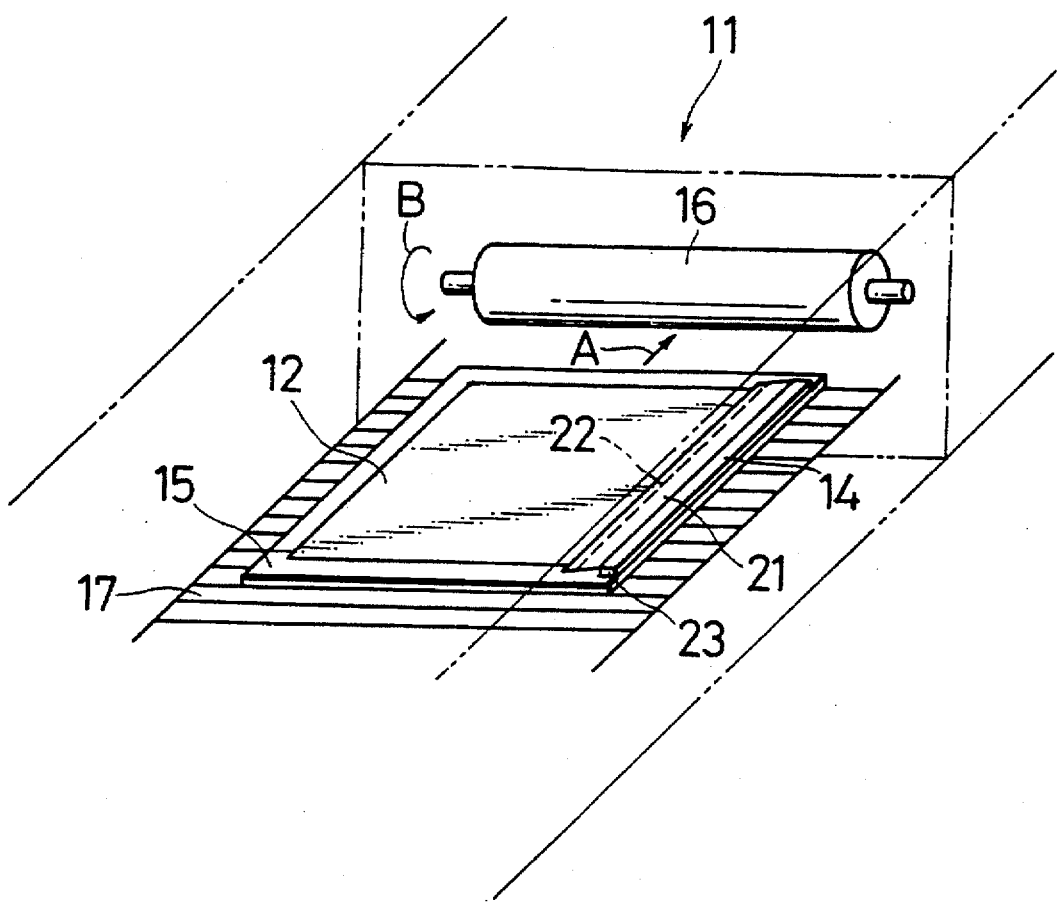
FIG. 4 is a schematic perspective view showing the configuration of the rubbing apparatus 11 and the substrate member 12.

FIG. 1 is a sectional view partially showing the configuration of a rubbing apparatus 11 which is an embodiment of the invention, and shows the state where a rubbing process is conducted on a substrate member 12. FIG. 2 is a partial plan view of the rubbing apparatus 11 and the substrate member 12, and shows the state where terminal electrodes 34 are short-circuited by short-circuit means 14. FIG. 3 is a sectional view partially showing the configuration of the rubbing apparatus 11, and shows the state where the short-circuit means 14 is not contacted with the substrate member 12. FIG. 4 is a perspective view showing the whole configuration of the rubbing apparatus 11.

The rubbing apparatus 11 comprises a stage 15 on which the substrate member 12 is to be mounted, the short-circuit means 14 attached to the stage 15, a rubbing roller 16, and a conveyor belt 17.

The stage 15 comprises a base platform 18 which is made of a metal and has a rectangular plate-like shape, and a mounting platform 19 which has a rectangular plate-like shape smaller than that of the base platform 18. The mounting platform 19 is made of an elastic material such as hard rubber, and disposed on the base platform 18 in such a manner that the side faces of the mounting platform 19 are parallel to the corresponding side faces of the base platform 18. A plurality of suction holes 20 are formed in the base platform 18 and the mounting platform 19, in order that, when the substrate member 12 is mounted on the upper face of the mounting platform 19, the lower face of the substrate member 12 is sucked to be fixed to the platform. Also, a plurality of suction holes 29 are formed in a portion of the upper face of the base platform 18 which is in the region where the mounting platform 19 is not mounted and is closely contacted with a lower face of attaching means 23 of the short-circuit means 14 that will be described below. One ends of the suction holes 20, 29 open on the upper face of the stage 15, and the other ends are airtightly connected to a suction port of a suction pump (not shown).

The thus configured stage 15 is disposed on the conveyor belt 17 which is horizontally moved in the transportation direction A by driving means (not shown), in such a manner that two of the side faces of the base platform 18 constituting the stage 15 are parallel to the transportation direction A.

The short-circuit means 14 comprises a plate spring 21, a conductive member 22, and the attaching means 23 which has a thin long rod-like shape having a substantially rectangular section shape. One end (the right end in FIG. 1) of the lower face of the attaching means 29 is connected with one end (the right end in FIG. 1) of the base platform 18 via a hinge 24. This allows the short-circuit means 14 to swing about the hinge 24 between the state where the lower face of the attaching means 23 is closely contacted with the upper face of the base platform 18 as shown in FIG. 1, and that where the two faces are separated by, for example, 90 deg. as shown in FIG. 3.

The metal plate spring 21 has an elongated shape and has a substantially L-like section shape. In FIG. 1, the plate spring 21 comprises an attach portion 25 which is attached by a bolt 28 to the right side face of the attaching means 23, and the body 26 which extends from the upper end of the attach portion 25 toward the center region of the stage 15 in a substantially horizontal direction. The body 26 shown in FIG. 1 consists of a horizontal portion 26a which horizontally extends from the upper end of the attach portion 25, and an inclined portion 26b which extends from the horizontal portion 26a in a substantially horizontal direction while being slightly downward inclined. The conductive member 22 which has a band-like shape and a rectangular section shape is attached to the lower face (the surface confronting the stage 15) at the tip end of the inclined portion 26b, so as to elongate in the arrangement direction of the terminal electrodes 34 of the substrate member 12 that is to be mounted on the stage 15. When the conductive member 22 is contacted with the substrate member 12, the inclined portion 26b forms a small angle H of about 5 to 15k to the upper face of the substrate member 12. The presence of the angle attains an effect that one edge of the belt-like conductive member 22 is contacted with the terminal electrodes 34 of the substrate member 12.

The conductive member 22 is implemented by conductive rubber or the like. When one edge of the conductive member 22 is selectively contacted as described above, the conductive member 22 is elastically deformed with ease by weak pressing force. In cooperation with the resilient force of the plate spring 21, the conductive member 22 can put all the terminal electrodes 34 into a stable short-circuit state. The conductive member 22 is connected with a grounding conductor (not shown) to be electrically grounded. Alternatively, the conductive member 22 may have a structure in which a conductive film is pasted to a surface of a belt-like member made of an elastic material such as rubber. For example, the thickness of the conductive member 22 is set to be 0.4 mm.

The rubbing roller 16 has a structure in which a rubbing member such as felt is wound on the outer face of a roller, and is disposed above the stage 15 in such a manner that the rotation axis is parallel to the upper face of the stage 15 and vertical to the transportation direction A. The rubbing roller 16 is vertically positioned so that, when the substrate member 12 mounted on the stage 15 is transported in the direction A, the surface of the rubbing roller 16 which is rotated at a high speed in the direction B is slidably contacted with the upper face of the substrate member 12.

The substrate member 12 comprises a thin plate-like glass substrate 31, a plurality of strip electrodes 32, an orientation film 33 made of polyimide or the like, and a plurality of terminal electrodes 34. The strip electrodes 32 are formed on one surface of the glass substrate 31 so as to be parallel to each other, and respectively connected to the terminal electrodes 34 formed in the peripheral portion of the surface of the glass substrate 81 on which the strip electrodes 32 are formed. The orientation film 33 is formed on the surface of the glass substrate 31 on which the strip electrodes 32 are formed, so as to cover the strip electrodes 32. A predetermined drive signal is supplied the strip electrodes 32 through the terminal electrodes The thus configured substrate member 12 has either of two structures where the terminal electrodes 34 are formed in one edge of the peripheral portion of the glass substrate 31, and where the terminal electrodes are formed in two opposing edges of the peripheral portion. In the embodiment, it is assumed that a rubbing process is conducted on the substrate member 12 in which the terminal electrodes 84 are formed only in one edge of the peripheral portion.

When a rubbing process is to be conducted in the thus configured rubbing apparatus 11, the substrate member 12 is mounted at a predetermined position of the mounting platform 19 of the stage 15 so that the terminal electrodes 84 of the substrate member 12 are positioned in the right side in FIG. 1 and the arrangement direction of the terminal electrodes 84 is parallel to the transportation direction A shown in FIG. 4. When the substrate member 12 is to be mounted on and removed from the stage 15, the short-circuit means 14 has the opened state as shown in FIG. 3 so as not to obstruct the operations of mounting and removing the substrate member 12.

After the substrate member 12 is mounted on the stage 15, the short-circuit means 14 is set to be in a closed state shown in FIGS. 1 and 2. In this state, the conductive member 22 of the short-circuit means 14 is contacted with all the terminal electrodes 34. When the pump performs the suction operation through the suction holes 20 and 29 in this state, the substrate member 12 and the attaching means 23 of the short-circuit means 14 are sucked to the stage 15 to be fixed thereto. At the same time when the attaching means 23 is sucked to the stage 15, the conductive member 22 is pressed against to the terminal electrodes 34 by a predetermined pressing force due to the resilience of the plate spring 21. As a result, all the terminal electrodes 34 are short-circuited by the conductive member 22, and electrically grounded through the grounding conductor (not shown) which is connected to the conductive member 22.

The pressing force which is exerted by the plate spring 21 to the terminal electrodes 34 of the conductive member 22 can be adjusted by changing the distance W between the upper face of the attaching means 23 and the horizontal portion 26a of the plate spring 21. Specifically, the pressing force is increased by reducing the distance W, and reduced by increasing the distance W. For example, the pressing force of the plate spring 21 is set to be 200 to 500 gr. The suction operation of the pump is continued until the rubbing process which will be described below is ended.

The rubbing apparatus 11 conducts the rubbing process as follows. When the substrate member 12 mounted on the stage 15 and transported by the conveyor belt 17 in the transportation direction A passes below the rubbing roller 16 which is rotated at a high speed in the direction B, the orientation film 33 placed on the upper face of the substrate member 12 is rubbed with the rubbing roller 16, while being pressed downward, thereby conducting the rubbing process. The distance between the rubbing roller 16 and the upper face of the mounting platform 19 of the stage 15 is previously set to be slightly shorter than the thickness of the substrate member 12. When the transported substrate member 12 is clamped between the rubbing roller 16 and the stage 15, therefore, the upper face of the substrate member 12 can adequately be pressed by the rubbing roller 16.

Figure 5:
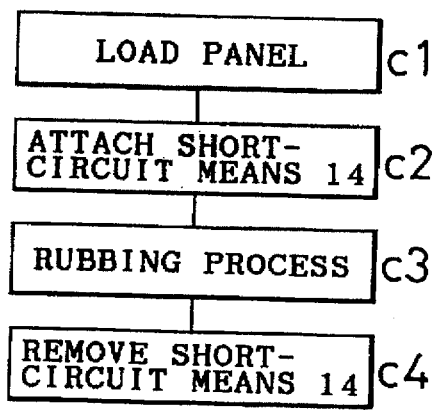
FIG. 5 is a production flow chart showing steps of a rubbing process conducted by the rubbing apparatus 11.

FIG. 5 is a production flow chart showing steps of the rubbing process conducted by the rubbing apparatus 11. At step c1, the substrate member 12 is loaded into the rubbing apparatus 11 and mounted on a predetermined position of the stage 15. Then the operation advances to step c2 in which the state of the short-circuit means 14 is changed from the opened state shown in FIG. 3 to the closed state shown in FIG. 1, and the short-circuit means 14 is attached to the substrate member 12. When the pump then performs the suction operation, the substrate member 12 and the attaching means 23 are sucked to the stage 15 to be fixed thereto, and all the terminal electrodes 34 are short-circuited and grounded by the conductive member 22.

At step c3, the substrate member 12 which is mounted on and fixed to the stage 15 is transported by the conveyor belt 17, and the orientation film 33 is rubbed with the rubbing roller 16 which is rotated at a high speed, thereby conducting the rubbing process. When the substrate member 12 has passed below the rubbing roller 16 and the rubbing process is ended, the operation enters to step c4 in which he suction operation of the pump is stopped, and the short-circuit 14 is opened as shown in FIG. 3 so as to be separated from the substrate member 12.

Figure 6A:
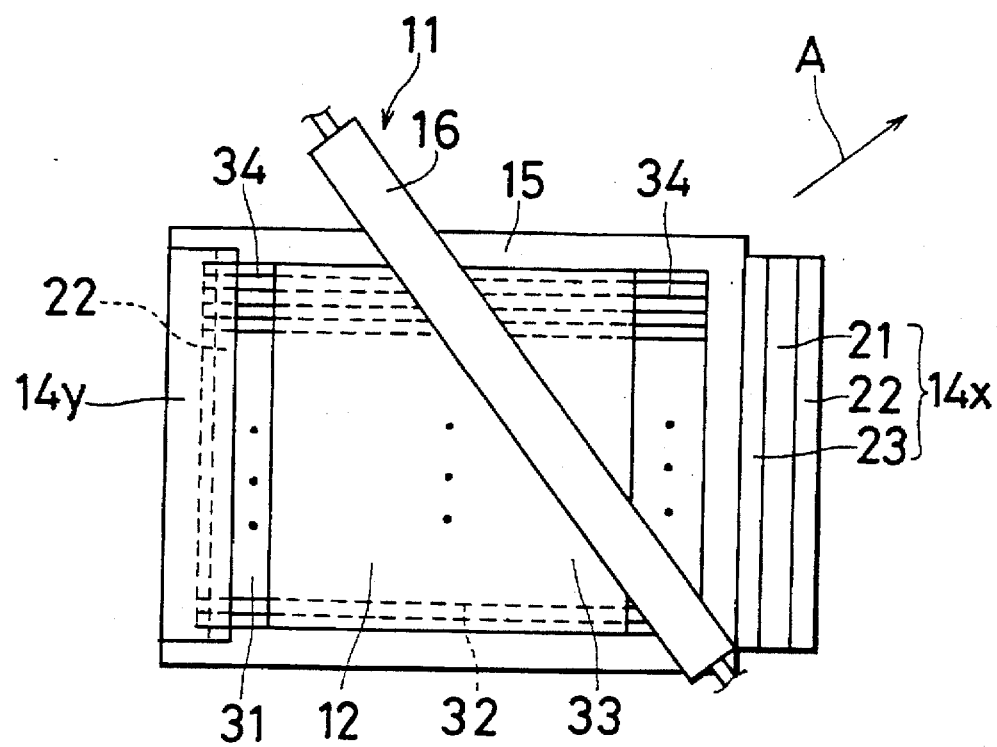
FIGS. 6A, 6B are plan views of the rubbing apparatus 11.
Figure 6B:
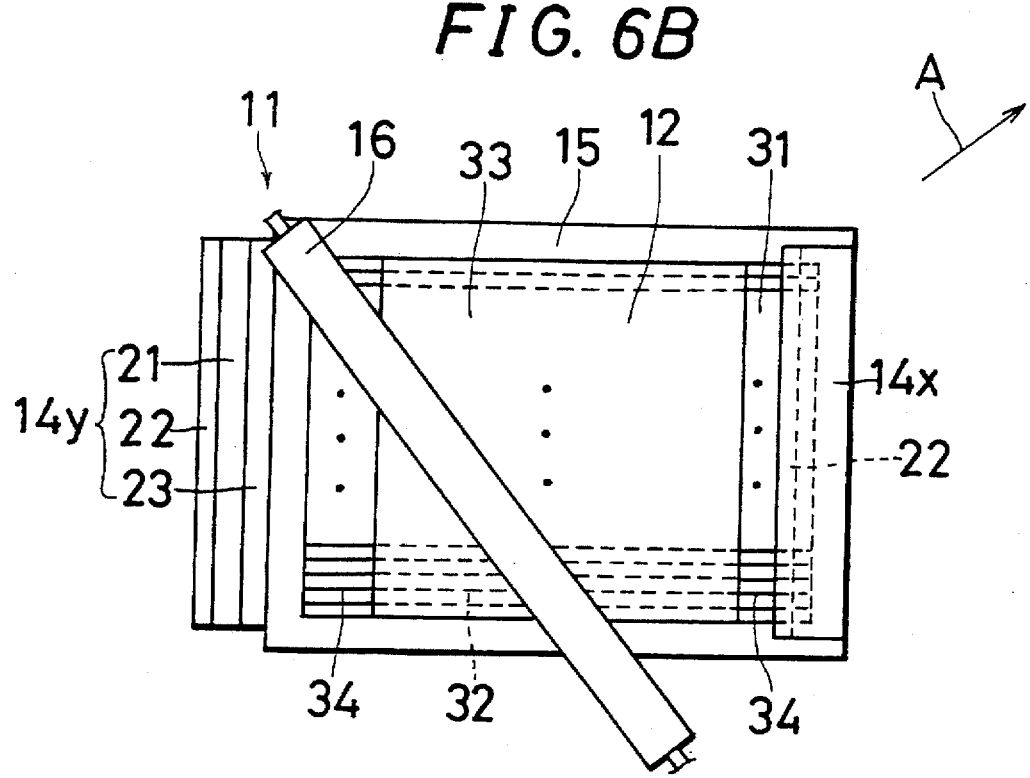

FIGS. 6A and 6B are diagrammatic plan views of the rubbing apparatus 11, and show the state where the rubbing process is conducted on the substrate member 12 in a direction of a diagonal line of the substrate member 12. When the rubbing process is conducted in a direction of a diagonal line of the substrate member 12, the terminal electrodes 34 which are connected with the strip electrodes 32 of the substrate member 12 are formed in two opposing edges of the substrate member 12. To comply with this, a pair of short-circuit means 14x, 14y having the same configuration as that of the short-circuit means 14 are attached in two opposing edges of the stage 15, respectively. The terminal electrodes 34 in the both edges are connected to the respective common strip electrodes 32 and electrically connected to each other.

When the substrate member 12 is mounted on the stage 15, the stage 15 is turned so that the rubbing angle which is an angle of the substrate member 12 to the transportation direction A is set to have a predetermined value. After the rubbing angle is set, the stage is fixed so as not to turn, and the short-circuit means 14y on the upstream side in the transportation direction A is contacted with the substrate member 12. The stage 15 in this state is transported in the transportation direction A, and the rubbing process is conducted on the substrate member 12 by the rubbing roller 16 as shown in FIG. 6A. The rubbing process is continued until the rubbing roller 16 passes through the center portion of the substrate member 12. During this process, the short-circuit means 14x on the downstream side in the transportation direction A is separated from the terminal electrodes 54 of the substrate member 12 or separated from the upper face of the stage 15 by at least an angle of 180k so as not to obstruct the passage of the rubbing roller 16.

When the rubbing roller 16 pass through the center portion of the substrate member 12, as shown in FIG. 6B, the short-circuit means 14y on the upstream side in the transportation direction A which has been contacted with the substrate member 12 is separated from the substrate member 12, and at the same time the short-circuit means 14x in the downstream side in the transportation direction A which has been separated from the terminal electrodes 34 is contacted with the substrate member 12. The stage 15 in this state is transported as it is in the transportation direction A, and the rubbing process is conducted on the remaining half of the substrate member 12. During this process, the short-circuit means 14y in the upstream side in the transportation direction A is separated from the upper face of the stage 15 by at least an angle of 180° so as not to obstruct the passage of the rubbing roller 16.

Figure 7:
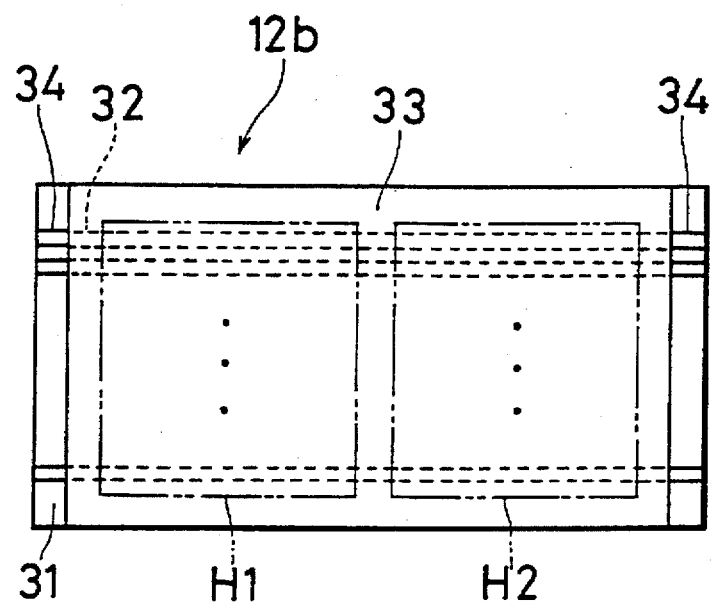
FIG. 7 is a plan view of a substrate member 12b.

FIG. 7 is a plan view showing the configuration of another substrate member 12b. The substrate member 12b has a structure which is roughly similar to that of the substrate member 12. Corresponding portions are designated by the same reference numerals, and their detailed description is omitted. The substrate member 12b has two regions H1, H2 indicated by two-dot chain lines. After the rubbing process is conducted, the portions corresponding to regions H1, H2 are cut out so that the substrate member 12b is divided into two substrate members.

In the case where the rubbing roller 16 is too large for one substrate member or spreads over the terminals of the two edges of the substrate member, the rubbing process may be conducted on a large substrate member which includes two or more substrate members as described above, and the large substrate member is then divided into two or more substrate members having a predetermined size.

As seen from the above, in the rubbing apparatus 11, all the terminal electrodes 34 are short-circuited by the short-circuit means 14 when the rubbing process is conducted by rubbing the orientation film 33 of the substrate member 12 with the rubbing roller 16. Even when static electricity is generated as a result of the rubbing process, therefore, charges due to static electricity are prevented from concentrating to a specific one of the strip electrode 32. This can prevent an electric discharge between strip electrodes 32, so that the substrate member is not electrostatically destroyed. Since all the terminal electrodes 34 are electrically grounded through the ground line which is connected to the conductive member 22, charges due to static electricity in the strip electrodes 32 can rapidly be removed away, so that electrostatic destruction is more surely prevented from occurring.

The terminal electrodes 34 are short-circuited by the short-circuit means 14 which can repeatedly be used for a plurality of substrate members 12. As compared with the case in the prior art where the operation of pasting a conductive tape, or applying a conductive resin is newly conducted for each substrate member, the material cost of a conductive tape or a conductive resin can be reduced so that the manufacturing cost of a liquid crystal display device is lowered.

In the prior art, when a conductive tape or a conductive resin is peeled from a substrate member, conductive carbon or conductive particles included in the conductive tape or resin may remain on the terminal electrodes so that the terminal electrodes are kept short-circuited. In the embodiment, the terminal electrodes 34 are short-circuited by the short-circuit means 14 provided with the conductive member 22. Therefore, the conductive member 22 can be surely removed from the terminal electrodes 34, so that the yield of liquid crystal display devices is enhanced.

As compared with the operations of pasting a conductive tape to, or applying a conductive resin to a substrate member, and peeling the conductive tape or resin from the substrate member in the prior art, the operations of attaching and removing the short-circuit means 14 from the substrate member 12 are conducted more easily, and the time required for the operations can be shortened. Consequently, the working efficiency can be improved, and the efficiency of producing a liquid crystal display device can be improved.

Figure 8:
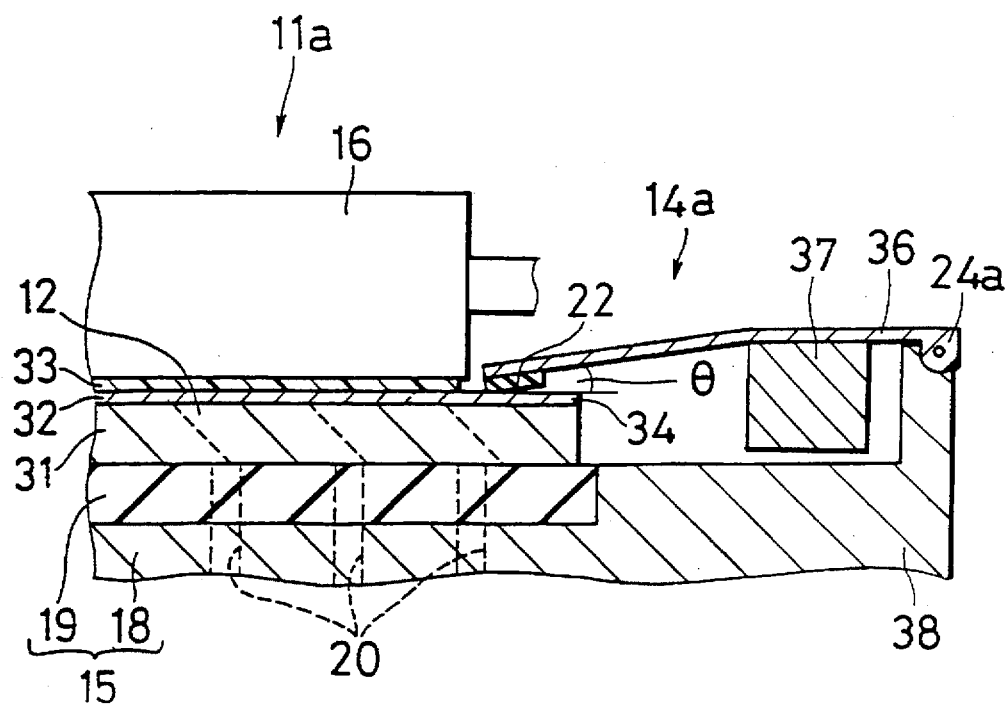
FIG. 8 is a sectional view partially showing the configuration of a rubbing apparatus 11a of another embodiment of the invention.

FIG. 8 is a sectional view partially showing the configuration of a rubbing apparatus 11a of another embodiment of the invention. In FIG. 8, portions corresponding or similar to those of the rubbing apparatus 11 of FIGS. 1–4 are designated by the same reference numerals. The rubbing apparatus 11a is characterized in that short-circuit means 14a is provided in place of the short-circuit means 14 of the rubbing apparatus 11. The short-circuit means 14a comprises a support member 38 which has a plate spring-like shape and to which the above-mentioned conductive member 22 is attached on the lower face at the tip end, and a rod-like permanent magnet 37 or electromagnet which is attached to the lower face of the support member 36 and has a rectangular or circular section shape.

The support member 36 has a shape which is similar to the plate spring shown in FIG. 1. The end of the support member 36 where the conductive member 22 is not attached is connected via a hinge 24a to a mounting portion 38 which protrudes upward from the base platform 18. The short-circuit means 14a is attached to the base platform 18 of the stage 15 in such a manner that the means is angularly displaceable about the hinge 24a.

As shown in FIG. 8, when the substrate member 12 is mounted on a predetermined position of the stage 15, the short-circuit means 14a is attached to the substrate member 12 so that all the terminal electrodes 34 are short-circuited by the conductive member 22 and electrically grounded. The length of the support member 36 in the lateral direction in FIG. 8 is set to be an appropriate value so that, when the short-circuit means 14a is attached to the substrate member 12, the conductive member 22 reaches the terminal electrodes 84.

In the state shown in FIG. 8 where the short-circuit means 14a is attached to the substrate member 12, the conductive member 22 is pressed against the terminal electrodes by the magnetic attractive force generated between the permanent magnet 87 and the base platform 18 which is made of a metallic ferromagnetic material such as stainless steel. In the embodiment, for example, the pressing force of the conductive member 22 against the terminal electrodes 84 is set to be 200 to 500 gr. After the rubbing process is ended, the short-circuit means 14a can be easily separated from the substrate member 12. A gap is formed between the upper face of the base platform 18 and the lower face of the permanent magnet 37. The pressing force of the conductive member 22 against the terminal electrodes 34 can be set to be an appropriate value by setting the size of the gap in accordance with the level of the magnetic force of the permanent magnet 37.

Figure 9A:
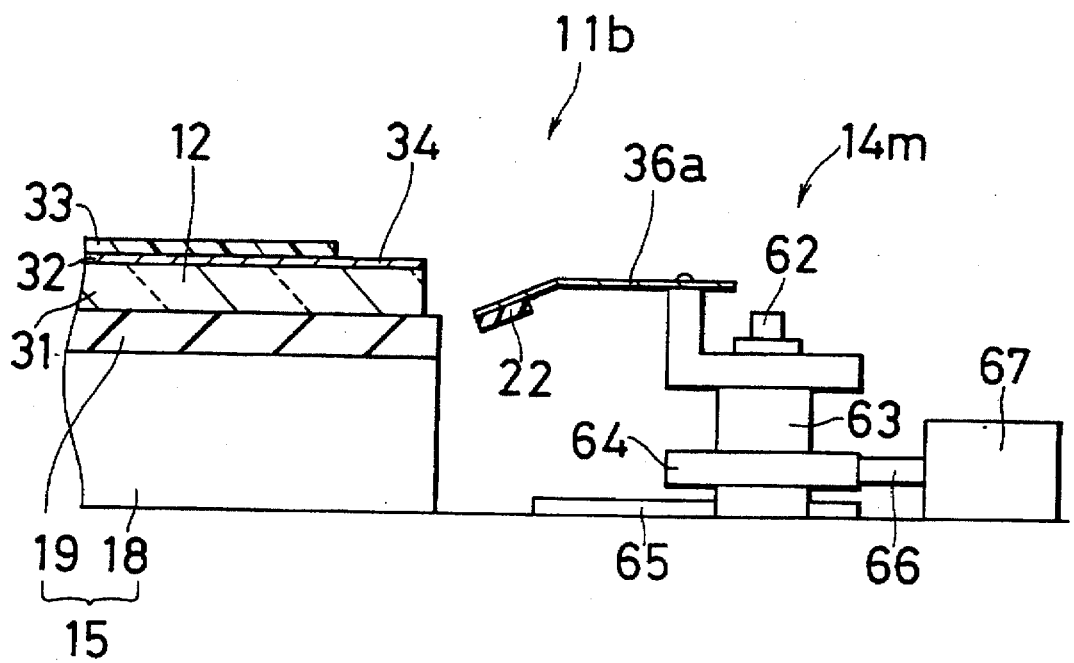
FIGS. 9A, 9B are sectional views partially showing the configuration of a rubbing apparatus 11b of still another embodiment of the invention.
Figure 9B:
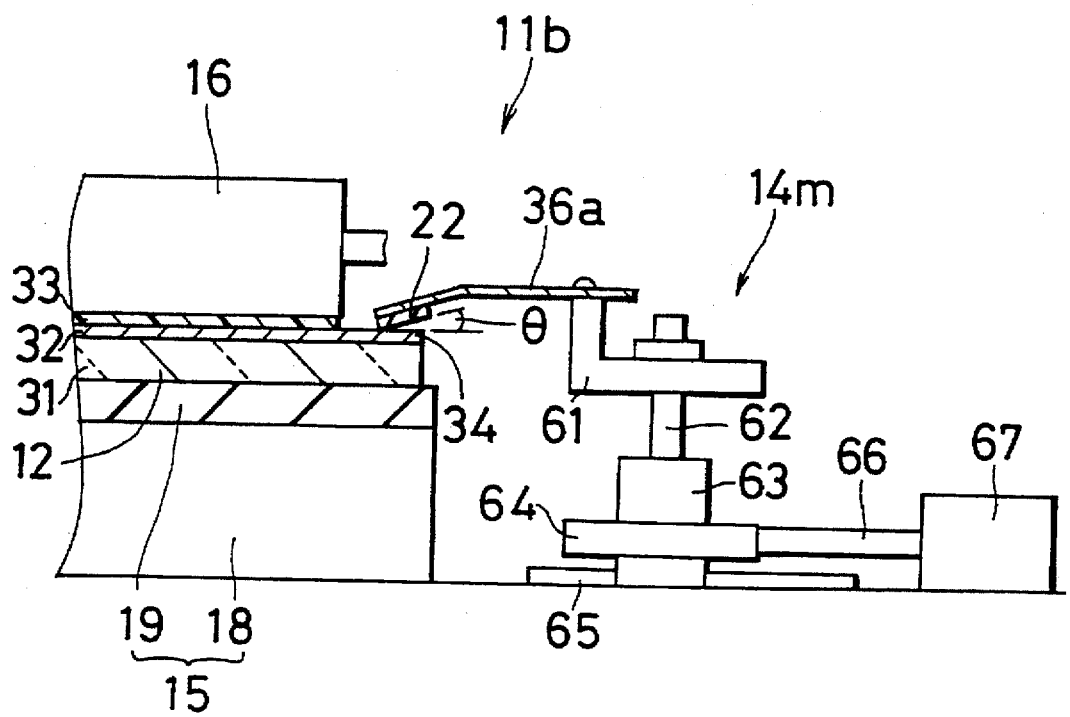

FIGS. 9A, 9B are sectional views partially showing the configuration of a rubbing apparatus 11b which is a further embodiment of the invention. In FIGS. 9A and 9B, portions corresponding or similar to those of the rubbing apparatus 11 of FIGS. 1 to 4 are designated by the same reference numerals and their description is omitted. The rubbing apparatus 11b is characterized in that short-circuit means 14m is provided so that the operations of attaching and separating the conductive member 22 from the terminal electrodes 34 are done by operating two actuators 63 and 67.

A plate spring-like support member 38a to which the substrate member 12 is joined is attached to a driving shaft 62 of the actuator 63 via an attaching member 61. The actuator 63 operates so that the driving shaft 62 is projected or retracted. The actuator 63 is disposed so as to be movable along a rail 65 attached onto the base platform 18 so that the actuator 63 can be made closer and separated from the substrate member 12 mounted on the mounting platform 19. The actuator 63 is coupled with the tip end of a driving shaft 66 of the actuator 67 via an attaching member 64. The actuator 67 is fixed to the base platform 18, and operates so that the driving shaft 62 is projected or retracted, whereby the conductive member 22 is moved in lateral directions in FIGS. 9A and 9B. When the actuator 63 operates so that the driving shaft 62 is projected or retracted, the conductive member 22 is moved in vertical directions in FIGS. 9A and 9B.

The actuators 63 and 67 incorporate a cylinder to which air is supplied from the outside. When the pressures of the cylinders are changed by supplying air to the respective cylinders from an external air supply source which is not shown or discharging air from the cylinders, the corresponding driving shafts 62 and 66 are driven.

When the substrate member 12 is to be mounted on the stage 15 or when the substrate member 12 is to be removed from the stage 15, the driving shaft 66 of the actuator 67 is in the retraction state as shown in FIG. 9A. Therefore, the conductive member 22 and the support member 36a are separated from the mounting platform 19 toward the rightward direction in FIGS. 9A and 9B, so as not to obstruct the operations of mounting and removing the substrate member 12.

When the rubbing process is to be conducted by the roller 16, the actuators 63 and 67 are operated as shown in FIG. 9B so that the conductive member 22 is contacted with the terminal electrodes 34 of the substrate member 12. The pressing force exerted in the contact between the conductive member 22 and the terminal electrodes 34 depends on the relationship between the force of the actuator 63 for retracting the driving shaft 62 and the resilient force of the support member 36a. In the support member 36a, for example, the distance between the tip end of the support member 36a to which the conductive member 22 is joined and the rear end where the support member 36a is attached to the attaching member 61 may be changed so that the support member 36a is deformed easily or hardly, whereby the pressing force can be easily changed.

Figure 10:
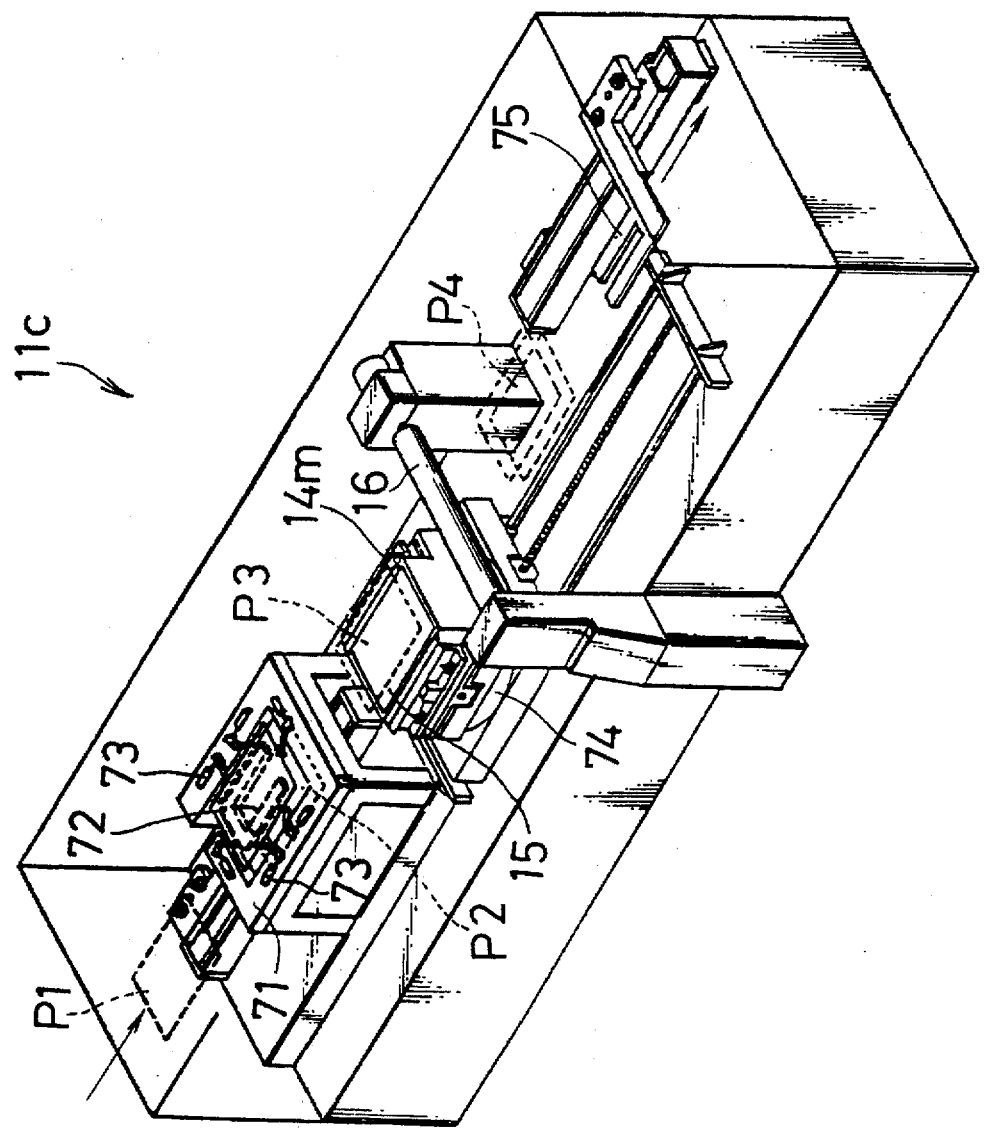
FIG. 10 is a perspective view showing the whole configuration of the rubbing apparatus 11b.

FIG. 10 is a perspective view showing the whole configuration of the rubbing apparatus 11b. The rubbing apparatus 11b is an apparatus which, when the substrate member 12 is loaded from the outside into the rubbing apparatus 11b, can automatically conduct the rubbing process on the substrate member 12 and thereafter unload the substrate member 12.

When the substrate member 12 is sent from the outside to a loading station P1, a transportation arm 72 transports the substrate member 12 in the loading station P1 to a positioning station P2 within a positioning unit 71. In the positioning station P2, the substrate member 12 is positioned at a predetermined position by a plurality of positioning cylinders 43 which are arranged so as to surround the substrate member 12 in the positioning station P2. The substrate member 12 which has been subjected to the positioning process is mounted on the stage 15 of a contact stage 74 which is moved by the transportation arm 72 to a position which opposes a receiving station P3. When the substrate member 12 is mounted on the stage 15 in the receiving station P3, the conductive member 22 of the short-circuit means 14m is contacted with the terminal electrodes 34 of the substrate member 12 so that the terminal electrodes 34 are short-circuited.

When the terminal electrodes 34 are short-circuited in the receiving station P3, the contact stage 74 is turned until a predetermined rubbing angle is attained, and then advanced toward the roller 18. The rubbing process is conducted on the substrate member 12 when the substrate member 12 passes below the roller 16. In the case where the shore-circuit means 14m is formed in the both edges of the substrate member 12, the short-circuit state of the strip electrodes 32 can be maintained by switching the above-described states of FIGS. 6A, 6B in accordance with the movement of the substrate member 12 below the roller 16.

When the substrate member 12 has been passed below the roller 18 and then transported to an unloading station P4, the contact stage 74 is turned to form the original angle which was attained when the substrate member 12 was received in the receiving station P3. A tappet pin disposed in the stage 15 is projected upward so that the substrate member 12 is separated from the stage 15. An unloading arm 75 is inserted between the stage 15 and the substrate member 12, and operates so that the substrate member 12 is unloaded to the outside of the rubbing apparatus 11b.

When the substrate member 12 is unloaded, the contact stage 74 is moved from the unloading station P4 to the receiving station P3, and waits until the next substrate member 12 is loaded into the loading station P1.

In the rubbing apparatuses 11, 11a and 11b of the above-described first to third embodiments, respectively, the single short-circuit means 14, 14a or 14m is attached to the stage 15. Alternatively, two sets of the short-circuit means 14, 14a or 14m may be attached to the both edges of the stage 15, respectively. This configuration can comply with the rubbing process which is conducted on the substrate member 12 where the terminal electrodes 34 are formed in two edges of the peripheral portion of the glass substrate In this case, the terminal electrodes 34 in the both edges are connected to different strip electrodes 32, respectively.

Figure 11:
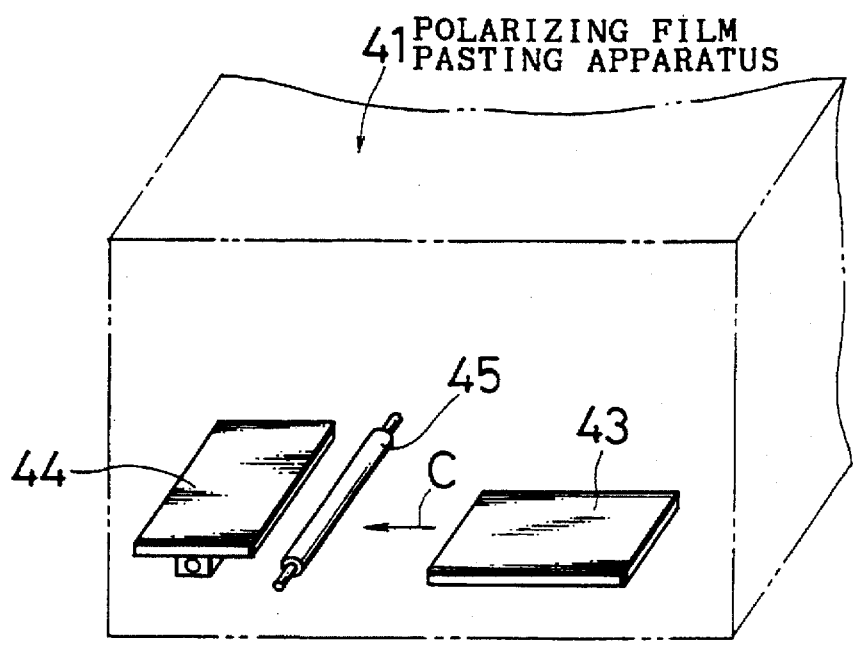
FIG. 11 is a schematic perspective view showing the configuration of a polarizing film pasting apparatus 41 of a still another embodiment of the invention.

FIG. 11 is a schematic perspective view showing the configuration of a polarizing film pasting apparatus 41 of still another embodiment of the invention. The polarizing film pasting apparatus 41 comprises a stage 43 on which a display panel 42 is to be mounted, a polarizing film suction stage 44 which transports a polarizing film 46, and a pasting roller 45. The display panel 42 and the polarizing film 46 will be described below.

Figure 12:
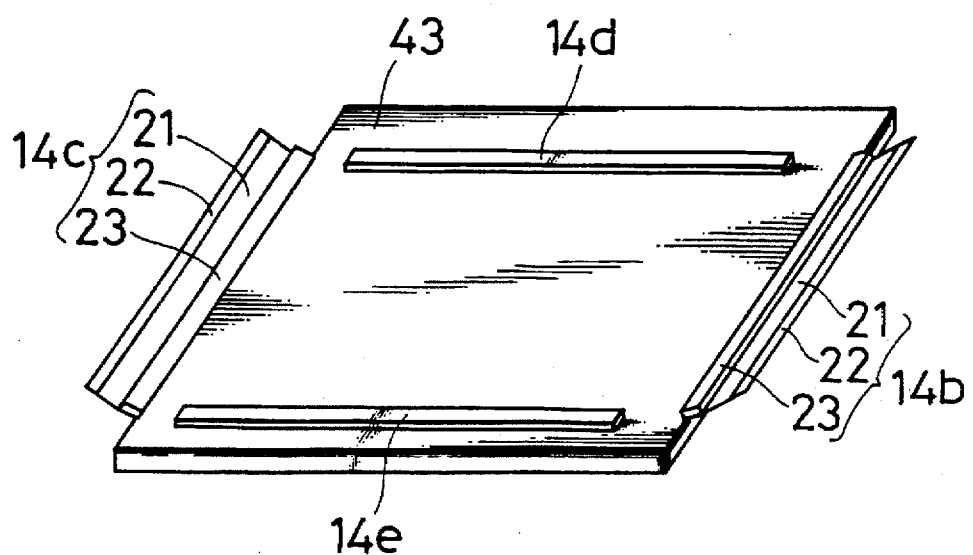
FIG. 12 is a schematic perspective view showing the configuration of a stage 43, and short-circuit means 14b, 14c and conductive members 14d, 14e which are attached to the stage 43.

FIG. 12 is a perspective view showing the configuration of the stage 43, and short-circuit means 14b, 14c and conductive members 14d and 14e which are attached to the stage 43. The stage 43 and the short-circuit means 14b and 14c are structured in the same manner as the stage 15 and the short-circuit means 14 which are used in the above-described rubbing apparatus 11. Corresponding portions are designated by the same reference numerals, and their description is omitted. The conductive members 14d, 14e have a band-like shape and a rectangular section shape, and are made of a material similar to that of the conductive member 22 used in the above-described rubbing apparatuses 11, 11a. The conductive members 14d, 14e are connected to a grounding conductor (not shown) so as to be electrically grounded.

The short-circuit means 14b, 14c are attached to the upper ends of the two side faces of the stage 43 which are parallel to the direction of arrow C in FIG. 11. The conductive means 22 of the short-circuit means 14b, 14c elongate in the direction of arrow C. The conductive members 14d and 14e are arranged at the both edges of the stage 43 at predetermined intervals so as to be parallel to each other and elongate in a direction vertical to the direction of arrow C.

FIG. 13 is a perspective view showing the state where the display panel 42 is mounted on the stage 43. The display panel 42 has a structure wherein two substrate members 12 which have been subjected to the above-mentioned rubbing process are stuck to each other in such a manner that their orientation films 33 confront each other and their strip electrodes 32 are vertical to each other, and liquid crystal 47 is introduced into the space between the two substrate members 12. It is assumed that, in each of the substrate members 12, the terminal electrodes 34 are formed in two edges of the peripheral portion of the glass substrate 31. In order to identify the two substrate members 12 in the display panel 42, the substrate member 12 which is disposed in the upper side when the display panel 42 is mounted on the stage 43, and components included in the substrate member 12 are indicated by affixing a suffix "a" to the reference numerals.

When the thus configured display panel 42 is mounted at a predetermined position of the stage 43 as shown in FIG. 13, the terminal electrodes 34a which are formed on the upper substrate member 12 and directed downward are contacted with the conductive members 14d, 14e, and the short-circuit means 14b, 14c are respectively turned in the directions of the arrows D, E so that the conductive members 22 are contacted with the terminal electrodes 34 which are formed on the lower substrate member 12 and directed upward.

Figure 14:
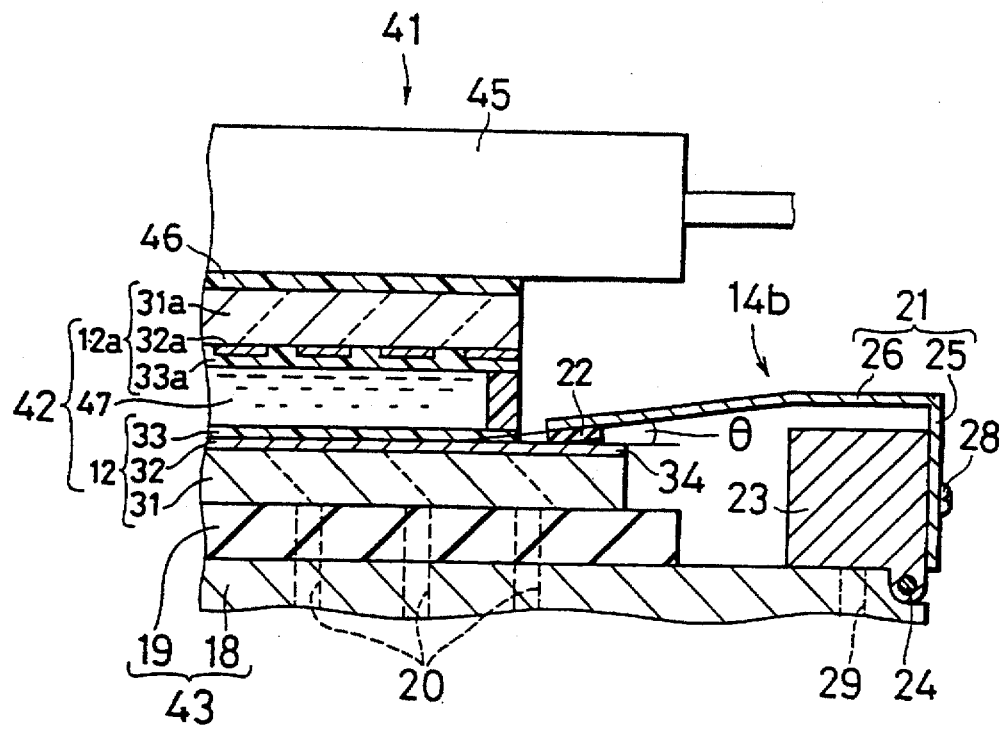
FIG. 14 is a sectional view partially showing the configuration of the polarizing film pasting apparatus 41, taken along a plane vertical to a transportation direction C.
Figure 15:
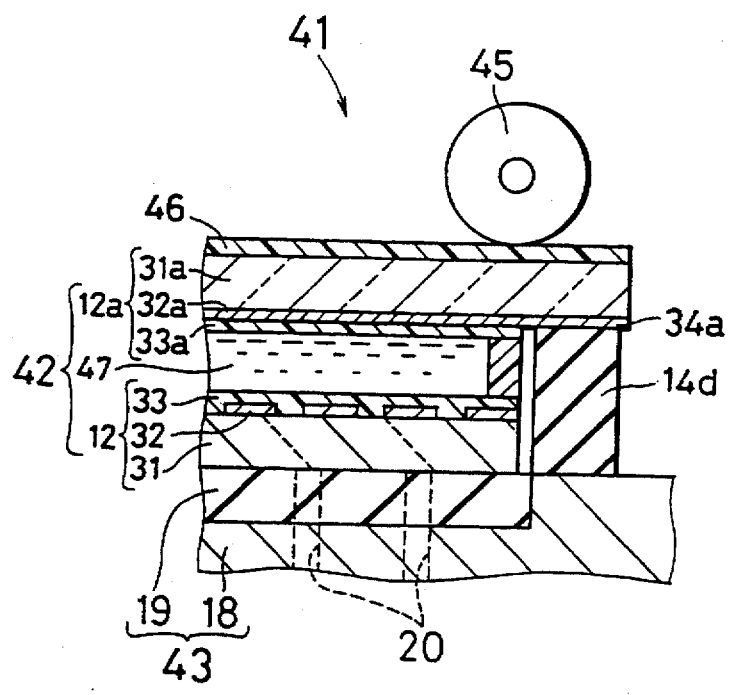
FIG. 15 is a sectional view partially showing the configuration of the polarizing film pasting apparatus 41, taken along a plane parallel to the transportation direction C.

FIG. 14 is a sectional view partially showing the configuration of the polarizing film pasting apparatus 41, taken along a plane vertical to the direction of arrow C, and FIG. 15 is a sectional view partially showing the configuration of the polarizing film pasting apparatus 41, taken along a plane parallel to the direction of arrow C. In FIGS. 14, 15, portions corresponding or similar to those of the rubbing apparatus 11 of FIGS. 1 to 4 are designated by the same reference numerals.

When the display panel 42 is mounted on the stage 43 and the short-circuit means 14b, 14c are attached to the display panel 42, the pump performs the suction operation through the suction holes 20, 29. This suction causes the display panel 42 and the attaching means 23 of the short-circuit means 14b, 14c are sucked to the stage 43 to be fixed thereto. The thickness of the conductive members 14d, 14e in the vertical direction in FIG. 15 is set to have a value which is slightly greater than the distance between the surface of the downward-directed terminal electrodes 34a and the lower face of the display panel 42. When the display panel 42 is sucked to the stage 43, the downward-directed terminal electrodes 34a formed in both edges are pressed at an appropriate pressing force to the conductive members 14d, 14e, whereby all the downward-directed terminal electrodes 34a are short-circuited and electrically grounded.

At the same time, the conductive members 22 of the short-circuit means 14b, 14c are pressed against the upward-directed terminal electrodes 34 formed in both edges. This causes all the upward-directed terminal electrodes 34 to be short-circuited and electrically grounded.

Figure 16A:
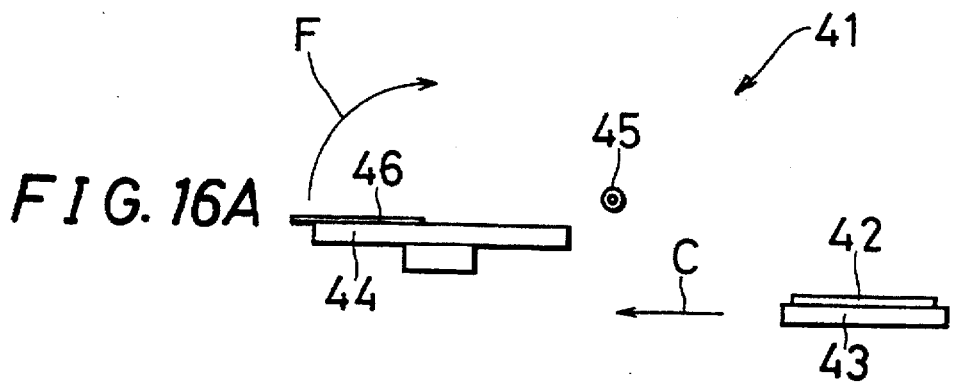
FIGS. 16A–16E are schematic side views of the polarizing film pasting apparatus 41.
Figure 16B:
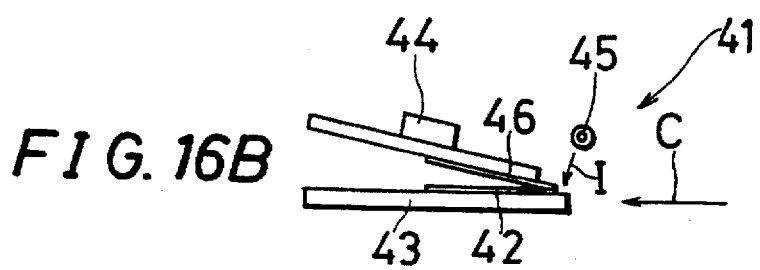
Figure 16C:
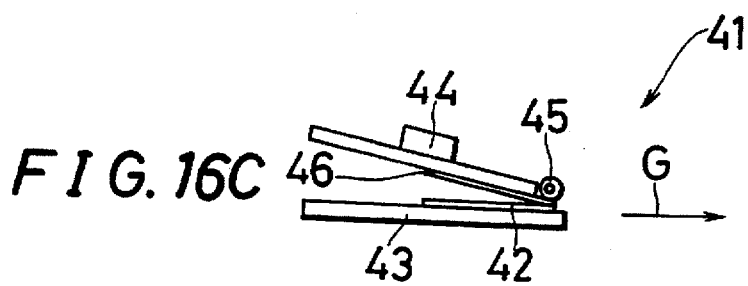

FIGS. 16A–16E are schematic views showing the configuration of the polarizing film pasting apparatus 41, and show the operations conducted when the polarizing film 48 is pasted to the display panel 42. In FIG. 16A, the display panel 42 is mounted on the stage 43, and the polarizing film 46 in which an adhesive material is applied to the face to be contacted with the display panel 42 is sucked and held by the polarizing film suction stage 44. As the display panel 42 is transported by the stage 43 in the direction of arrow C, the display panel 42 is turned in the direction of arrow F to establish the state shown in FIG. 16B. In FIG. 16B, the polarizing film 46 is obliquely contacted with the display panel 42, the edges of the polarizing film 48 and the display panel 42 which are in the upstream side in the direction of arrow C are contacted with each other, and the edges in the downstream side are separated from each other. In this state, the pasting roller 48 is moved in the direction of arrow I, and the state shown in FIG. 16C is obtained.

Figure 16D:
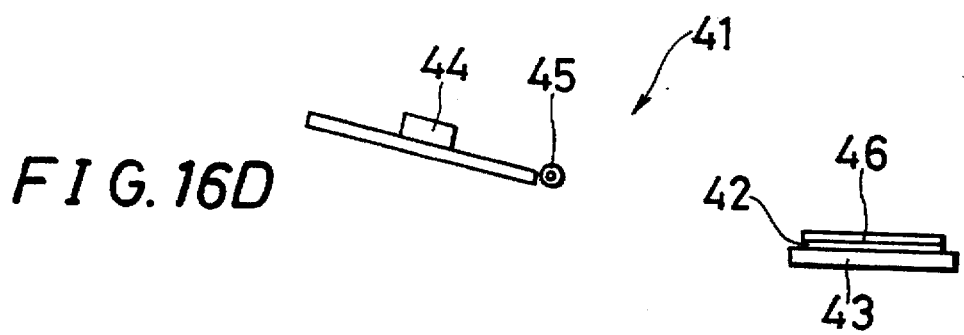

In FIG. 16C, the stage 43 is transported in the direction of arrow G, and the polarizing film 48 is pasted to the display panel 42. As the stage 43 and the display panel 42 are moved in the direction of arrow G, the polarizing film 46 passes below the pasting roller 45 while sliding over the suction face of the polarizing film suction stage 44 in a direction substantially parallel to that of arrow G. During this movement, the pasting roller 45 rubs the polarizing film 46 while pressing it so that the polarizing film 46 is pasted to the display panel 42. As shown in FIG. 16D, when the operation of pasting the polarizing film 46 to the display panel 42 is conducted, the polarizing film suction stage 44 is angularly displaced in the direction opposite to that of arrow F in FIG. 16A to establish the state shown FIG. 16E.

When the operation of pasting the polarizing film to one face is ended, the display panel 42 is turned upside down, and the operation of pasting a polarizing film to the other face is conducted in the same manner, thereby completing the manufacture of a liquid crystal display device.

Figure 17:
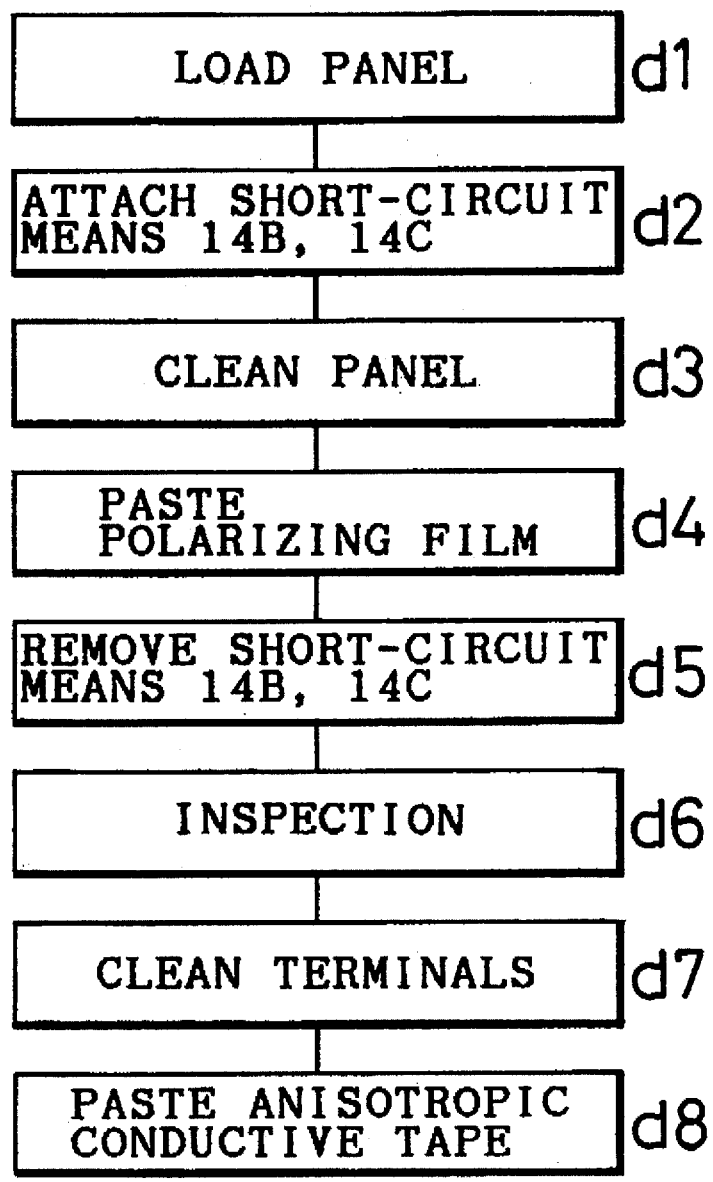
FIG. 17 is a production flow chart showing steps of pasting a polarizing film in which the polarizing film pasting apparatus 41 is used.

FIG. 17 is a production flow chart showing steps of the operation of pasting a polarizing film in which the polarizing film pasting apparatus 41 is used. At step d1, the display panel 42 is loaded into the polarizing film pasting apparatus 41 and mounted on a predetermined position of the stage 43. Then the operation advances to step d2 in which the short-circuit means 14b, 14c are closed in the directions of the arrows D, E so that the conductive members 22 are attached onto the upward-directed terminal electrodes 34. When the pump performs the suction operation, the display panel 42 and the attaching means 23 are fixed to the stage 43, whereby all the upward-directed terminal electrodes 34 are short-circuited by the short-circuit means 14b, 14c and grounded, and all the upward-directed terminal electrodes 34a are short-circuited by the conductive members 14d, 14e and grounded.

At step d3, the surface of the display panel 42 is cleaned. The cleaning operation at step d3 is conducted as follows. First, depositions on the surface of the display panel 42 are removed away by a cutter edge, the surface of the display panel 42 is cleaned by an alcohol with using a cloth of special raise-nap-free fibers, and the surface is further cleaned by an adhesive roller. At step d4, the polarizing film 46 which has been transported by the polarizing film suction stage 44 is pressed against the upper face of the display panel 42 by the pasting roller 45, and rubbed with the display panel to be pasted to After the polarizing films 46 are pasted at step d4 to the both faces of the display panel 42 to complete a liquid crystal display device, the operation proceeds to step d5 in which the short-circuit means 14b and 14c are opened in the directions opposite to the arrows D, E, so that the conductive members 22 are separated from the upward-directed terminal electrodes 34. At step d6, bubbles existing between the pasted polarizing films 46 and the surfaces of the display panel 42 are released (in an autoclave), and then inspections such as ascertainment of the pasted state of the polarizing films 46, and that of a display failure due to break of electrodes in the liquid crystal display device are conducted.

At step d7, the terminal electrodes 34 are cleaned by alcohol or the like so that any foreign matter remains on the terminal electrodes 34, and an anisotropic conductive tape is pasted at step d8 to the upward-directed terminal electrodes 34. Regarding the downward-directed terminal electrodes 34a, the liquid crystal display device is turned upside down, and the cleaning process of step d7 and the operation of pasting an anisotropic conductive tape at step d8 are then conducted.

As seen from the above, in the polarizing film pasting apparatus 41, all the upward- and downward-directed terminal electrodes 34, 34a are short-circuited by the short-circuit means 14b, 14c and the conductive members 14d, 14e when the polarizing films 48 are pasted to the display panel 42, Even when static electricity is generated as a result of the process of rubbing the polarizing film 48 with the pasting roller 45, therefore, charges due to static electricity are prevented from concentrating to specific one of the strip electrodes 32, 32a. This can prevent an electric discharge between strip electrodes 32, 32a, so that electrostatic destruction is prevented.

Also when a laminate is peeled from an adhesive face of a polarizing film 46 to which an adhesive material is applied, static electricity of a high voltage is generated. When the polarizing film 46 charged by the static electricity is transported by the polarizing film suction stage 44 and contacted with the display panel 42, therefore, there is a danger that the display panel 42 is electrostatically destroyed. In the embodiment, such electrostatic destruction is prevented because the strip electrodes 32, 32a are short-circuited.

Since all the upward- and downward-directed terminal electrodes 34, 34a are electrically grounded through the conductive members 22 and the grounding conductor which are connected to the conductive members 14d, 14e, charges due to static electricity in the strip electrodes 32, 32a can rapidly be removed away, so that electrostatic destruction is prevented more surely.

The upward- and downward-directed terminal electrodes 34, 34a are short-circuited by the short-circuit means 14b, 14c and the conductive members 14d, 14e which can repeatedly be used for a plurality of display panels 42. Therefore, the material cost of a conductive tape or a conductive resin which is used in the prior art for short-circuiting terminal electrodes can be reduced, so that the manufacturing cost of a liquid crystal display device is lowered.

In the prior art, when a conductive tape or a conductive resin is peeled from a display panel, conductive carbon or conductive particles may remain on the terminal electrodes, so that the terminal electrodes are kept short-circuited. According to the embodiment, the conductive member 22 and the conductive members 14d, 14e can be surely removed from the upward- and downward-directed terminal electrodes 34, 34a, so that the yield of liquid crystal display devices is enhanced.

As compared with the operations of pasting a conductive tape, applying a conductive resin, or loading a conductive cover to a display panel, and peeling the conductive tape or resin or removing the conductive cover from the display panel in the prior art, the operations of attaching and removing the short-circuit means 14b, 14c from the display panel 42 are conducted more easily, and the time required for the operations can be shortened. Consequently, the working efficiency can be improved, and the efficiency of producing a liquid crystal display device can be improved.

As the display panel 42 is mounted on the stage 43, the downward-directed terminals 34a of the display panel 42 are contacted with the conductive members 14d, 14e, and, as the display panel 42 is sucked to the stage 43, the downward-directed terminals 34a are pressed by the conductive members 14d, 14e so as to be short-circuited. Therefore, the short-circuiting operation is easier than that in the prior art where a conductive tape, a conductive resin or a conductive cover is used, and the time required for the operation can be shortened, whereby the working efficiency is improved. Consequently, the efficiency of manufacturing a liquid crystal display device can be improved.

Figure 18:
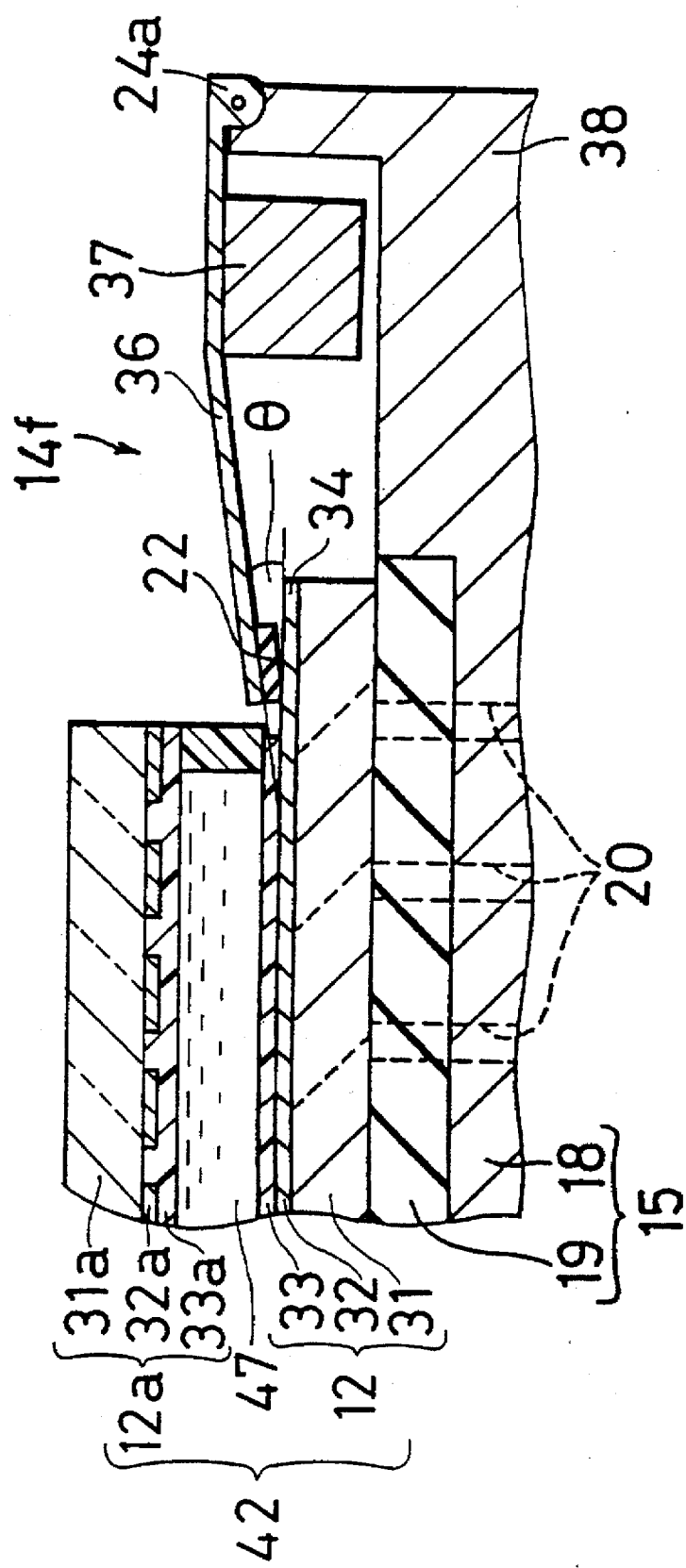
FIG. 18 is a perspective view partially showing the configuration of a polarizing film pasting apparatus 41a of still another embodiment of the invention.

FIG. 18 is a sectional view partially showing the configuration of a polarizing film pasting apparatus 41a of still another embodiment of the invention. In FIG. 18, portions corresponding or similar to those of the rubbing apparatus 11a of FIG. 8 and the polarizing film pasting apparatus 41 of FIGS. 11–15 are designated by the same reference numerals. The polarizing film pasting apparatus 41a is characterized in that short-circuit means 14f, 14g are provided in place of the short-circuit means 14b, 14c of the polarizing film pasting apparatus 41. The short-circuit means 14f, 14g have a structure similar to that of the short-circuit means 14a of the rubbing apparatus 11a of FIG. 8, and therefore their detailed description is omitted.

Figure 19:
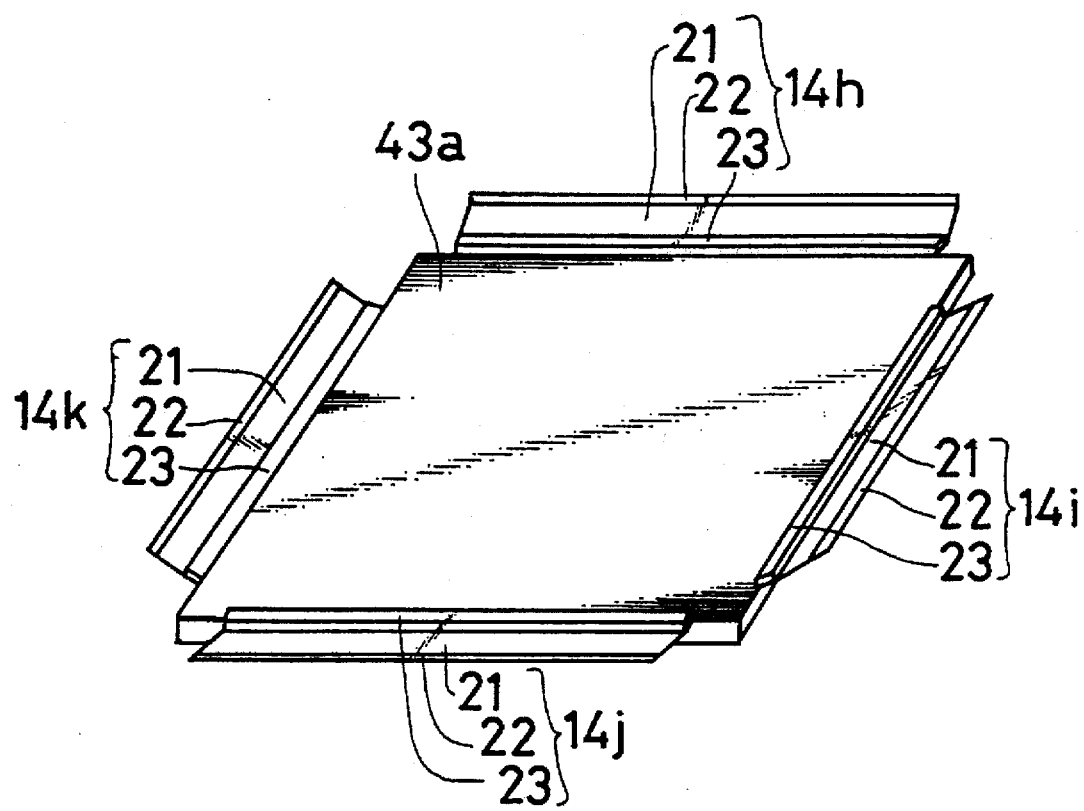
FIG. 19 is a perspective view showing the configuration of a stage 43a and short-circuit means 14h–14k disposed in a polarizing film pasting apparatus of still another embodiment of the invention.
Figure 20:
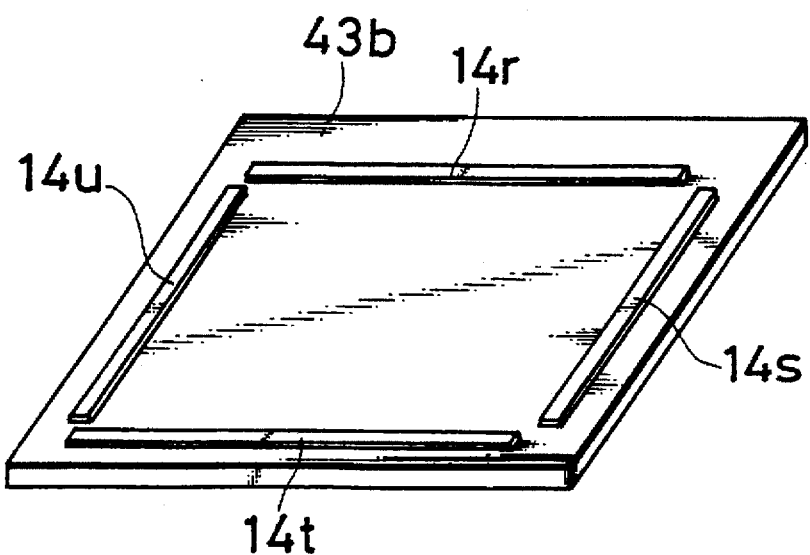
FIG. 20 is a perspective view showing the configuration of a stage 43b and conducting means 14r to 14u disposed in a polarizing film pasting apparatus of still another embodiment of the invention.

FIG. 19 is a perspective view showing the configuration of a stage 43a disposed in a polarizing film pasting apparatus of still another embodiment of the invention, and short-circuit means 14h–14k attached to the stage 43a, and FIG. 20 is a perspective view showing the configuration of a stage 43b disposed in the polarizing film pasting apparatus of the embodiment, and conducting means 14r–14u attached to the stage 43b.

The polarizing film pasting apparatus of the embodiment has a structure which is roughly similar to that of the polarizing film pasting apparatus 41 the above-described embodiment, except that the polarizing film pasting apparatus of the embodiment has the stage 43a to which the four short-circuit means 14h–14k are attached, and the stage 43b to which the four conducting means 14r–14u are attached. The stages 43a, 43b, the short-circuit means 14h–14k, and the conducting means 14r–14u of the embodiment are structured in a similar manner as the stage 43, the short-circuit means 14b, 14c, and the conducting means 14d, 14e which are used in the above-described polarizing film pasting apparatus 41, and therefore their detailed description is omitted.

Figure 21:
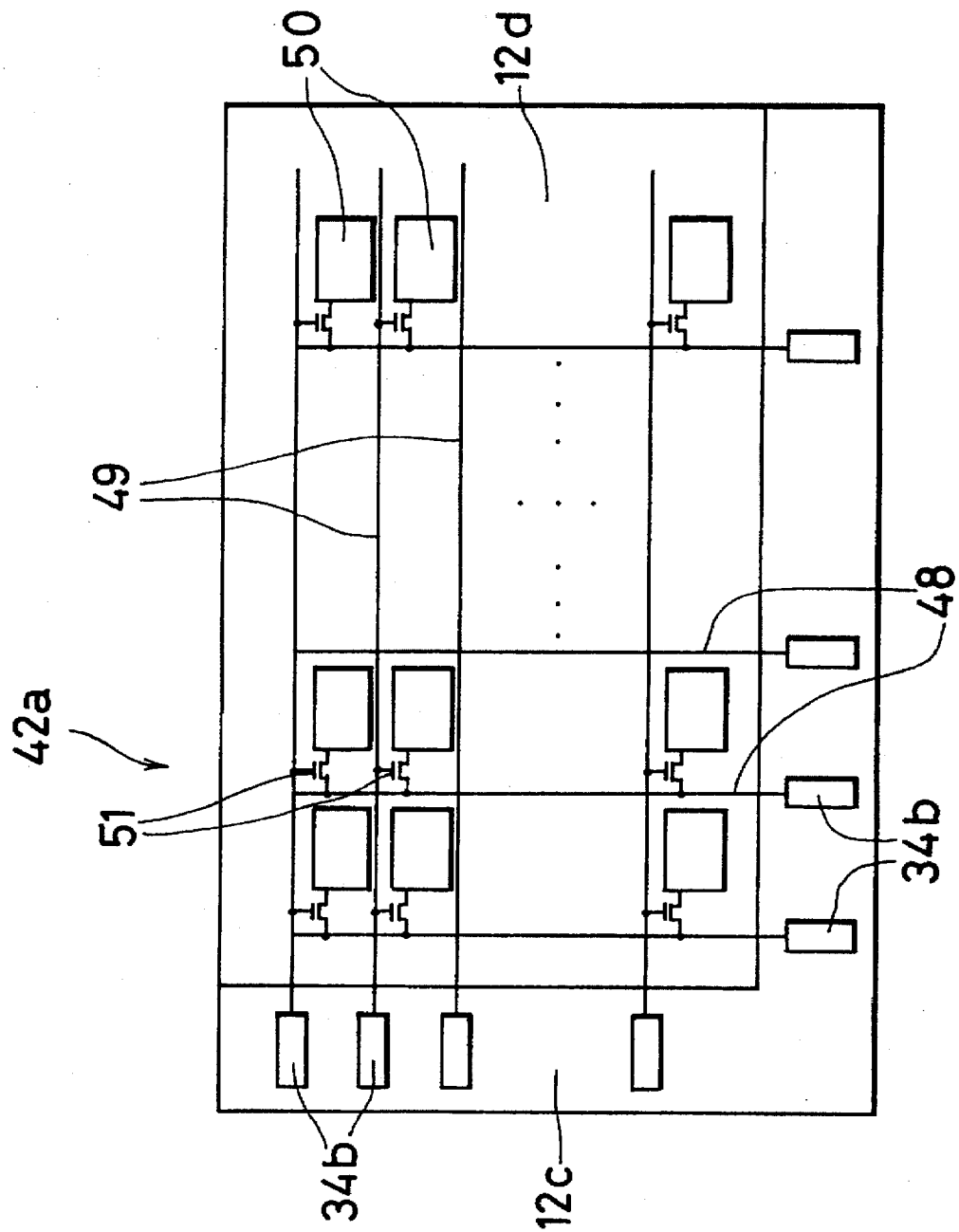

FIG. 21 is a plan view showing the configuration of the active matrix type display panel 42a. The display panel 42a is generally structured by pasting substrate members 12c, 12d having different sizes to each other. In the region of the larger substrate member 12c which confronts the smaller substrate member 12d, are formed TFTs (Thin Film Transistors) 51, source lines 48 and gate lines 49 which are connected to the TFTs 51, and driving electrodes 50 which are connected to the TFTs 51. In the region of the larger substrate member 12c which does not confront the smaller substrate member 12d, terminal electrodes 34b which are respectively connected to the source lines 48 and the gate lines 49 are formed.

When a polarizing film is to be pasted to the smaller substrate member 12d of the thus configured display panel 42a, the display panel 42a is mounted on the stage 43a with directing the terminal electrodes 34b upward. When the display panel 42a is mounted on the stage 43a, the short-circuit means 14h–14k are contacted with the portion where the terminal electrodes 34b of the display panel 42 which are directed upward with respect to the mounting face of the stage 43a.

When a polarizing film is to be pasted to the larger substrate member 12c of the display panel 42a, the display panel 42a is mounted on the stage 43a with directing downward the terminal electrodes 34b of the display panel 42a. When the display panel 42a is mounted on the stage 43a, the terminal electrodes 34b of the display panel 42 which are directed downward in relation to the mounting face of the stage 43a are contacted with the conducting means 14r–14u.

Figure 22:
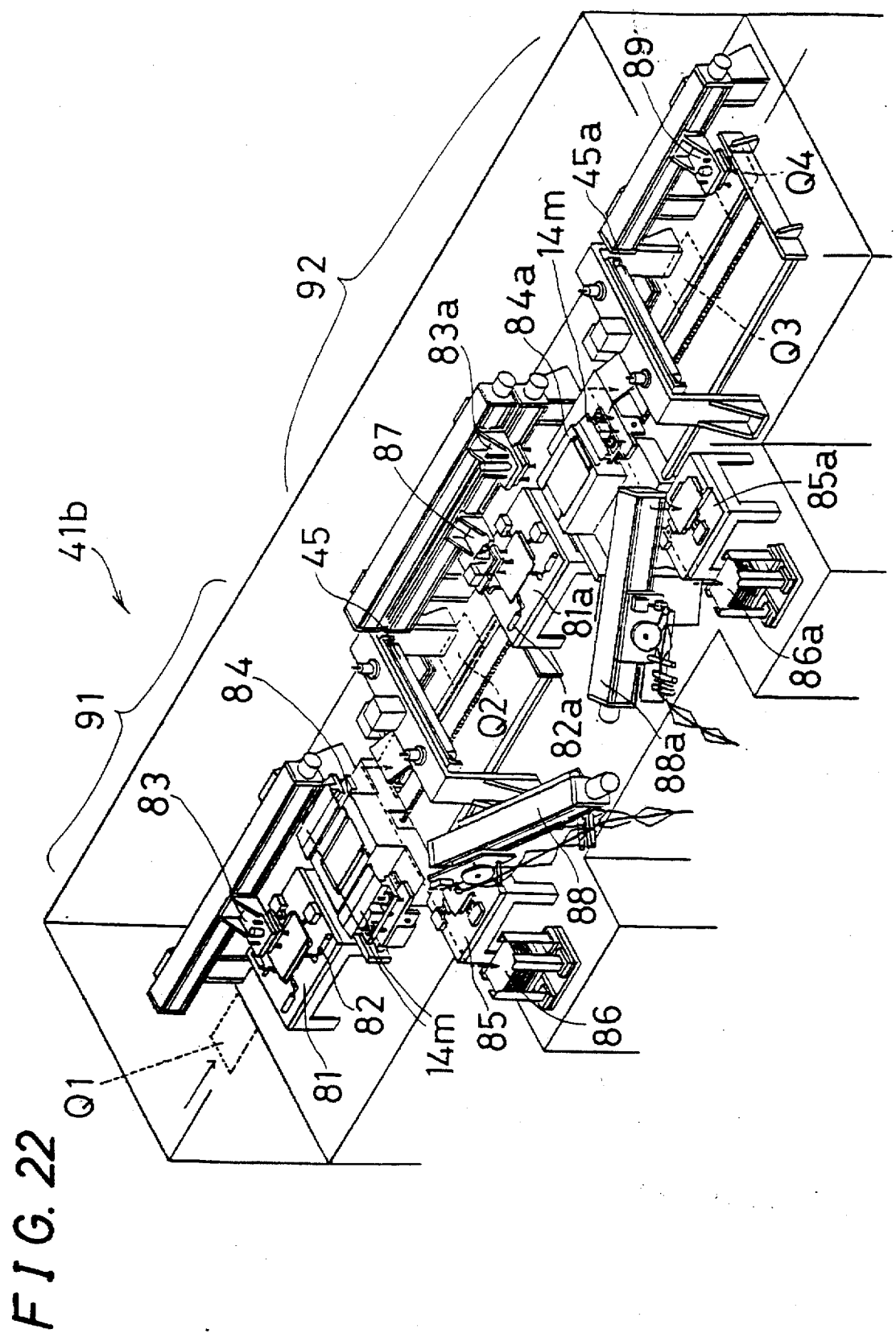
FIG. 22 is a perspective view showing the whole configuration of a polarizing film pasting apparatus 41b of still another embodiment of the invention.
Figure 23A:
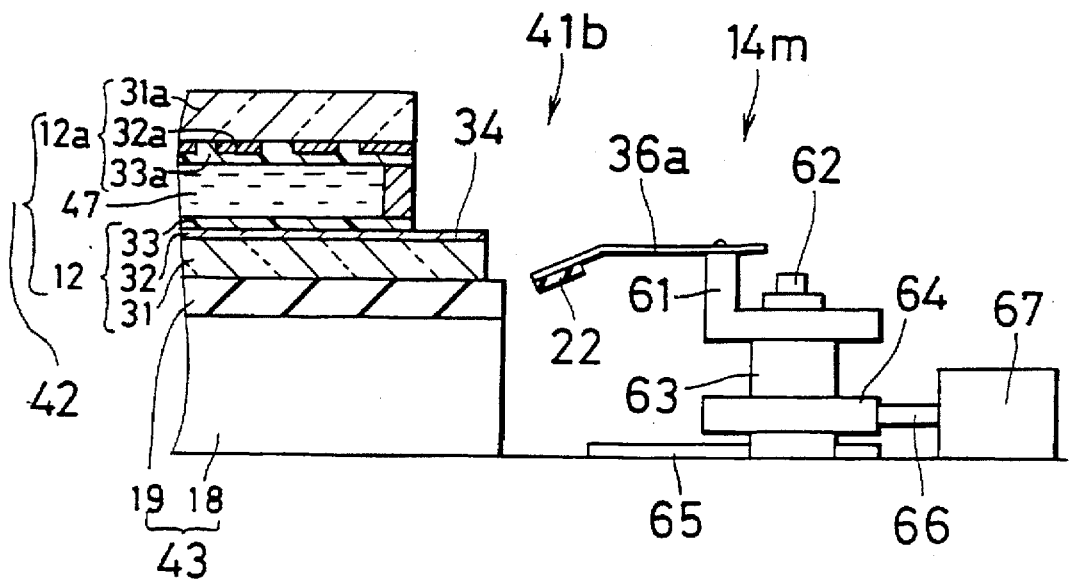
FIGS. 23A, 23B are sectional views showing the configuration of a portion of the polarizing film pasting apparatus 41b where short-circuit means 14m is disposed.
Figure 23B:
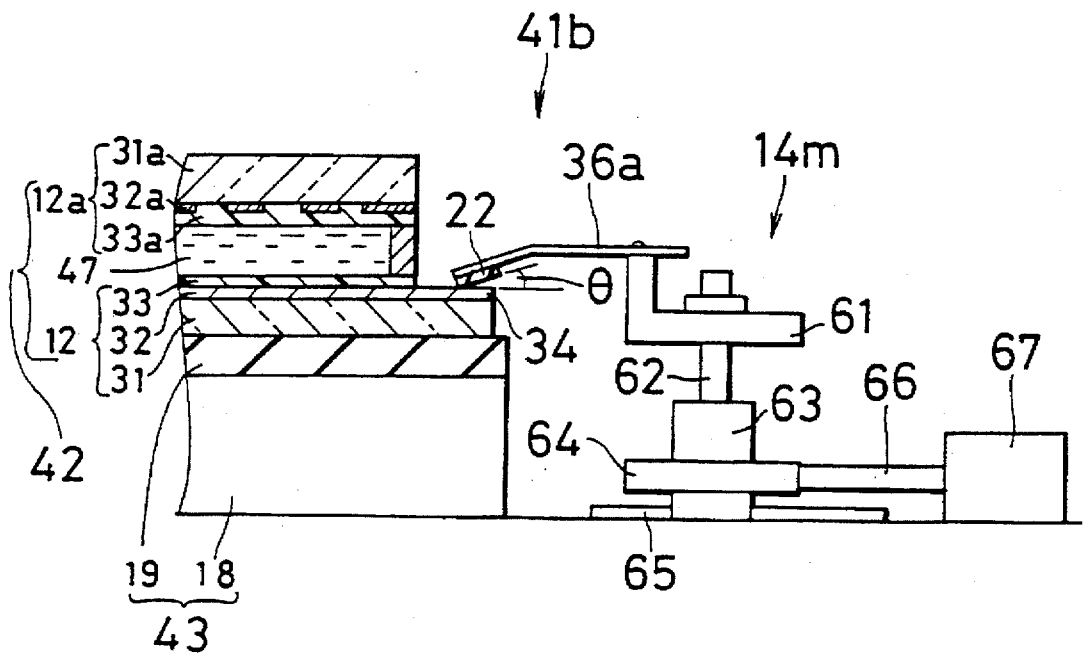

FIG. 22 is a perspective view showing the whole configuration of a polarizing film pasting apparatus 41b which is a still further embodiment of the invention, and FIGS. 23A, 25B are section views showing the configuration of a portion of the polarizing film pasting apparatus 41b where the short-circuit means 14m is disposed. The polarizing film pasting apparatus 41b conducts separately the operations of pasting polarizing films to the faces of the display panel 42, and therefore the apparatus comprises a first pasting unit 91 which pastes a polarizing film to one surface of the display panel 42, and a second pasting unit 92 which pastes a polarizing film to the other surface. As shown in FIGS. 23A and 23B, contact stages 84 of the first and second pasting units 91 and 92 have the short-circuit means 14m which is described in the embodiments of FIGS. 10, 11.

When the display panel 42 which has been cleaned in an external cleaning bath is supplied to a loading station Q1 of the polarizing film pasting apparatus 41b, the first pasting unit 91 starts the operation of pasting a polarizing film. The display panel 42 supplied to the loading station Q1 is transported to a positioning stage 81 by a transportation arm 83. On the positioning stage 81, the position of the display panel 42 in relation to the transportation arm 83 is adjusted by a plurality of positioning cylinders 82. After the position is adjusted, the display panel 42 is again transported by the transportation arm 83 so as to be mounted on the contact stage 84. Since the position adjustment on the positioning stage 81 has been conducted, the display panel 42 can be mounted correctly at a predetermined position on the contact stage 84.

When the display panel 42 is mounted on the contact stage 84 in the state where the conductive member 22 and the support member 36a are separated from the stage 43 as shown in FIG. 23A, the conductive member 22 disposed on the short-circuit means 14m is contacted with the upward-directed terminal electrodes 34 of the display panel 42 as shown in FIG. 23B, and the conductive member disposed on the mounting platform of the contact stage 84 is contacted with the downward-directed terminal electrodes of the display panel 42. When the operation of short-circuiting the terminal electrodes of the display panel 42 is completed in the manner described above, the contact stage 84 in the state shown in FIG. 22 is moved to a position opposing an unloading station Q2 for the display panel 42.

On the other hand, polarizing films are stacked in a polarizing film supplying unit 86. Each of the stacked polarizing films is transported by a laminate peeling apparatus 88 onto a polarizing film positioning stage 85 on which the position of the polarizing film is adjusted. The polarizing film which has undergone the position adjustment is subjected to the laminate peeling operation in which a laminate is peeled from an adhesive face of the polarizing film 46 onto which an adhesive material is applied. The polarizing film is further transported by the laminate peeling apparatus 88 onto the upper face of the display panel 42 which is mounted on the contact stage 84. As described with reference to FIGS. 16A to 16D, one end of the polarizing film is contacted with that of the display panel 42.

When the polarizing film is transported onto the upper face of the display panel 42 as described above, the contact stage 84 is moved so as to pass below the pasting roller and the pasting roller 45 conducts the operation of pasting the polarizing film to the display panel 42.

When the contact stage 84 is further moved to the position opposing the unloading station Q2, the display panel 42 located in the unloading station Q2 is removed by a transportation arm 87 from the contact stage 84. The contact stage 84 from which the display panel 42 has been removed is moved from the position confronting the unloading station Q2 to the state shown in FIG. 22 while passing below the pasting roller 45, and the first pasting unit 91 then completes the operation of pasting the polarizing film.

When the first pasting unit 91 completes the pasting operation, the second pasting unit 92 starts the pasting operation. The second pasting unit 92 is generally structured in a similar manner as the first pasting unit 91, and the components corresponding to those of the first pasting unit 91 are indicated by affixing a suffix "a" to the reference numerals. In the pasting operation of the second pasting unit 92, the display panel 42 which has been removed from the contact stage 84 of the first pasting unit 91 is turned by the transportation arm 87 by 180k in the course of the transportation to the positioning stage 81a of the second pasting unit 92, so that the face which has been directed upward is directed downward.

The display panel 42 which is mounted upside down on the positioning stage 81a is subjected to the position adjustment by the plurality of positioning cylinders 82a, and then transported by the transportation arm 83a to be mounted on the contact stage 84a of the second pasting unit 92. When the display panel 42 is mounted on the contact stage 84a, the terminal electrodes are short-circuited, and a polarizing film is transported to the upper face of the mounted display panel 42 by the laminate peeling apparatus 88a. The contact stage 84a in the state shown in FIG. 22 is moved to a position opposing an unloading station Q3, and the pasting roller 45a starts the operation of pasting the polarizing film to the display panel 42.

The display panel 42 which has been moved to the unloading station Q3 by the movement of the contact stage 84a is transported by a panel unloading arm 89 to an output station Q4. The display panel 42 which has been transported to the output station Q4 is discharged to the outside of the polarizing film pasting apparatus 41b by, for example, a belt conveyor or the like which is not shown. After the display panel 42 is removed from the contact stage 84a in the unloading station Q3, the contact stage 84a from which the display panel 42 has been removed is moved from the position opposing the unloading station Q3 to the state shown in FIG. 22 while passing below the pasting roller 45a.

In the polarizing film pasting apparatus 41b of the embodiment, in accordance with the loading of the display panel 42 through the loading station Q1, the operations of pasting polarizing films to both faces of the display panel 42 are sequentially conducted. Therefore, the operator is not required to turn the display panel 42 upside down, and the operations of pasting polarizing films to both faces of the display panel 42 can automatically be conducted.

The polarizing film pasting apparatus 41b of the embodiment is provided with the short-circuit means 14m using the two actuators 63, 67. Alternatively, the apparatus may be provided with the short-circuit means 14 used in the rubbing apparatus 11 of FIGS. 1–7, or the short-circuit means 14a used in the rubbing apparatus 11a of FIG. 8.

Figure 24:
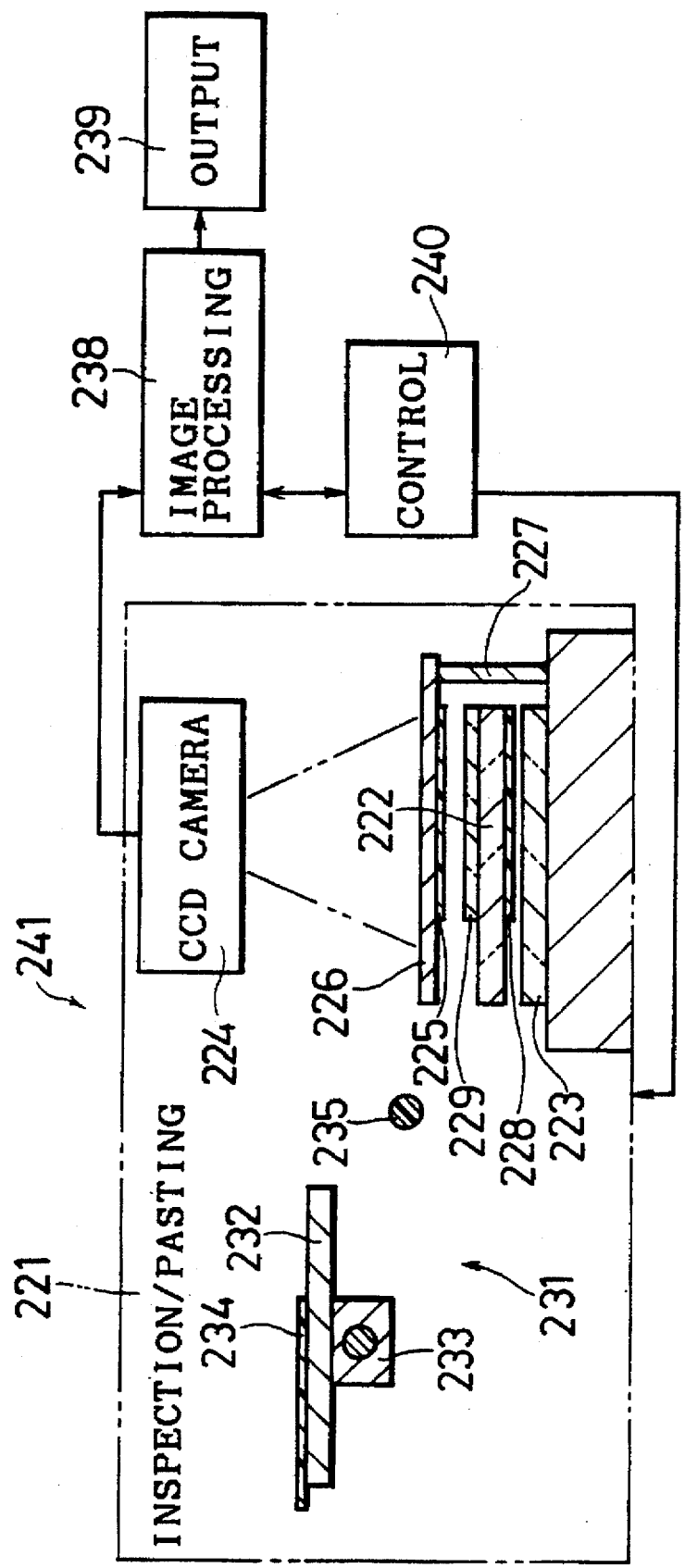
FIG. 24 is a block diagram showing the electrical configuration of an apparatus 241 for manufacturing a display device of still another embodiment of the invention.
Figure 28:
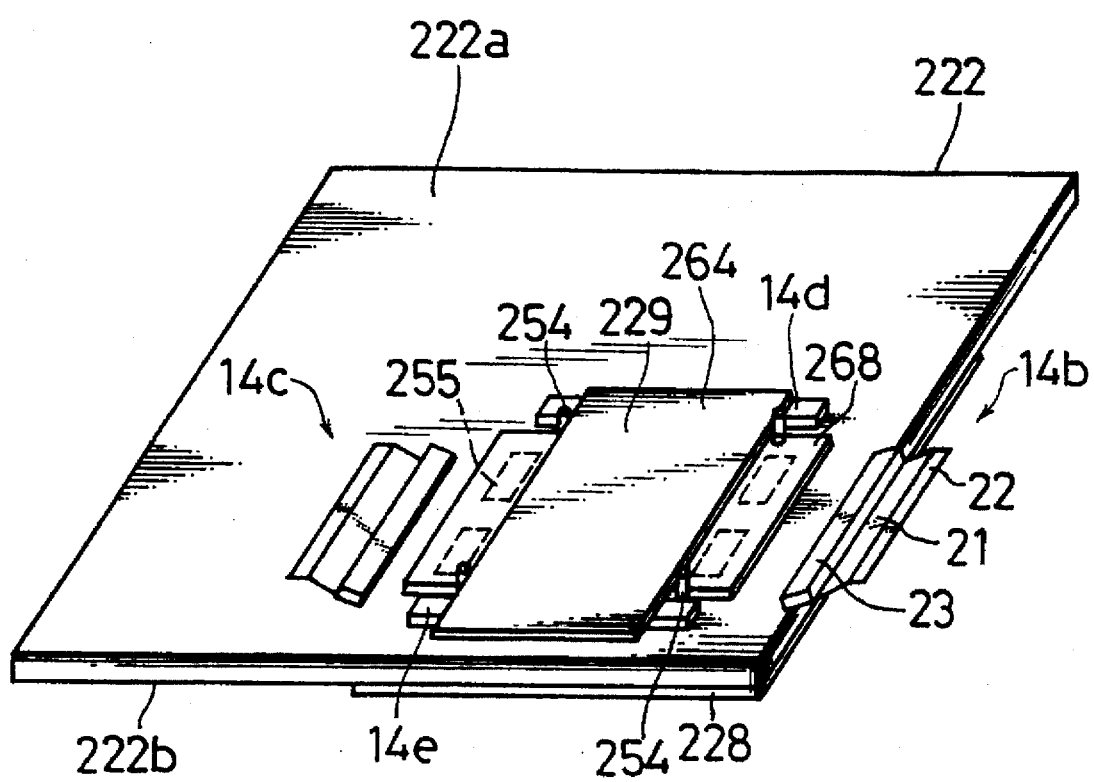
FIG. 28 is a perspective view showing the state where a display panel 229 is held on a holding face 253 of the holding member 222.

FIG. 24 is a block diagram showing the electrical configuration of an apparatus 241 for producing a display device of still another embodiment of the invention, and FIG. 28 is a perspective view showing an inspection and pasting unit 221 of the production apparatus 241. The production apparatus 241 comprises: the inspection and pasting unit 221 which inspects the display state of a display panel 229 and pastes a polarizing film to the display panel 229; an image processing circuit 238 which processes image data obtained by a CCD (Charge Coupled Device) camera 224 of the inspection and pasting unit 221; an output circuit 239 which outputs data processed by the image processing circuit 238; and a control circuit 240 which receives data processed by the image processing circuit 288 and controls the operation of the inspection and pasting unit 221.

The display panel 229 has a structure which is similar to that of the display panel 42 of the embodiment described above, or is generally structured so that a material having optical properties which are altered by subjecting the material to an electric field is interposed between a pair transparent substrate members. The optical properties of the liquid crystal are altered by applying voltages respectively higher and lower than the threshold voltage which causes the orientation of the liquid crystal molecules to be changed, to strip electrodes formed on the pair of substrate members, whereby the display panel 229 interposed between a pair of polarizing films allows incident light to transmit or interrupts the light so that a display based on brightness is obtained. The axes of polarization of the pair of polarizing films are arranged so that the intensity of transmitted light in the transparent stage is maximum and that in the translucent state is minimum.

The CCD camera 224 takes an image of the display state such as that described above in accordance with the control operation of the control circuit 240, and supplies the obtained image data to the image processing circuit 238. The image processing circuit 238 subjects the supplied imaged data to, for example, the binarizing process. As a result, it is possible to obtain the intensity of light incident on the CCD camera 224, and also the rate of change of the light. From these data, a display failure of the display panel 229 and foreign matter on the surface of the display panel 229 can be detected. The binarized data are outputted by the output circuit 239 which is implemented by displaying means such as a CRT (Cathode Ray Tube) or a liquid crystal display device, or printing means. From the output of the output circuit 239, the operator can ascertain the display state. The binarized data are supplied to the control circuit 240 which is implemented by, for example, a CPU (Central Processing Unit). The control circuit 240 controls the operation of the inspection, and pasting unit 221 so that a polarizing film is pasted to the display panel 229 only when no display failure is observed. The operation of pasting a polarizing film to the display panel 229 may be conducted depending on the judgment of the control circuit 240 or instructions from the operator which are inputted through instruction input means (not shown) connected to the control circuit 240.

Figure 25:
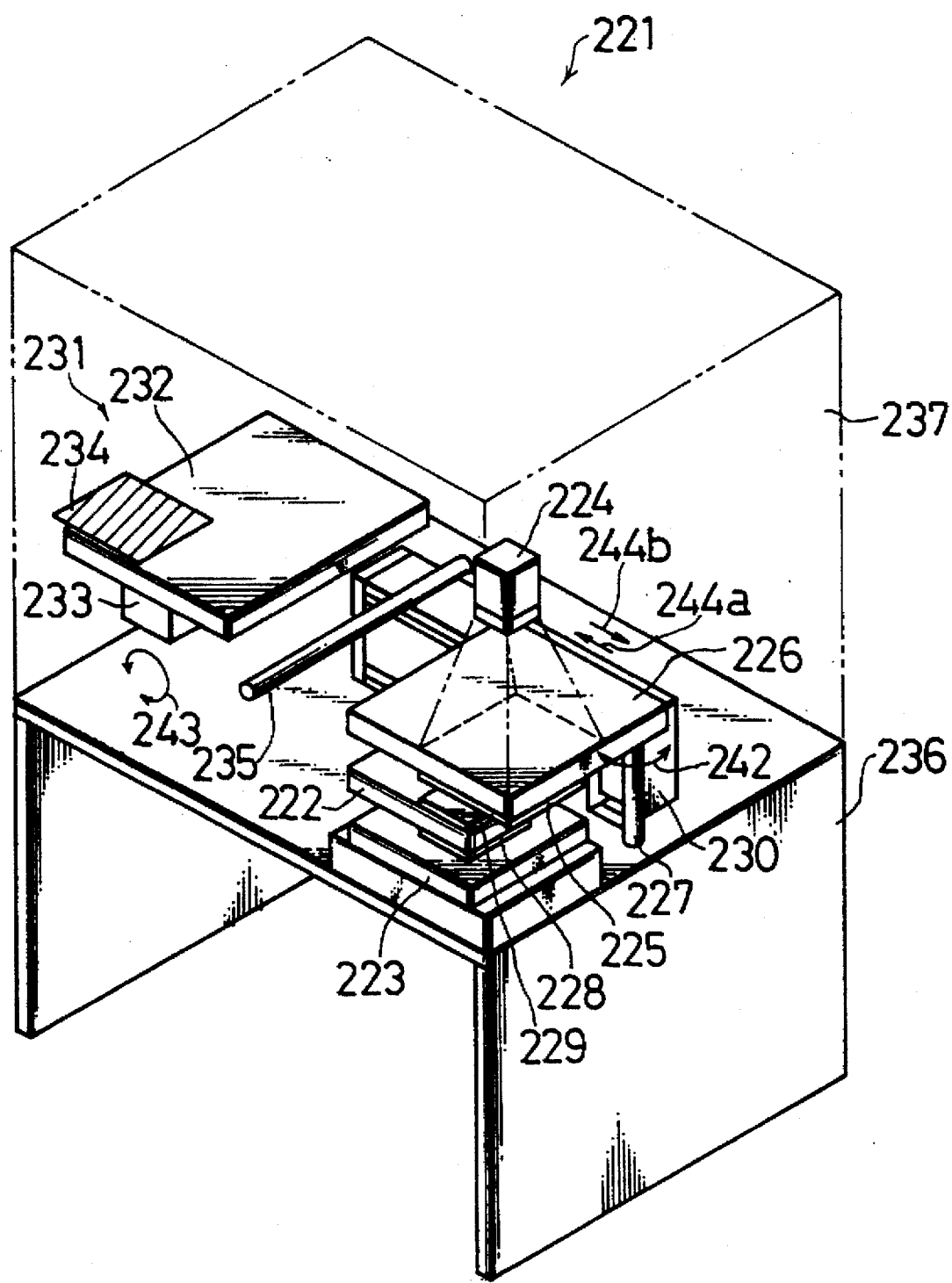
FIG. 25 is a perspective view showing an inspection and pasting unit 221 of the manufacturing apparatus 241.

Referring FIG. 25, the inspection and pasting unit 221 comprises a holding member 222 which holds the display panel 229, light irradiating means 223, the CCD camera 224, inspection polarizing films 225, 228, a support plate 226, a column 227, moving means 230, and pasting means 231. In the holding member 222, at least a holding face on which the display panel 229 is to be mounted is transparent. The holding member 222 may be implemented by, for example, a glass plate. A plurality of suction holes are opened on the holding face. After the display panel 229 is mounted on the holding face, air is sucked through the suction holes by suction means such as a pump so that the display panel 229 is sucked to the holding face of the holding member 222 to be fixed thereto. A conductive member disposed on the holding member 222 is connected with terminal electrodes elongating from the strip electrodes of the display panel 229 as described later, and the display panel 229 is positioned by a positioning member disposed on the holding member 222 and fixed.

The light irradiating means 223 comprises a linear light source such as a fluorescent lamp which emits light toward the holding member 222, an optical guide plate which guides light from the light source in a planar manner, and a reflection plate which reflects the light toward the holding member 222. The thickness of the optical guide plate may be adjusted so that the intensity of the light is substantially uniform in the same plane. Alternatively, a diffusion plate or a diffusion and reflection plate may be disposed.

The CCD camera 224 is disposed in the side opposite to the light irradiating means 223 with respect to the holding member 222, and takes an image of the vicinity of the holding face of the holding member 222.

The pair of inspection polarizing films 225, 228 are inserted between the holding member 222 and the CCD camera 224, and between the holding member 222 and the light irradiating means 223, respectively. One of the inspection polarizing films or the film 225 is disposed on the support plate 226 attached to the column 227, and the other inspection polarizing film 228 is disposed on the surface of the holding member 222 which is opposite to the surface on the side of the display panel 229. The support plate 226 is transparent at least in a region which corresponds to the holding face of the holding member 222 when the support plate 226 is located at an inspection position existing between the holding member 222 and the CCD camera 224. The inspection polarizing film 225 is disposed in the transparent region. The support plate 226 is angularly displaced about the column 227 in directions 242 parallel to the surface of the base platform 23 to which the column 227 is secured, so that the polarizing film 225 and the support plate 226 escape from the space between the holding member 222 and the CCD camera 224. Alternatively, the support plate 226 may be secured to the column 227 and the column 227 may be angularly displaced in the directions 242. The inspection polarizing film 228 is pasted to the region of the holding member 222 which is opposite to the surface on the side of the display panel 229 and corresponds to the holding face. The light emitting face of the light irradiating means 223, the holding face of the holding member 222, the surface of the inspection polarizing film 228, the surface of the inspection polarizing film 225, and the light receiving face of the CCD camera 224 are arranged so as to be parallel to the surface of the base platform 236.

The pasting means 231 comprises a support plate 232 which holds a polarizing film 234 to be pasted to the display panel 229, rotating means 233 for angularly displacing the support plate 232 in a direction 243 vertical to the surface of the base platform 236, and a pasting roller 235 which pastes the polarizing film 234 to the display panel 229. When judged that there is no display failure as a result of the inspection of the display state of the display panel 229, the holding member 222 on which the display panel 229 is held is moved by the moving means 230 secured to the surface of the base platform 236 in a direction of arrow 244a so as to approach the pasting means 231, and the polarizing film 234 is pasted to the display panel 229 in the manner which will be described later. When the operation of pasting the polarizing film 234 is ended, the holding member 222 is moved in a direction of arrow 244b which is opposite to that of arrow 244a, and returns to the inspection position where the holding member was located before the pasting operation.

Figure 26:
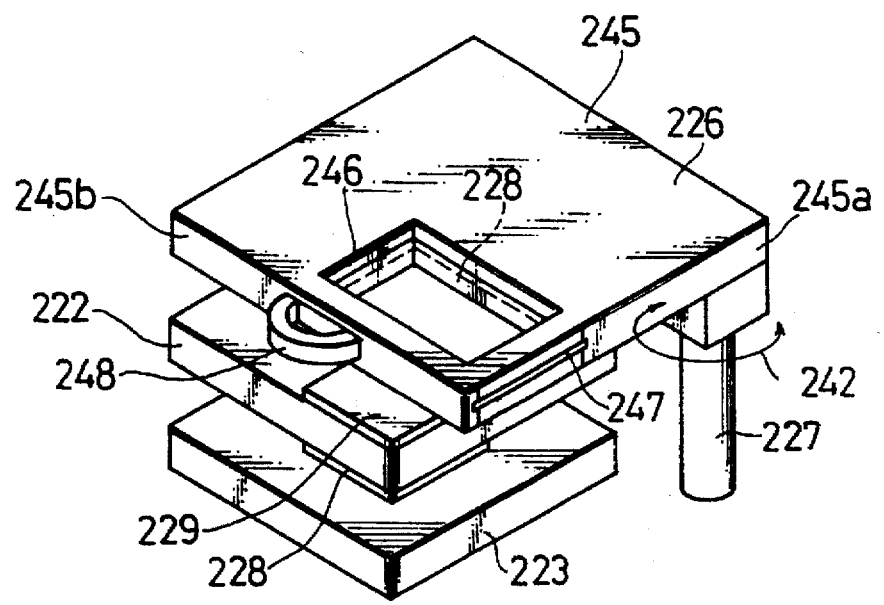
FIG. 26 is a perspective view showing a holding member 222, light irradiating means 223, and a support plate 226.

FIG. 26 is a perspective view showing the holding member 222, the light irradiating means 223, and the support plate 226. The support plate 226 comprises the support plate body 245, a transparent member 247 which is disposed in a window 246 formed in the support plate body 245, and a handle 248. The support plate body 245 is made of, for example, a synthetic resin, and has the window 246 formed in a region which, when the holding member 222 is located at the inspection position, corresponds at least to the holding face of the holding member 222. The transparent member 247 which is made of, for example, glass and to which the inspection polarizing film 228 is pasted is inserted into the window 246 through an insertion hole formed in a side face 245a of the support plate body 245. The handle 248 which is used by the operator to rotate and move the support plate 226 in the direction of arrow 242 is attached to a side face 245b of the support plate body 245.

Figure 27:
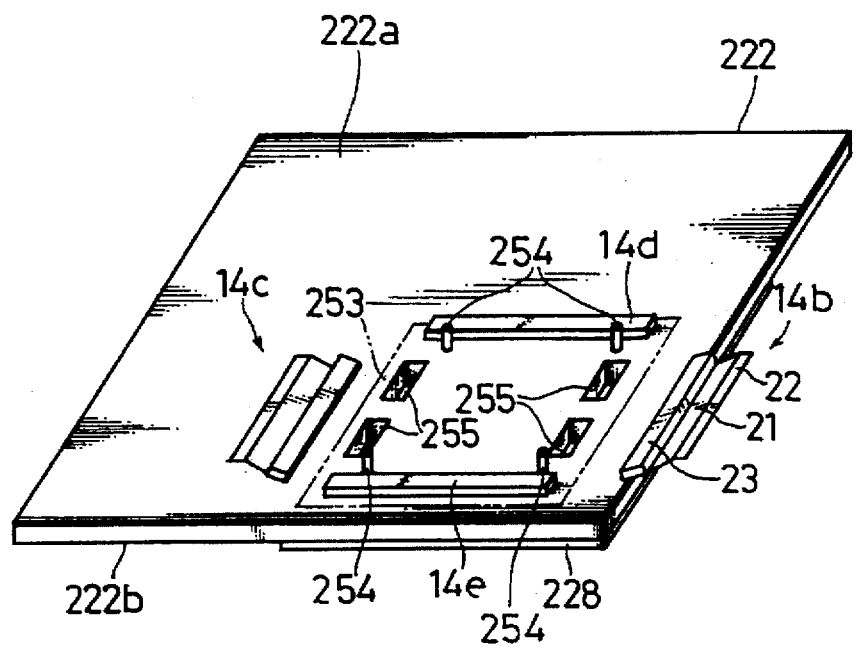
FIG. 27 is a perspective view showing the holding member 222.

FIG. 27 is a perspective view showing the holding member 222, and FIG. 28 is a perspective view showing the state where the display panel 229 is held on the holding face 253 of the holding member 222. On one surface 222a of the holding member 222 having the holding face 253 on which the display panel 229 is to be held, disposed are the short-circuit means 14b, 14c shown in FIG. 12, the conductive members 14d, 14e shown in FIG. 12, and positioning members 254. The short-circuit means 14b, 14c are disposed outside the holding face 253 in parallel to one mutually confronting edges of the rectangular holding face 253. The conductive members 14d, 14e are disposed inside the holding face 253 in parallel to the other mutually confronting edges. The conductive member 22 which is implemented by a conductive rubber and has a resistance of, for example, $10^6 \Omega$ or lower is disposed at an end of the plate spring 21 which is opposite to the side of the attaching means 23.

The positioning members 254 are disposed in the vicinities of areas where the edges of the thin long rod-like attaching means 23 of the short-circuit means 14b and 14c, and those of the conductive members 14d, 14e approach to each other, respectively. A suction hole 255 which elongates from the surface 222a of the holding member 222 to the other surface 222b is formed in the vicinity of each of the positioning members 254. For example, the positioning members 254 are implemented by column-like projections which protrude from the surface 222a, and the suction holes 255 have a rectangular section shape. The positioning members 254 and the suction holes 255 are not restricted in number and shape to those described above, and may be configured so as to have any number or shape. The positioning members 284 may be located at any position as far as the positioning members can be contacted with the outer periphery of the display panel 229, and the suction holes 288 may be located at any position as far as the positions correspond to the terminal portions and display surrounding portion of the display panel 229 other than the display portion.

As shown in FIG. 28, the display panel 229 is placed on the holding face 288, in such a manner that the plurality of terminal electrodes of the substrate member 284 of the display panel 229 which are directed downward or disposed so as to face the surface 222a are contacted with the conductive members 14d, 14e, and the display panel 229 is positioned by the positioning members 284. Then, air is sucked through the suction holes 288 by suction means which is not shown, whereby the display panel 229 is sucked and fixed to the holding member 222. The plurality of terminal electrodes of the other substrate member 288 of the display panel 229 which are directed upward are caused to be contacted with the conductive member 22 by swinging the short-circuit means 14b, 14c which have the plate spring 21 and the conductive member 22. In this way, the terminal electrodes elongating in four directions are made conductive.

In the embodiment, the holding face 253 is formed in the vicinity of a corner of the surface 222a of the holding member 222. The placement of the display panel 229 on the holding member 222 is conducted by the center reference method in which the center of the display panel 229 is made coincident with that of the holding member 222, or by the corner reference method in which one of the four corners of the display panel 229 is made coincident with a corner of the holding member 222 as in the case of the embodiment. When the former method, namely the center reference method is employed, the pasting face of the display panel 229 can be positioned with respect to the pasting roller 235 without deviation in the operation of pasting a polarizing film, so that the polarizing film is surely pasted. On the other hand, in the latter method, one corner of the holding member 222 and that of the display panel 229 are used as the reference, and therefore the positions functioning as the reference are not changed even when the size of the display panel 229 to which a polarizing film is to be pasted is changed. Therefore, the components can e easily replaced with other ones. In the embodiment, the case where the latter method is employed will be described. Also in the case where the former method is employed, the same effects are attained.

The display panel 229 is a so-called simple matrix type liquid crystal display device. The structure of the display panel 229 is not restricted to the simple matrix type. For example, the display panel may be of the active matrix type, and of any other type. The display panel is not limited to a liquid crystal display panel, and may be a display panel of any type as far as a layer made of a material in which optical properties are altered by the application of an electric field is used as a liquid crystal layer.

Figure 30A:
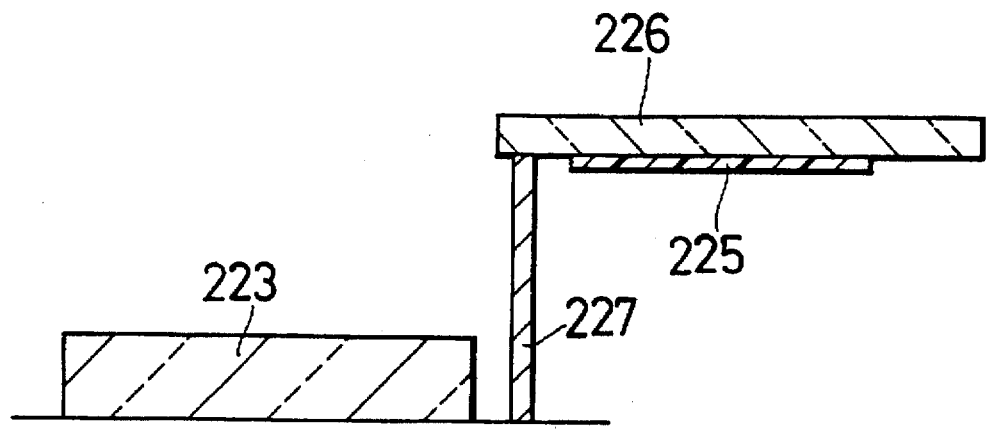
FIGS. 30A–30C are sectional views showing steps of the method of manufacturing a display device.
Figure 30B:
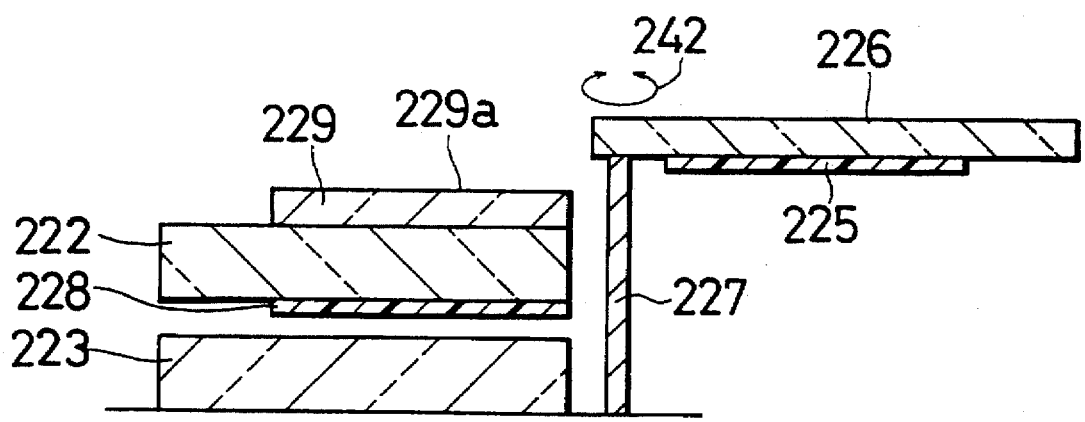
Figure 30C:
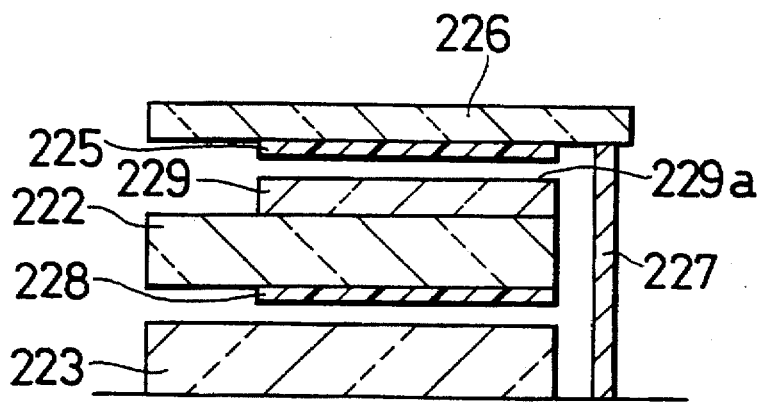
Figure 31:
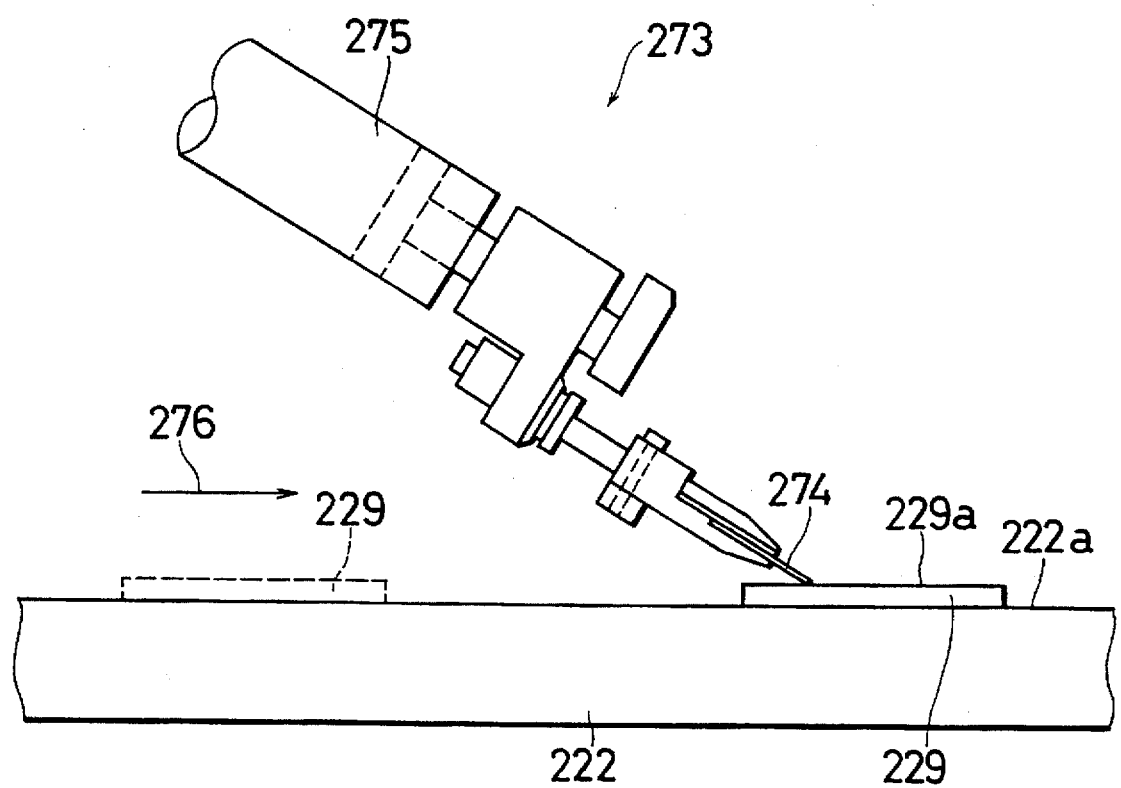
FIG. 31 is a side view showing foreign matter removing means 273 which is used for cleaning a surface of the display panel 229.

FIG. 29 is a production flow chart showing steps of a method of producing a display device, FIGS. 30A-30C, 32A-32C are sectional views showing steps of the production method, and FIG. 31 is a side view showing foreign matter removing means 273 which is used for cleaning a surface of the display panel 229.

At step e1, the display panel 229 is loaded. Specifically, as shown in FIG. 30A, for example, the support plate 226 having the inspection polarizing film 225 is located at a position separated from the irradiation region of the light irradiating means 223. As shown in FIG. 30B, the holding member 222 to which the inspection polarizing film 228 is pasted and the display panel 229 is fixed is placed at the predetermined inspection position. The inspection position is a position which is selected so that, when holding member is placed at the position, the display panel 229 is irradiated with light from the light irradiating means 223, and light passed through the display panel 229 enters the CCD camera 224.

At step e2, as shown in FIG. 80C, the support plate 226 having the inspection polarizing film 225 is angularly displaced in the direction of arrow 242, and placed above the holding member 222 holding the display panel 229. In this state, the turn-on inspection is conducted on the display panel 229. In the inspection, a display signal for inspection is supplied to the display panel 229 through the short-circuit means 14b, 14c and the conductive members 14d, 14e which are disposed on the holding member 222. When all the plural pixels formed by opposing the strip electrodes of the display panel 229 are turned on, it is judged that there is no break in the strip electrodes, and the operation proceeds to the next step. When the state where all the plural pixels are turned on is not attained, it is judged that there is a break in the strip electrodes, and the display panel 229 is not subjected to the operation of pasting the polarizing film 243. Furthermore, it is possible to evaluate the display quality including display unevenness. When it is judged that the display quality is inferior, the display panel 229 is not subjected to the operation of pasting the polarizing film 243.

At step e3, a foreign matter on the surface 229a of the display panel 229 is removed away. Prior to the removal of foreign matter, an inspection for foreign matter is conducted. The foreign matter which may cause a problem after the polarizing film 234 is pasted includes dust of a size of about 0.2 mm or longer, and a fibrous foreign matter (fuzz) of a length of about 5 mm. When the display panel is irradiated with light from below as in the case of the embodiment, the foreign matter appears black, and, when the display panel is irradiated with light from above, the foreign matter appears white. In a simple matrix type liquid crystal display device for black and white display, the liquid crystal display panel has an optical transmittance of about 95% before a polarizing film is pasted, and has an optical transmittance of about 45% after a polarizing film is pasted. Therefore, the display panel is irradiated with light from below as in the case of the embodiment, so that the foreign matter is detected as a black point or line in a white background. In a simple matrix type or active matrix type liquid crystal display device for color display, the liquid crystal display panel has an optical transmittance of 5% or less. Therefore, the display panel is irradiated with light from above, so that the foreign matter is detected as a white point or line in a black background. Alternatively, the foreign matter may be detected by a method in which laser beams are used and scattered light due to foreign matter is detected.

The detected foreign matter is removed by, for example, using the foreign matter removing means 273 shown in FIG. 31. During this removal operation, as shown in FIG. 30B, the support plate 226 having the inspection polarizing film 225 is located at a position separated from the irradiation region of the light irradiating means 223. The foreign matter removing means 273 is disposed in, for example, the inspection and pasting unit 221. During this removal operation, the holding member 222 holding the display panel 229 is moved in, for example, the direction of arrow 276 so that a cutter 274 of the foreign matter removing means 273 is contacted with the surface 229 of the display panel 229. The foreign matter removing means 273 has a cylinder 275 which operates so as to project or retract the cutter 274. The cutter 274 is placed between the surface 229a of the display panel 229 and the foreign matter, and the cutter 274 is projected or retracted by the cylinder 275, whereby the foreign matter deposited on the surface 229a of the display panel 229 is removed away.

For example, such a foreign matter includes glass powder which is produced when transparent substrates 261 and 265 are split, a liquid crystal material which is deposited in the operation of introducing liquid crystals, a sealing resin used in the operation of sealing and pasting substrates to each other, and dust accumulated during the storage and transportation of the liquid crystal display panel. When such foreign matter is once baked at a heat treatment step (e.g., a heat treatment step of about 100°) in the production process, it can not be easily removed away. With respect to foreign matter which can be removed in a relatively easy manner, it may be removed by other means such as an air blow.

The foreign matter removing means 273 may be disposed outside the inspection and pasting unit 221. As required, the operator may remove a foreign matter by using the foreign matter removing means 273 or other removing means. When the operator manually removes foreign matter, for example, a surface of a display panel to which foreign matter is deposited is shaved by a cutter, powdery dust produced by the shaving operation is removed by using an adhesive roller, and the surface is wiped with a lens cleaning cloth or the like damped with a solvent such an alcohol. Also in the case where the foreign matter is removed by the foreign matter removing means 273, the surface is cleaned by using a neutral detergent or the like after the removal operation, and then wiped by using an organic solvent, etc.

Figure 16E:
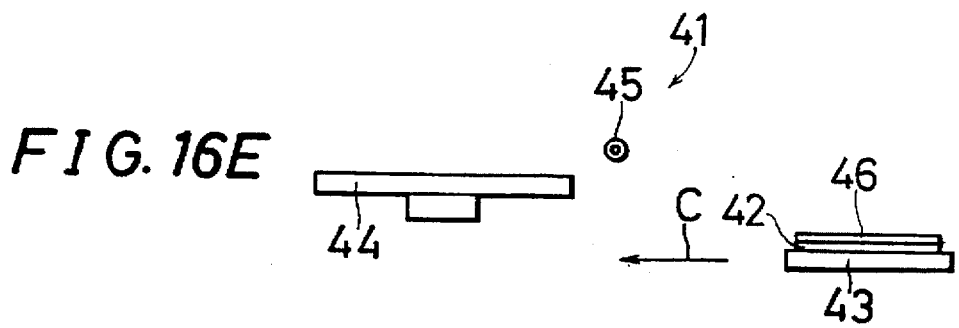

At step e4 shown in FIG. 29, the polarizing film 234 is pasted to the display panel 229 by the same method as that of FIGS. 16A, 16E.

Figure 32A:
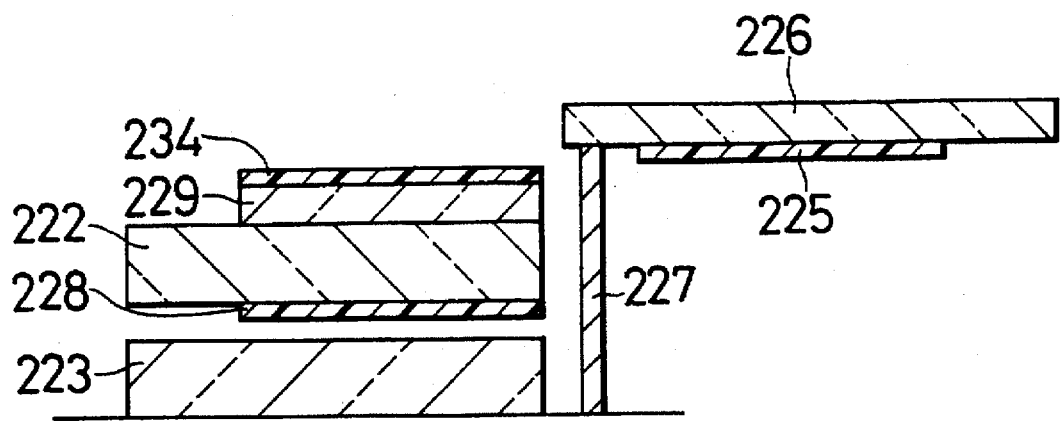
FIGS. 32A–32C are sectional views showing steps of the method of manufacturing a display device.
Figure 32B:
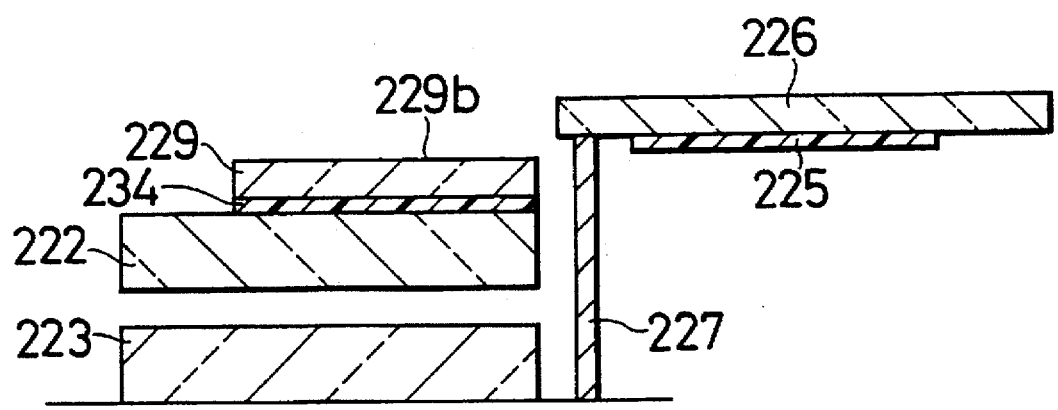
Figure 32C:
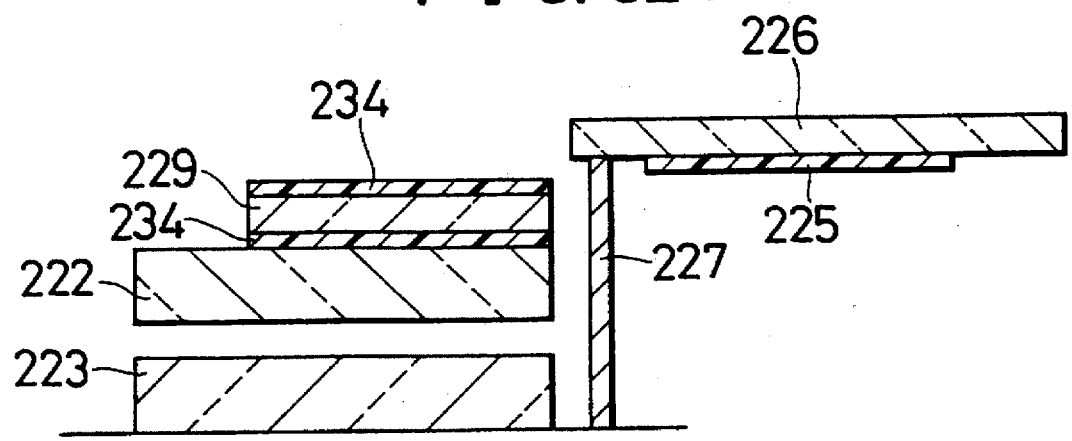

When the polarizing film 234 is pasted to the surface 229a of the display panel 229, the holding member 222 holding the display panel 229 to which the polarizing film 234 is pasted is again placed at the inspection position as shown in FIG. 32A. On the holding member 222 to which the inspection polarizing film 228 is not disposed, as shown in FIG. 32B, the display panel 229 in which the polarizing film 234 is pasted to the surface 229a is held upside down. In other words, the display panel 229 is held in such a manner that the pasted polarizing film 234 is placed on the side of the holding face and the other surface 229b is exposed. The operation of turning the display panel 229 upside down is executed by, for example, the operator.

At step e5, the foreign matter on the other surface 229b of the display panel 229 is removed away in the same manner as above-described step e3. At step e6, the polarizing film 234 is pasted to the other surface 229b of the display panel 229 in the same manner as above-described step e4. After the polarizing film 234 is pasted to the other surface 229b, as shown FIG. 32C, the holding member 222 holding the display panel 229 in which the polarizing films 234 are pasted to both faces is again placed at the inspection position. An inspection for a failure caused in the operation of pasting the polarizing films 234, such as contamination of foreign matter, and positional deviation can be conducted in a similar manner as the turn-on and contamination inspections conducted before the operations of pasting the polarizing films.

At step e7, the display panel 229 to which the polarizing films 234 are pasted, i.e., the completed liquid crystal display device is unloaded from the inspection and pasting unit 221.

Figure 33:
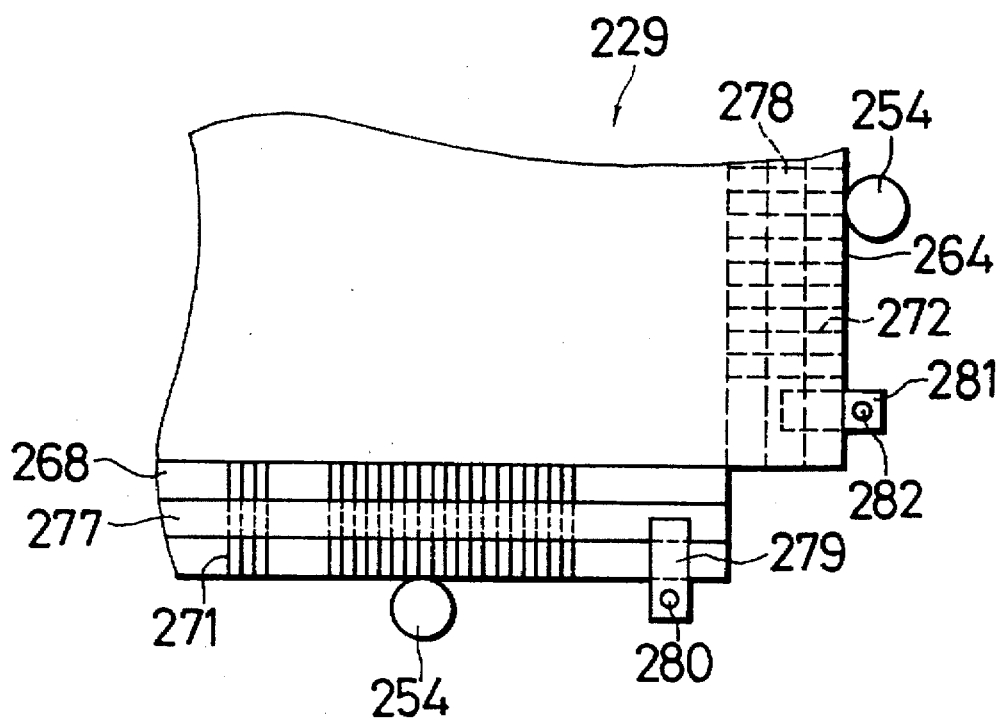
FIG. 33 is a plan view showing the display panel 229 having conductive members 277, 278.
Figure 34A:
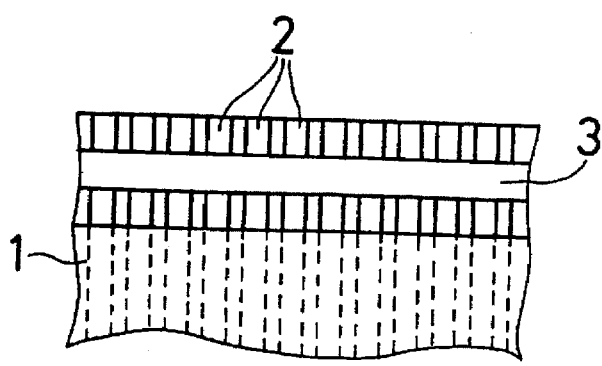
FIGS. 34A, 34B are views showing a short-circuit state of terminal electrodes 2 in the prior art where the conductive tape 3 is used.
Figure 34B:
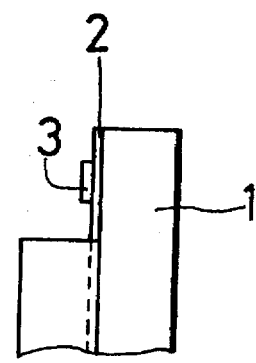
Figure 35:
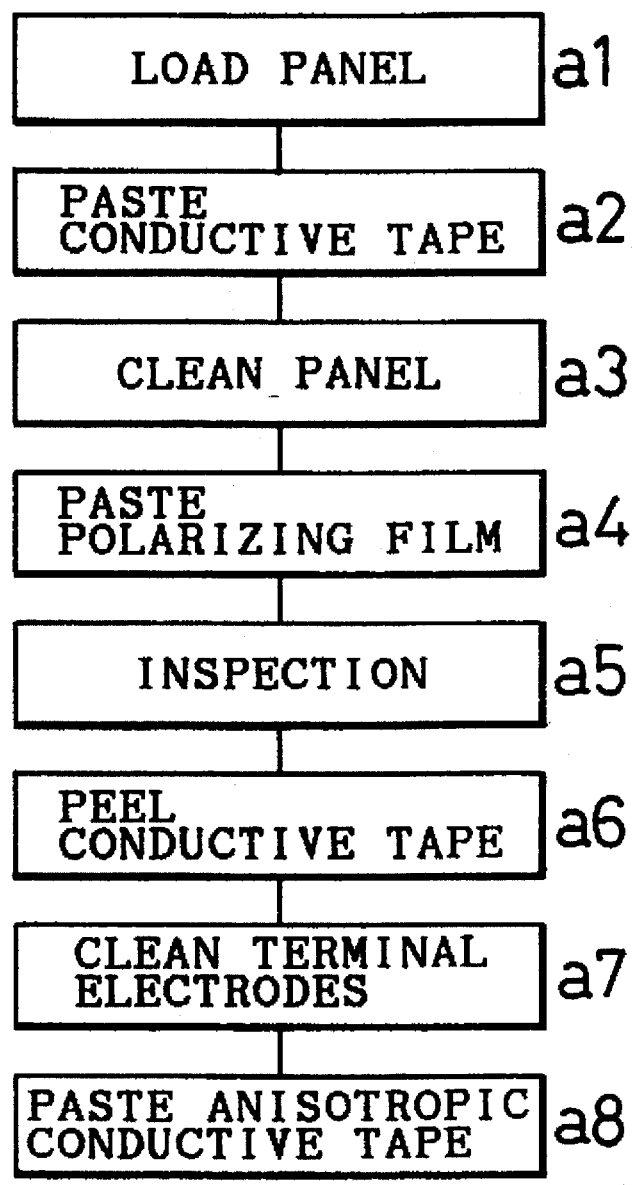
FIG. 35 is a production flow chart showing steps of pasting a polarizing film in the prior art.
Figure 36:
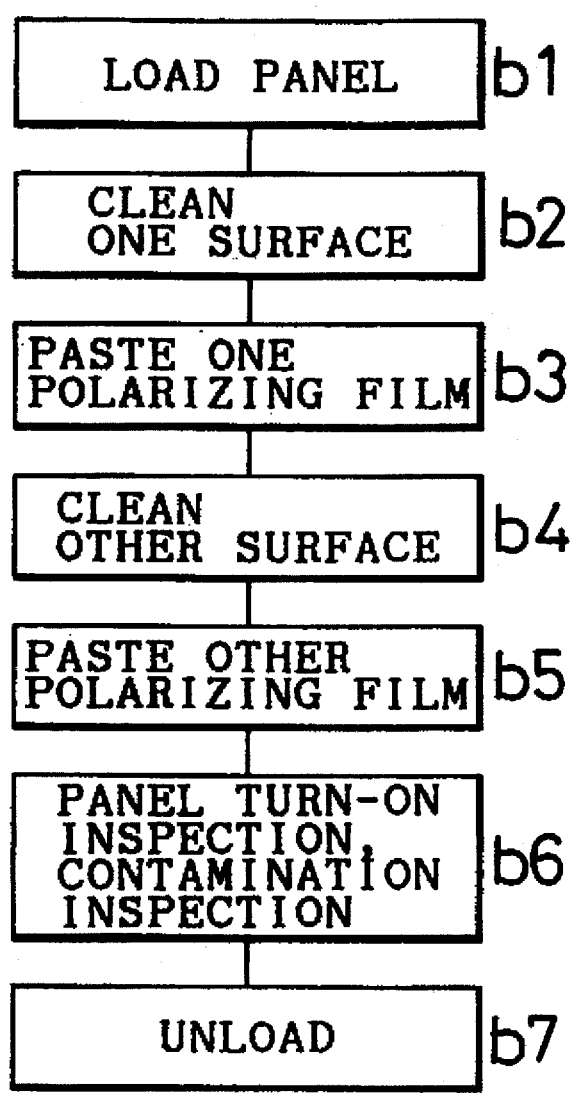
FIG. 36 is a production flow chart showing steps of a method of manufacturing a liquid crystal display device in the prior art.
Figure 37:
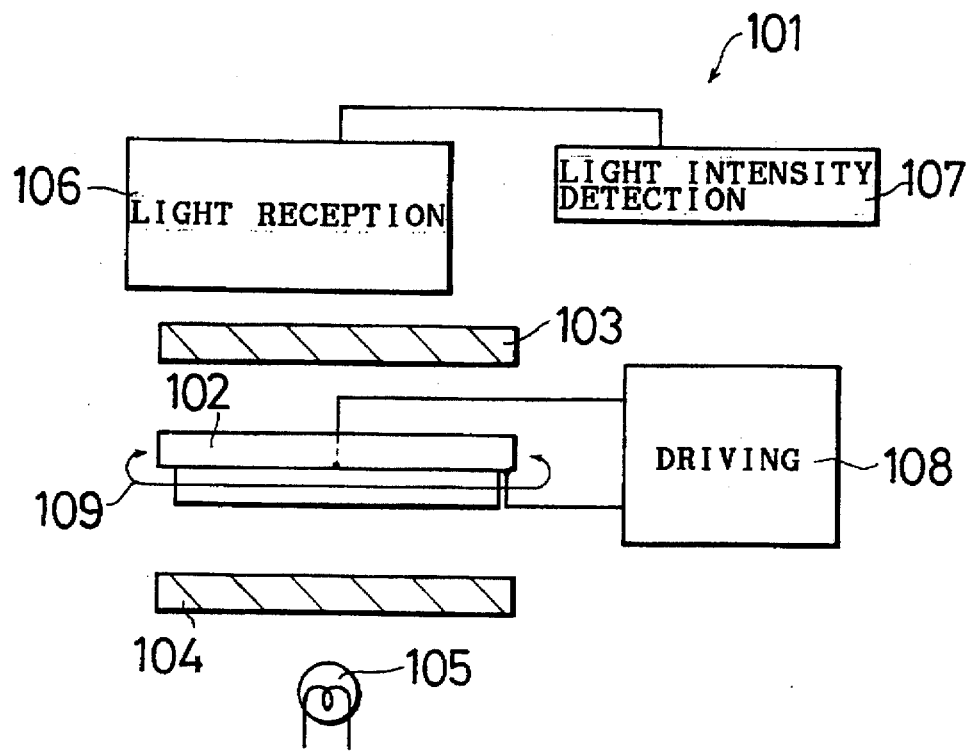
FIG. 37 is a diagram showing the configuration of the apparatus 101 for manufacturing a liquid crystal display device in the prior art.
Figure 38:
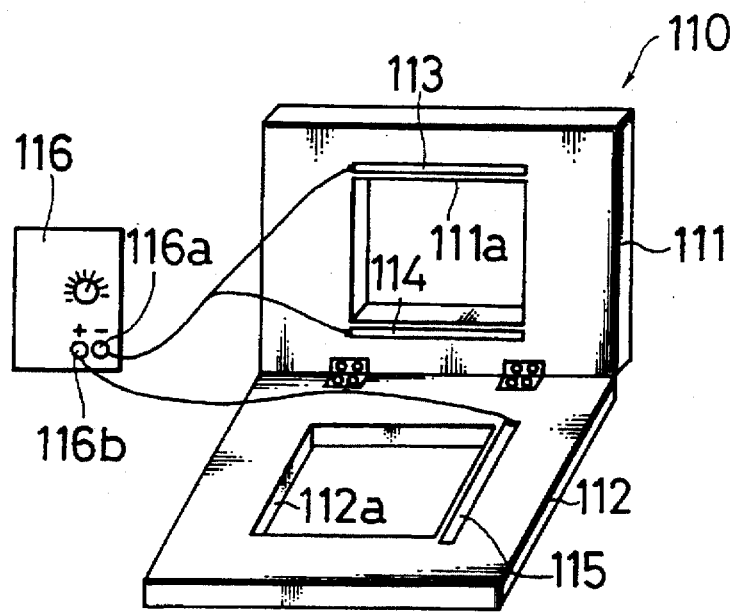
FIG. 38 is a diagram showing the configuration of the apparatus 110 for producing a liquid crystal display device in the prior art.

FIG. 33 is a plan view showing the display panel 229 in which terminal electrodes 271 and 272 of the display panel 229 are previously connected with conductive members 277 and 278 in order to protect the display panel 229 from static electricity which may be generated during the storage or transportation. The conductive members 277, 278 may be implemented by a conductive paste, a conductive tape or the like. In the display panel 229 in which the conductive members 277, 278 are disposed, connecting members 279, 281 are used in place of the short-circuit means 14b, 14c and the conductive members 14d, 14e. The connecting members 279, 281 are contacted with the conductive members 277, 278, and electrically conductive at least in the contacting faces. A signal for inspection is supplied to terminals 280, 282 connected to the conductive portions.

As seen from the above, when the conductive members 277, 278 are provided, a display signal for inspection can be supplied to the terminal electrodes 271, 272 by using the connecting members 279, 281 having a relatively simple structure. In the above-described case where the short-circuit means 14b, 14c and the conductive members 14d, 14e are used, or in the display panel 229 which is not provided with the conductive members 277, 278, a step of removing the conductive members 277, 278 is not required, and hence the time and labor for manufacturing can be reduced. Since the display panel is free from residue of a conductive paste or a conductive tape, there occurs no display failure due to such residue.

As described above, according to the embodiment, the inspection for the display state is conducted by using the inspection polarizing films 225, 228 before the operations of pasting the polarizing films 234 to the display panel 229. When a display failure due to a break of strip electrodes or the like or an inferior display quality such as display unevenness is detected as a result of the inspection, the polarizing films 234 are not pasted. Therefore, pasting the polarizing films 234 can be eliminated, and as a result the manufacturing cost can be reduced. Furthermore, the number of failures in the operations of pasting the polarizing films 234 can be reduced by cleaning the surfaces of the display panel 229 and removing a foreign matter.

In the prior art, two apparatuses, i.e., an apparatus for pasting polarizing films to a display panel, and an apparatus for inspecting a display device are separately employed. According to the embodiment, the single manufacturing apparatus 241 can conduct both the inspection and the pasting operation. Consequently, the labor and time for loading the display panel 229 into the apparatus can be reduced, and also the space for installing the apparatus can be reduced.

In the manufacturing apparatus 241 of the embodiment, the display panel 229 is placed in the state where the terminal electrodes 271, 272 of the display panel 229 are short-circuited by the short-circuit means 14b, 14c and the conductive members 14d, 14e. In other words, the terminal electrodes 271, 272 remain to be short-circuited also in the operations of pasting the polarizing films 234. Therefore, the display panel 229 is prevented from being destroyed by static electricity of hundreds to thousands volts which is generated during the pasting operations.

When the terminal electrodes 271, 272 are drawn out in an appropriate manner from the strip electrodes of the display panel 229, it is possible to inspect whether the strip electrodes are short-circuited or not. For example, strip electrodes may be drawn out in an alternating manner toward one side, and other strip electrodes may be drawn out toward the opposite side. In such an arrangement, when a display signal for inspection is supplied only to the terminal electrodes on one side, turn-on and turn-off strip electrodes are alternately arranged. In this case, turn-on and turn-off pixels are alternately arranged. When strip electrodes are short-circuited, however, turn-on pixels are continuously arranged. Therefore, it is possible to ascertain the short-circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for manufacturing a display device, in which a polarizing film is pasted to a surface of display panel wherein a liquid crystal material is interposed between two mutually confronted substrate members each having a surface on which plurality of electrodes are formed, and a plurality of terminals through which a drive signal is supplied to the electrodes are disposed on the other not mutually confronted surfaces of the substrate members, the apparatus comprising:

holding means having a mounting face on which the display panel is to be mounted, for holding the display panel by attracting the display panel onto the mounting face;

short-circuit means provided in such a manner that allows contact with or separation from a region where terminals on a lower substrate of the display panel held by the holding means are directed upward with respect to the mounting face, the short-circuit means having an electrically conductive contact face in contact with the display panel;

conductive means provided in such a manner that allows contact with a region where terminals on an upper substrate of the display panel held by the holding means are directed downward with respect to the mounting face, the conductive means having an electrically conductive contact face in contact with the display panel; and pasting means for pasting a polarizing film to the surface of the display panel.

2. An apparatus for manufacturing a display device, in which a polarizing film is pasted to a surface of a display panel wherein a liquid crystal material is interposed between two substrate members having different sizes, a plurality of electrodes and a plurality of switching elements which are connected to the electrodes are formed on a surface of one larger substrate member of said two substrate members, the surface confronting the other smaller substrate member, and a plurality of terminals through which a drive signal is supplied to the electrodes are formed on the other surface of the larger substrate member, not confronting the smaller substrate member, the apparatus comprising:

first holding means having a mounting face on which the display panel is mounted and holding the display panel by attracting the display panel so that the terminals on the larger substrate are directed upward with respect to the mounting face;

second holding means having a mounting face on which the display panel is mounted and holding the display panel by attracting the display panel so that the terminals on the larger substrate are directed downward with respect to the mounting face;

inverting means, located between the first holding means and the second holding means, for inverting the display panel;

short-circuit means provided in connection with the first holding means in such a manner that allows contact with or separation from a region where the terminals on the larger substrate of the display panel held by the holding means are directed upward with respect to the mounting face of the first holding means, the short-circuit means having an electrically conductive contact face in contact with the display panel;

conductive means provided in connection with the second holding means in such a manner that allows contact with a region where the terminals on the larger substrate of the display panel held by the second holding means are directed downward with respect to the mounting face of the second holding means, the conductive means having an electrically conductive contact face in contact with the display panel; and pasting means for pasting a polarizing film to the surface of the display panel.

3. The apparatus of any of claims 1 to 2, wherein the short-circuit means comprises:
- a conductive member which can be contacted with all the terminals directed upward with respect to the mounting face, a portion of the conductive member, which is to be contacted with the terminals directed upwardly with respect to the mounting face, being electrically conductive;
- a support member for supporting the conductive member; and
- urging means for urging the conductive member toward the face of the substrate member on which the terminals directed upwardly with respect to the mounting face are formed, wherein the contacting portion of the conductive member protrudes in a tapered manner and is elastic.

4. The apparatus of any claims 1 to 2, wherein the short-circuit means comprises:
- a conductive member which can be contacted with all the terminals on said lower substrate and facing upward and includes an electrically conductive portion to be contacted with the terminals on said lower substrate and facing upward;
- a plate spring, one end of which is attached to the holding means so that the other end on which the conductive member is disposed oscillates; and
- fixing means for fixing the plate spring in a state where the conductive member is pressed against the substrate member, wherein contacting portion of the conductive member protrudes in a tapered manner and is elastic.

5. The apparatus of any of claims 1 to 2, wherein the short-circuit means of the invention comprises:
- a conductive member which can be contacted with all the terminals on said lower substrate and facing upward and includes an electrically conductive portion to be contacted with the terminals on said lower substrate and facing upward;
- a plate spring, one end of which is provided with the conductive member;
- a first actuator which supports the other end of the plate spring, and which moves the plate spring so that the conductive member is moved in a direction vertical to the mounting face of the holding means; and
- a second actuator which moves the first actuator so that the conductive member is moved in a direction parallel to the mounting face of the holding means, wherein the contacting portion of the conductive member protrudes in a tapered manner and is elastic.

6. A method of manufacturing a display device, in which a polarizing film is pasted to a surface of a display panel wherein a liquid crystal material is interposed between two substrate members each having a surface on which a plurality of electrodes are formed, the surfaces of the substrate members confronting each other, and a plurality of terminals through which a drive signal is supplied to the electrodes are formed on the other surfaces of the substrate members, not confronting each other, the method comprising the steps of:

mounting and holding the display panel on a mounting face of holding means for holding the display panel by attracting the display panel so that terminals of the display panel directed downward in relation to the mounting face are contacted with conducting means having a conductive contact face to be contacted with the display panel;

contacting short-circuit means which can be contacted with and separated from a region of the display panel held by the holding means, wherein the terminals directed upward in relation to the mounting face are arranged, and which has an electrically conductive contact face to be contacted with the display panel, to the terminals directed upward; and pasting a polarizing film to the surface of the display panel in a state where all the terminals of the display panel are short-circuited.

7. A method of manufacturing a display device, in which a polarizing film is pasted to a surface of a display panel wherein a liquid crystal material is interposed between two substrate members having different sizes, a plurality of electrodes and a plurality of switching elements connected to the electrodes are formed on a surface of one larger substrate member of said two substrate members, the surface confronting the other smaller substrate member, and a plurality of terminals through which a drive signal is supplied to the electrodes are formed on the other surface of the larger substrate member, not confronting the smaller substrate member, the method comprising the steps of:

mounting and holding the display panel on a mounting face of first holding means for holding the display panel by attracting the display panel so that terminals of the display panel are directed upward in relation to the mounting face;

contacting short-circuit means which can be contacted with and separated from a region of the display panel held by the first holding means, wherein the terminals directed upward in relation to the mounting face are arranged, and which has an electrically conductive contact face to be contacted with the display panel, to the terminals directed upward;

pasting a polarizing film to one surface of the display panel in a state where all the terminals of the display panel are short-circuited each other;

mounting and holding the display panel on a mounting face of second holding means for holding the display panel by attracting the display panel so that the terminals directed downward in relation to the mounting face of the display panel are contacted with conductive means having a conductive contact face to be contacted with the display panel; and pasting a polarizing film to an other surface of the display panel in a state where all the terminals of the display panel are short-circuited each other.

8. An apparatus for manufacturing a display device, which a polarizing film is pasted to a surface of a display panel wherein a material having optical properties that are altered by subjecting the material to an electric field is interposed between a pair of transparent substrate members and the display panel comprises at least a plurality of display electrodes on surfaces of the substrate members, the surfaces confronting each other and being on the side of the material, and a plurality of terminals which elongate from the display electrodes toward peripheral portions of the corresponding substrate members, the apparatus comprising:

holding means for holding the display panel, wherein at least a display panel holding face of the holding means is light transmissive;

a light source for emitting light toward the holding means;

imaging means disposed on the side opposite to the light source with respect to the holding means;

inspection polarizing films to be inserted between the holding means and the light source and between the holding means and the imaging means, respectively;

first and second conductive members, the first conductive member connected with the plurality of terminals of one of the substrate members of the display panel held by the holding means, the second conductive member connected with the plurality of terminals of the other substrate member;

signal outputting means for supplying a display signal for inspection to the first and second conductive members; and pasting means for pasting a polarizing film to a surface of the display panel in a state where the plurality of terminals of both of the substrate members are connected with the first and second conductive members.

9. A method of manufacturing a display device, in which a polarizing film is pasted to a surface of a display panel wherein a material having optical properties that are altered by subjecting the material to an electric field is interposed between a pair of transparent substrate members and the display panel comprises at least a plurality of display electrodes on surfaces of the substrate members, the surfaces confronting each other and being on the side of the material, and a plurality of terminals which elongate from the display electrodes toward peripheral portions of the corresponding substrate members, the method comprising the steps of:

mounting the display panel on a light-transmissive holding face of holding means;

inserting inspection polarizing films between the holding means and a light source which emits light toward the holding means, and between the display panel on the holding means and the imaging means which is disposed in the side opposite to the light source with respect to the holding means, respectively, connecting the plurality of terminals of one of the substrate members of the display panel with a conductive member, and the plurality of terminals of the other substrate member with other conductive member;

supplying a display signal for inspection through the conductive members, and taking an image of a display face of the display panel to inspect a display state of the display panel; and only when there is no display failure, pasting a polarizing film to a surface of the display panel in a state where the conductive members are connected with the plurality of terminals.

* * * * *